(12) United States Patent
Chen et al.

(10) Patent No.: US 11,159,979 B2
(45) Date of Patent: Oct. 26, 2021

(54) METHOD AND APPARATUS FOR REQUESTING RESOURCE FOR CONTROL ELEMENT TRANSMISSION IN A WIRELESS COMMUNICATION SYSTEM

(71) Applicant: ASUSTek Computer Inc., Taipei (TW)

(72) Inventors: Wei-Yu Chen, Taipei (TW); Richard Lee-Chee Kuo, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 125 days.

(21) Appl. No.: 15/963,313

(22) Filed: Apr. 26, 2018

(65) Prior Publication Data

US 2018/0317123 A1  Nov. 1, 2018

Related U.S. Application Data

(60) Provisional application No. 62/490,072, filed on Apr. 26, 2017, provisional application No. 62/519,718, filed on Jun. 14, 2017.

(51) Int. Cl.
*H04W 28/02* (2009.01)
*H04W 72/04* (2009.01)
(Continued)

(52) U.S. Cl.
CPC ... *H04W 28/0278* (2013.01); *H04W 72/0413* (2013.01); *H04W 72/1284* (2013.01);
(Continued)

(58) Field of Classification Search
CPC ............... H04W 28/0268; H04W 28/0278
See application file for complete search history.

(56) References Cited

U.S. PATENT DOCUMENTS

2014/0293898 A1* 10/2014 Tseng ............... H04W 24/02
                                                         370/329
2016/0128094 A1    5/2016 Lee et al.
(Continued)

FOREIGN PATENT DOCUMENTS

CN       104320857 A    1/2015
EP       2765731        8/2014
(Continued)

OTHER PUBLICATIONS

Communication pursuant to Article 94(3) EPC from corresponding EP Application No. 18169501.6, dated Nov. 8, 2019.
(Continued)

*Primary Examiner* — Robert M Morlan
(74) *Attorney, Agent, or Firm* — Skaar Ulbrich Macari, P.A.

(57) ABSTRACT

A method and apparatus are disclosed from the perspective of a UE, wherein the UE is allocated with multiple SR configurations by a network node. In one embodiment, the method includes the UE triggering a MAC control element if a timer expires. The method also includes the UE triggering a SR for the MAC control element. The method also includes the UE transmitting the SR based on a first SR configuration of the multiple SR configurations, wherein the first SR configuration is associated with a highest priority logical channel having data available for transmission when the MAC control element is triggered.

17 Claims, 37 Drawing Sheets

(51) Int. Cl.
*H04W 72/12* (2009.01)
*H04W 72/08* (2009.01)
*H04L 5/00* (2006.01)
*H04L 12/835* (2013.01)
*H04W 72/10* (2009.01)

(52) U.S. Cl.
CPC ............ *H04L 5/0053* (2013.01); *H04L 47/30* (2013.01); *H04W 72/087* (2013.01); *H04W 72/10* (2013.01); *H04W 72/1242* (2013.01); *H04W 72/1278* (2013.01)

(56) References Cited

U.S. PATENT DOCUMENTS

| | | | |
|---|---|---|---|
| 2016/0135217 | A1 | 5/2016 | Sunyoung |
| 2016/0205700 | A1 | 7/2016 | Jersenius |
| 2017/0048857 | A1* | 2/2017 | Vajapeyam ....... H04W 72/1284 |

FOREIGN PATENT DOCUMENTS

| | | |
|---|---|---|
| TW | 201613399 | 4/2016 |
| WO | 2016/183728 | 11/2016 |
| WO | 2016186004 | 11/2016 |

OTHER PUBLICATIONS

Ericsson, SR and BSR triggering aspects[online], 3GPP TSG RAN WG2 #97 bis R2-1702746, Interet<URL:http://www.3gpp.org/ftp/tsg_ran/WG2_RL2/TSGR2_97bis/Docs/R2-1702746.zip>, 2017/407, p. 1-4.
Office Action from Japan Patent Office in corresponding JP Application No. 2018-084608, dated Mar. 12, 2019.
3GPP TS 36.321 v13.5.0, 3rd Generation Partnership Project; Technical Specification Group Radio Access Network; Evolved Universal Terrestrial Radio Acces (E-UTRA); Medium Access Control (MAC) protocol specification (Release 13), (Mar. 2017).
3GPP TSG-RAN WG2 #97bis, Ericsson, "SR and BSR Triggering Aspects", Tdoc R2-1702746, Spokane, USA, Apr. 3-7, 2017.
Notice of Submission of Opinion from Korean Intellectual Property Office in corresponding KR Application No. 10-2018-0048501, dated Oct. 21, 2019.
ETSI:"LTE; Evolved Universal Terrestrial Radio Access (E-UTRA); Medium Access Control (MAC) protocol specification (3GPP TS 36.321 version 13.5.0 Release 13)", Apr. 11, 2017 (Apr. 11, 2017), pp. 1-96, XP055501050, Retrieved from the Internet: URL:http://www.etsi.org/deliver/etsi_ts/13 6300_136399/136321/13.05.00_60/ts_136321v130500p.pdf [retrieved on Aug. 21, 2018].
Samsung: "Discussion on BSR triggers", 3GPP DRAFT; R2-1703576 Discussion on BSR Triggers, 3rd Generation Partnership Project (3GPP), Mobile Competence Centre 650, Route Des Lucioles ; F-06921 Sophia-Antipolis Cedex : France vol. RAN WG2, No. Spokane, USA; Apr. 3, 2017-Apr. 7, 2017, Mar. 25, 2017 (Mar. 25, 2017), XP051254513, Retrieved from the Internet: URL: http://www.3gpp.org/ftp/tsg_ran/WG2_RL2/TSGR2_97bis/Docs/.
Office Action from Taiwan Intellectual Property Office in corresponding TW Application No. 107114338, dated Jan. 10, 2019.
Office Action from Intellectual Property India in corresponding IN Application No. 201814015762, dated May 26, 2020.
ETSI: "LTE; Evolved Universal Terrestrial Radio Access (E-UTRA); Medium Access Control (MAC) protocol specification (3GPP TS 36.321 version 13.5.0 Release 13)", Apr. 11, 2017 (Apr. 11, 2017), pp. 1-96, XP05550105.
Samsung: "Discussion on BSR triggers", 3GPP Draft; R2-1703576 Discussion on BSR Triggers, 3rd Generation Partnership Project (3GPP), Mobile Competence Centre 650, Route Des Lucioles ; F-06921 Sophia-Antipolis Cedex : France vol. RAN WG2, No. Spokane, USA; Apr. 3, 2017-Apr. 7, 2017, Mar. 25, 2017 (Mar. 25, 2017), XP051254513.
European Search Report from corresponding EP Application No. 18169501.6, dated Aug. 30, 2018.
Office Action to the corresponding European Patent Application rendered by the European Patent Office (EPO) dated Aug. 24, 2020, 8 pages.
Office Action to the corresponding Chinese Patent Application rendered by the State Intellectual Property Office (SIPO) dated Feb. 3, 2021, 11 pages.

* cited by examiner

| Index | Buffer Size (BS) value [bytes] | Index | Buffer Size (BS) value [bytes] |
|---|---|---|---|
| 0 | BS = 0 | 32 | 1132 < BS <= 1326 |
| 1 | 0 < BS <= 10 | 33 | 1326 < BS <= 1552 |
| 2 | 10 < BS <= 12 | 34 | 1552 < BS <= 1817 |
| 3 | 12 < BS <= 14 | 35 | 1817 < BS <= 2127 |
| 4 | 14 < BS <= 17 | 36 | 2127 < BS <= 2490 |
| 5 | 17 < BS <= 19 | 37 | 2490 < BS <= 2915 |
| 6 | 19 < BS <= 22 | 38 | 2915 < BS <= 3413 |
| 7 | 22 < BS <= 26 | 39 | 3413 < BS <= 3995 |
| 8 | 26 < BS <= 31 | 40 | 3995 < BS <= 4677 |
| 9 | 31 < BS <= 36 | 41 | 4677 < BS <= 5476 |
| 10 | 36 < BS <= 42 | 42 | 5476 < BS <= 6411 |
| 11 | 42 < BS <= 49 | 43 | 6411 < BS <= 7505 |
| 12 | 49 < BS <= 57 | 44 | 7505 < BS <= 8787 |
| 13 | 57 < BS <= 67 | 45 | 8787 < BS <= 10287 |
| 14 | 67 < BS <= 78 | 46 | 10287 < BS <= 12043 |
| 15 | 78 < BS <= 91 | 47 | 12043 < BS <= 14099 |
| 16 | 91 < BS <= 107 | 48 | 14099 < BS <= 16507 |
| 17 | 107 < BS <= 125 | 49 | 16507 < BS <= 19325 |
| 18 | 125 < BS <= 146 | 50 | 19325 < BS <= 22624 |
| 19 | 146 < BS <= 171 | 51 | 22624 < BS <= 26487 |
| 20 | 171 < BS <= 200 | 52 | 26487 < BS <= 31009 |
| 21 | 200 < BS <= 234 | 53 | 31009 < BS <= 36304 |
| 22 | 234 < BS <= 274 | 54 | 36304 < BS <= 42502 |
| 23 | 274 < BS <= 321 | 55 | 42502 < BS <= 49759 |
| 24 | 321 < BS <= 376 | 56 | 49759 < BS <= 58255 |
| 25 | 376 < BS <= 440 | 57 | 58255 < BS <= 68201 |
| 26 | 440 < BS <= 515 | 58 | 68201 < BS <= 79846 |
| 27 | 515 < BS <= 603 | 59 | 79846 < BS <= 93479 |
| 28 | 603 < BS <= 706 | 60 | 93479 < BS <= 109439 |
| 29 | 706 < BS <= 826 | 61 | 109439 < BS <= 128125 |
| 30 | 826 < BS <= 967 | 62 | 128125 < BS <= 150000 |
| 31 | 967 < BS <=1132 | 63 | BS > 150000 |

FIG. 7 (PRIOR ART)

| Index | Buffer Size (BS) value [bytes] | Index | Buffer Size (BS) value [bytes] |
|---|---|---|---|
| 0 | BS = 0 | 32 | 4940 < BS <= 6074 |
| 1 | 0 < BS <= 10 | 33 | 6074 < BS <= 7469 |
| 2 | 10 < BS <= 13 | 34 | 7469 < BS <= 9185 |
| 3 | 13 < BS <= 16 | 35 | 9185 < BS <= 11294 |
| 4 | 16 < BS <= 19 | 36 | 11294 < BS <= 13888 |
| 5 | 19 < BS <= 23 | 37 | 13888 < BS <= 17077 |
| 6 | 23 < BS <= 29 | 38 | 17077 < BS <= 20999 |
| 7 | 29 < BS <= 35 | 39 | 20999 < BS <= 25822 |
| 8 | 35 < BS <= 43 | 40 | 25822 < BS <= 31752 |
| 9 | 43 < BS <= 53 | 41 | 31752 < BS <= 39045 |
| 10 | 53 < BS <= 65 | 42 | 39045 < BS <= 48012 |
| 11 | 65 < BS <= 80 | 43 | 48012 < BS <= 59039 |
| 12 | 80 < BS <= 98 | 44 | 59039 < BS <= 72598 |
| 13 | 98 < BS <= 120 | 45 | 72598 < BS <= 89272 |
| 14 | 120 < BS <= 147 | 46 | 89272 < BS <= 109774 |
| 15 | 147 < BS <= 181 | 47 | 109774 < BS <= 134986 |
| 16 | 181 < BS <= 223 | 48 | 134986 < BS <= 165989 |
| 17 | 223 < BS <= 274 | 49 | 165989 < BS <= 204111 |
| 18 | 274 < BS <= 337 | 50 | 204111 < BS <= 250990 |
| 19 | 337 < BS <= 414 | 51 | 250990 < BS <= 308634 |
| 20 | 414 < BS <= 509 | 52 | 308634 < BS <= 379519 |
| 21 | 509 < BS <= 625 | 53 | 379519 < BS <= 466683 |
| 22 | 625 < BS <= 769 | 54 | 466683 < BS <= 573866 |
| 23 | 769 < BS <= 945 | 55 | 573866 < BS <= 705666 |
| 24 | 945 < BS <= 1162 | 56 | 705666 < BS <= 867737 |
| 25 | 1162 < BS <= 1429 | 57 | 867737 < BS <= 1067031 |
| 26 | 1429 < BS <= 1757 | 58 | 1067031 < BS <= 1312097 |
| 27 | 1757 < BS <= 2161 | 59 | 1312097 < BS <= 1613447 |
| 28 | 2161 < BS <= 2657 | 60 | 1613447 < BS <= 1984009 |
| 29 | 2657 < BS <= 3267 | 61 | 1984009 < BS <= 2439678 |
| 30 | 3267 < BS <= 4017 | 62 | 2439678 < BS <= 3000000 |
| 31 | 4017 < BS <=4940 | 63 | BS > 3000000 |

FIG. 8 (PRIOR ART)

| Destination index$_1$ | LCG ID$_1$ | Buffer Size$_1$ | Oct 1 |
|---|---|---|---|
| Buffer Size$_1$ | | Destination index$_2$ | Oct 2 |
| LCG ID$_2$ | Buffer Size$_2$ | | Oct 3 |
| ... | | | |
| Destination index$_{N-1}$ | LCG ID$_{N-1}$ | Buffer Size$_{N-1}$ | Oct 1.5*N-2 |
| Buffer Size$_{N-1}$ | | Destination index$_N$ | Oct 1.5*N-1 |
| LCG ID$_N$ | Buffer Size$_N$ | | Oct 1.5*N |

FIG. 9 (PRIOR ART)

| Destination index$_1$ | LCG ID$_1$ | Buffer Size$_1$ | | | Oct 1 |
| Buffer Size$_1$ | | Destination index$_2$ | | | Oct 2 |
| LCG ID$_2$ | Buffer Size$_2$ | | | | Oct 3 |
| ... | | | | | |
| Destination index$_N$ | LCG ID$_N$ | Buffer Size$_N$ | | | Oct 1.5*N-0.5 |
| Buffer Size$_N$ | R | R | R | R | Oct 1.5*N+0.5 |

FIG. 10 (PRIOR ART)

METHOD AND APPARATUS FOR REQUESTING RESOURCE FOR CONTROL ELEMENT TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/490,072 filed on Apr. 26, 2017 and U.S. Provisional Patent Application Ser. No. 62/519,718 filed on Jun. 14, 2017, the entire disclosures of which are incorporated herein in their entirety by reference.

FIELD

This disclosure generally relates to wireless communication networks, and more particularly, to a method and apparatus for requesting resource control element transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment), wherein the UE is allocated with multiple SR (Scheduling Request) configurations by a network node. In one embodiment, the method includes the UE triggering a MAC (Medium Access Control) control element if a timer expires. The method also includes the UE triggering a SR for the MAC control element. The method also includes the UE transmitting the SR based on a first SR configuration of the multiple SR configurations, wherein the first SR configuration is associated with a highest priority logical channel having data available for transmission when the MAC control element is triggered.

BRIEF DESCRIPTION OF THE DRAWINGS

FIG. 7 is a reproduction of Table 6.1.3.1-1 of 3GPP TS 36.321 V14.2.0.

FIG. 8 is a reproduction of Table 6.1.3.1-2 of 3GPP TS 36.321 V14.2.0.

FIG. 9 is a reproduction of FIG. 6.1.3.1a-1 of 3GPP TS 36.321 V14.2.0

FIG. 10 is a reproduction of FIG. 6.1.3.1a-2 of 3GPP TS 36.321 V14.2.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 V14.1.0, "Study on Scenarios and Requirements for Next Generation Access Technologies"; TS 36.300 V14.2.0, "Evolved Universal Terrestrial Radio Access (E-UTRA) and Evolved Universal Terrestrial Radio Access Network (E-UTRAN); Overall description; Stage 2"; TS 36.321 V14.2.0, "Evolved Universal Terrestrial Radio Access (E-UTRA); Medium Access Control (MAC) protocol specification"; TS 36.331 V14.2.0, "Evolved Universal Terrestrial Radio Access (E-UTRA); Radio Resource Control (RRC); Protocol specification"; TS 38.804 v14.0.0, "Study on New Radio Access Technology; Radio Interface Protocol Aspects"; R2-1703796, "Report from NR/LTE Break-Out Session (UP NR, FeD2D, Wearables, Rel-14 corrections)"; and R2-1704030, "Report from LTE Break-Out session", Vice-Chair (InterDigital). The standards and documents listed above are hereby expressly incorporated by reference in their entirety.

Figure 1:
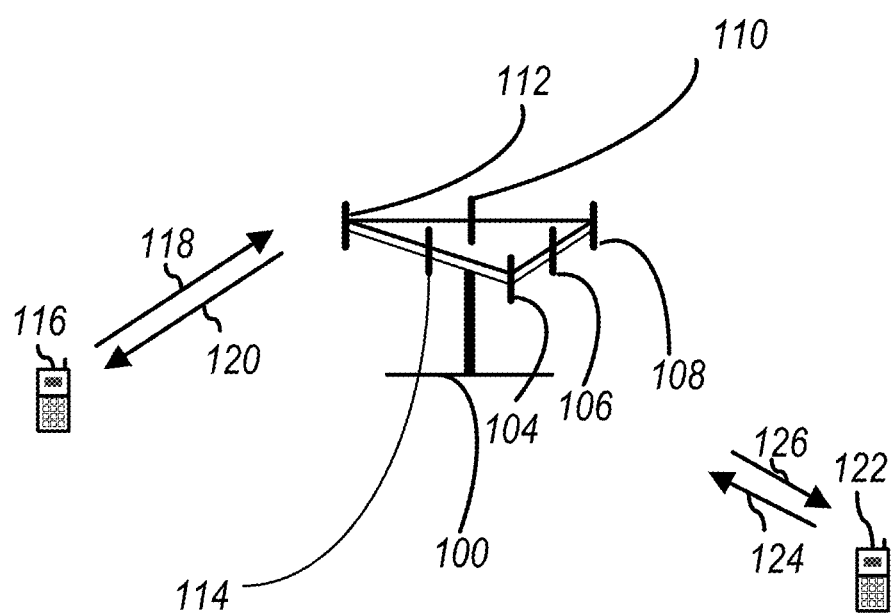
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
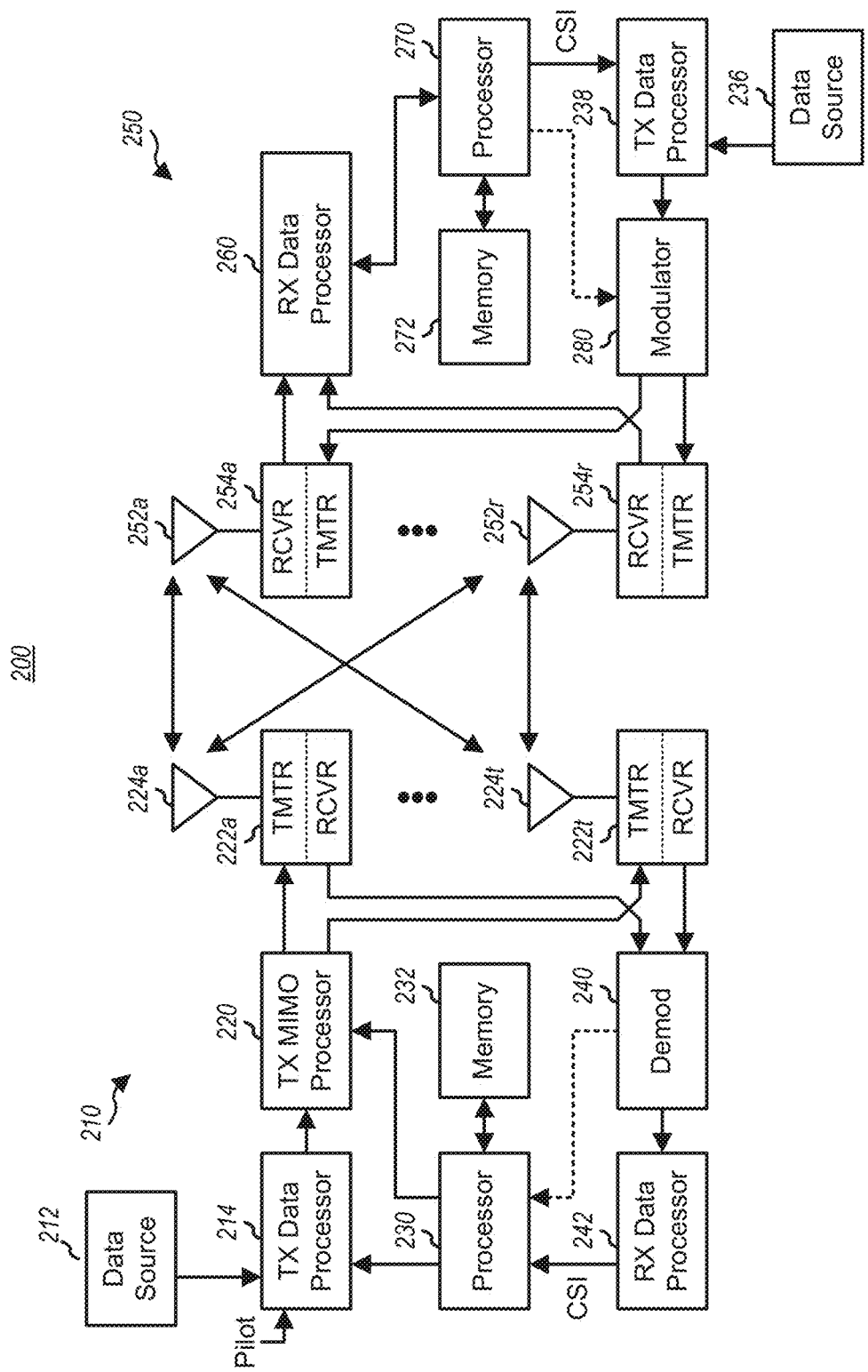
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
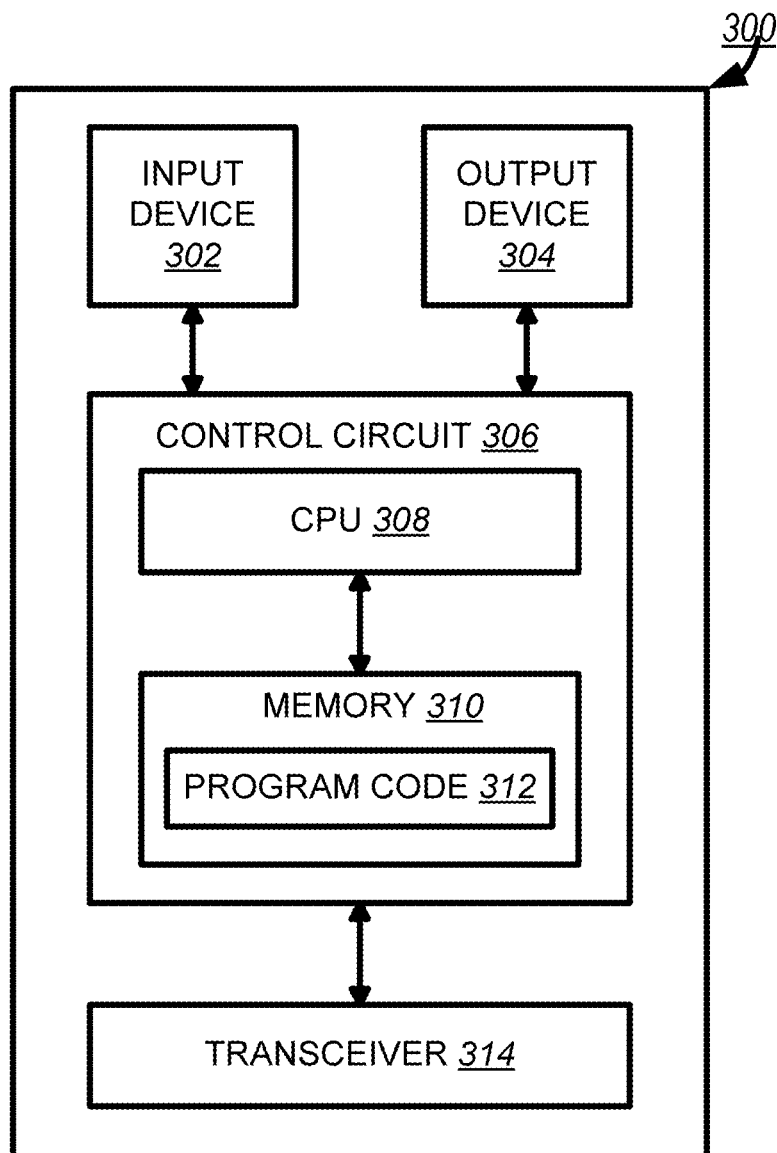
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
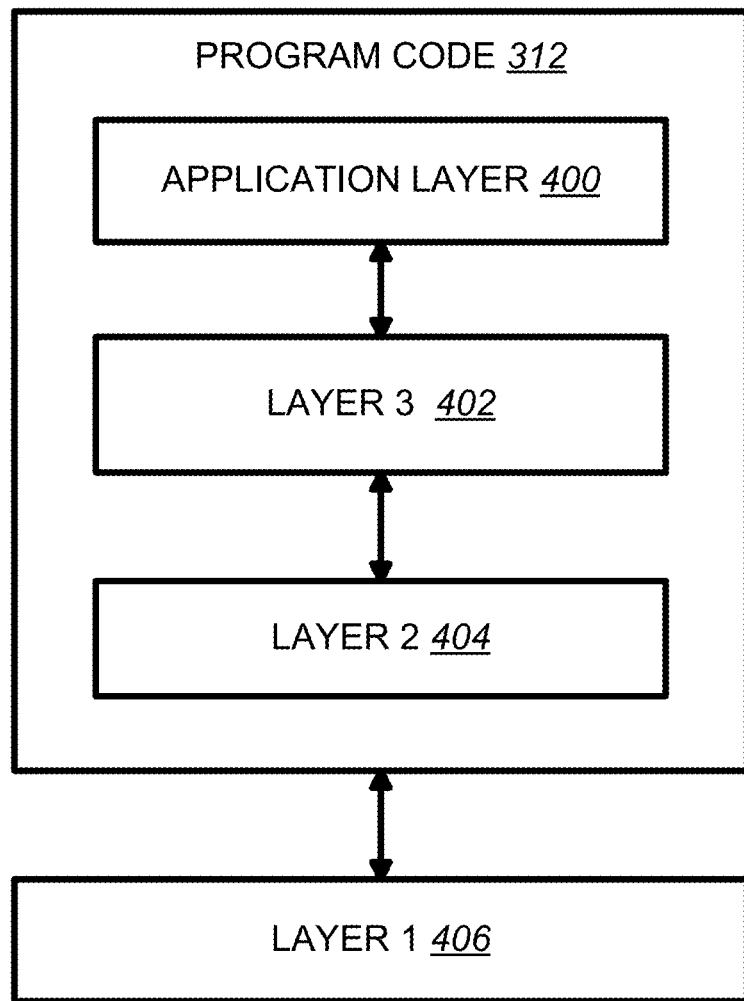
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP standardization activities on next generation (i.e., 5G) access technology have been launched since March 2015. The next generation access technology aims to support the following three families of usage scenarios for satisfying both the urgent market needs and the more long-term requirements set forth by the ITU-R IMT-2020:
  eMBB (enhanced Mobile Broadband)
  mMTC (massive Machine Type Communications)
  URLLC (Ultra-Reliable and Low Latency Communications).

An objective of the 5G study item on new radio access technology is to identify and develop technology components needed for new radio systems which should be able to use any spectrum band ranging at least up to 100 GHz. Supporting carrier frequencies up to 100 GHz brings a number of challenges in the area of radio propagation. As the carrier frequency increases, the path loss also increases.

Scheduling Request (SR) procedure and Buffer Status Report (BSR) procedure are designed for UE to request uplink resource. On the other hand, Sidelink Buffer Status Report procedure is designed for UE to request dedicated sidelink resource. Since Sidelink BSR or BSR shall be transmitted to base station, the UE will trigger SR to request uplink resource for transmitting Sidelink BSR or BSR if needed. Detail procedures are described in 3GPP TS 36.321 as follows:

5.4.4 Scheduling Request

The Scheduling Request (SR) is used for requesting UL-SCH resources for new transmission. When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or, if all pending SR(s) are triggered by Sidelink BSR, when a MAC PDU is assembled and this PDU includes a Sidelink BSR which contains buffer status up to (and including) the last event that triggered a Sidelink BSR (see subclause 5.14.1.4), or, if all pending SR(s) are triggered by Sidelink BSR, when upper layers configure autonomous resource selection, or when the UL grant(s) can accommodate all pending data available for transmission.

If an SR is triggered and there is no other SR pending, the MAC entity shall set the SR_COUNTER to 0.

As long as one SR is pending, the MAC entity shall for each TTI:
  if no UL-SCH resources are available for a transmission in this TTI:
    if the MAC entity has no valid PUCCH resource for SR configured in any TTI and if rach-Skip for the MCG MAC entity or rach-SkipSCG for the SCG MAC entity is not configured: initiate a Random Access procedure (see subclause 5.1) on the SpCell and cancel all pending SRs;
    else if the MAC entity has at least one valid PUCCH resource for SR configured for this TTI and if this TTI is not part of a measurement gap or Sidelink Discovery Gap for Transmission and if sr-Prohibit-Timer is not running:

if SR_COUNTER<dsr-TransMax:
  increment SR_COUNTER by 1;
  instruct the physical layer to signal the SR on one valid PUCCH resource for SR;
  start the sr-ProhibitTimer.
else:
  notify RRC to release PUCCH for all serving cells;
  notify RRC to release SRS for all serving cells;
  clear any configured downlink assignments and uplink grants;
  initiate a Random Access procedure (see subclause 5.1) on the SpCell and cancel all pending SRs.

NOTE: The selection of which valid PUCCH resource for SR to signal SR on when the MAC entity has more than one valid PUCCH resource for SR in one TTI is left to UE implementation.

NOTE: SR_COUNTER is incremented for each SR bundle. sr-ProhibitTimer is started in the first TTI of an SR bundle.

5.4.5 Buffer Status Reporting

The Buffer Status reporting procedure is used to provide the serving eNB with information about the amount of data available for transmission in the UL buffers associated with the MAC entity. RRC controls BSR reporting by configuring the three timers periodicBSR-Timer, retxBSR-Timer and logicalChannelSR-ProhibitTimer and by, for each logical channel, optionally signalling logicalChannelGroup which allocates the logical channel to an LCG [8].

For the Buffer Status reporting procedure, the MAC entity shall consider all radio bearers which are not suspended and may consider radio bearers which are suspended.

For NB-IoT the Long BSR is not supported and all logical channels belong to one LCG.

A Buffer Status Report (BSR) shall be triggered if any of the following events occur:
  UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";
  UL resources are allocated and number of padding bits is equal to or larger than the size of the Buffer Status Report MAC control element plus its subheader, in which case the BSR is referred below to as "Padding BSR";
  retxBSR-Timer expires and the MAC entity has data available for transmission for any of the logical channels which belong to a LCG, in which case the BSR is referred below to as "Regular BSR";
  periodicBSR-Timer expires, in which case the BSR is referred below to as "Periodic BSR".

For Regular BSR:
  if the BSR is triggered due to data becoming available for transmission for a logical channel for which logicalChannelSR-ProhibitTimer is configured by upper layers:
    start or restart the logicalChannelSR-ProhibitTimer;
  else:
    if running, stop the logicalChannelSR-ProhibitTimer.

For Regular and Periodic BSR:
  if more than one LCG has data available for transmission in the TTI where the BSR is transmitted: report Long BSR;
  else report Short BSR.

For Padding BSR:
  if the number of padding bits is equal to or larger than the size of the Short BSR plus its subheader but smaller than the size of the Long BSR plus its subheader:
    if more than one LCG has data available for transmission in the TTI where the BSR is transmitted: report Truncated BSR of the LCG with the highest priority logical channel with data available for transmission;
    else report Short BSR.
  else if the number of padding bits is equal to or larger than the size of the Long BSR plus its subheader, report Long BSR.

For NB-IoT:
  if rai-Activation is configured, and a buffer size of zero bytes has been triggered for the BSR, and the UE may have more data to send or receive in the near future (FFS):
    cancel any pending BSR.

If the Buffer Status reporting procedure determines that at least one BSR has been triggered and not cancelled:
  if the MAC entity has UL resources allocated for new transmission for this TTI:
    instruct the Multiplexing and Assembly procedure to generate the BSR MAC control element(s);
    start or restart periodicBSR-Timer except when all the generated BSRs are Truncated BSRs;
    start or restart retxBSR-Timer.
  else if a Regular BSR has been triggered and logicalChannelSR-ProhibitTimer is not running:
    if an uplink grant is not configured or the Regular BSR was not triggered due to data becoming available for transmission for a logical channel for which logical channel SR masking (logicalChannelSR-Mask) is setup by upper layers:
      a Scheduling Request shall be triggered.

A MAC PDU shall contain at most one MAC BSR control element, even when multiple events trigger a BSR by the time a BSR can be transmitted in which case the Regular BSR and the Periodic BSR shall have precedence over the padding BSR.

The MAC entity shall restart retxBSR-Timer upon indication of a grant for transmission of new data on any UL-SCH.

All triggered BSRs shall be cancelled in case the UL grant(s) in this TTI can accommodate all pending data available for transmission but is not sufficient to additionally accommodate the BSR MAC control element plus its subheader. All triggered BSRs shall be cancelled when a BSR is included in a MAC PDU for transmission.

The MAC entity shall transmit at most one Regular/Periodic BSR in a TTI. If the MAC entity is requested to transmit multiple MAC PDUs in a TTI, it may include a padding BSR in any of the MAC PDUs which do not contain a Regular/Periodic BSR.

All BSRs transmitted in a TTI always reflect the buffer status after all MAC PDUs have been built for this TTI. Each LCG shall report at the most one buffer status value per TTI and this value shall be reported in all BSRs reporting buffer status for this LCG.

NOTE: A Padding BSR is not allowed to cancel a triggered Regular/Periodic BSR, except for NB-IoT. A Padding BSR is triggered for a specific MAC PDU only and the trigger is cancelled when this MAC PDU has been built.

[ . . . ]

5.14.1.4 Buffer Status Reporting

The sidelink Buffer Status reporting procedure is used to provide the serving eNB with information about the amount of sidelink data available for transmission in the SL buffers associated with the MAC entity. RRC controls BSR reporting for the sidelink by configuring the two timers periodic-BSR-TimerSL and retx-BSR-TimerSL. Each sidelink logical channel belongs to a ProSe Destination. Each sidelink logical channel is allocated to an LCG depending on the priority of the sidelink logical channel and the mapping between LCG ID and priority which is provided by upper layers in logicalChGroupinfoList [8]. LCG is defined per ProSe Destination.

A sidelink Buffer Status Report (BSR) shall be triggered if any of the following events occur:

if the MAC entity has a configured SL-RNTI or a configured SL-V-RNTI:

SL data, for a sidelink logical channel of a ProSe Destination, becomes available for transmission in the RLC entity or in the PDCP entity (the definition of what data shall be considered as available for transmission is specified in [3] and [4] respectively) and either the data belongs to a sidelink logical channel with higher priority than the priorities of the sidelink logical channels which belong to any LCG belonging to the same ProSe Destination and for which data is already available for transmission, or there is currently no data available for transmission for any of the sidelink logical channels belonging to the same ProSe Destination, in which case the Sidelink BSR is referred below to as "Regular Sidelink BSR";

UL resources are allocated and number of padding bits remaining after a Padding BSR has been triggered is equal to or larger than the size of the Sidelink BSR MAC control element containing the buffer status for at least one LCG of a ProSe Destination plus its subheader, in which case the Sidelink BSR is referred below to as "Padding Sidelink BSR";

retx-BSR-TimerSL expires and the MAC entity has data available for transmission for any of the sidelink logical channels, in which case the Sidelink BSR is referred below to as "Regular Sidelink BSR";

periodic-BSR-TimerSL expires, in which case the Sidelink BSR is referred below to as "Periodic Sidelink BSR";

else:

An SL-RNTI or an SL-V-RNTI is configured by upper layers and SL data is available for transmission in the RLC entity or in the PDCP entity (the definition of what data shall be considered as available for transmission is specified in [3] and [4] respectively), in which case the Sidelink BSR is referred below to as "Regular Sidelink BSR".

For Regular and Periodic Sidelink BSR:

if the number of bits in the UL grant is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

For Padding Sidelink BSR:

if the number of padding bits remaining after a Padding BSR has been triggered is equal to or larger than the size of a Sidelink BSR containing buffer status for all LCGs having data available for transmission plus its subheader:

report Sidelink BSR containing buffer status for all LCGs having data available for transmission;

else report Truncated Sidelink BSR containing buffer status for as many LCGs having data available for transmission as possible, taking the number of bits in the UL grant into consideration.

If the Buffer Status reporting procedure determines that at least one Sidelink BSR has been triggered and not cancelled:

if the MAC entity has UL resources allocated for new transmission for this TTI and the allocated UL resources can accommodate a Sidelink BSR MAC control element plus its subheader as a result of logical channel prioritization:

instruct the Multiplexing and Assembly procedure to generate the Sidelink BSR MAC control element(s);

start or restart periodic-BSR-TimerSL except when all the generated Sidelink BSRs are Truncated Sidelink BSRs;

start or restart retx-BSR-TimerSL;

else if a Regular Sidelink BSR has been triggered:

if an uplink grant is not configured:

a Scheduling Request shall be triggered.

A MAC PDU shall contain at most one Sidelink BSR MAC control element, even when multiple events trigger a Sidelink BSR by the time a Sidelink BSR can be transmitted in which case the Regular Sidelink BSR and the Periodic Sidelink BSR shall have precedence over the padding Sidelink BSR.

The MAC entity shall restart retx-BSR-TimerSL upon reception of an SL grant.

All triggered regular Sidelink BSRs shall be cancelled in case the remaining configured SL grant(s) valid for this SC Period can accommodate all pending data available for transmission in sidelink communication or in case the remaining configured SL grant(s) valid can accommodate all pending data available for transmission in V2X sidelink communication. All triggered Sidelink BSRs shall be cancelled in case the MAC entity has no data available for transmission for any of the sidelink logical channels. All triggered Sidelink BSRs shall be cancelled when a Sidelink BSR (except for Truncated Sidelink BSR) is included in a MAC PDU for transmission. All triggered Sidelink BSRs shall be cancelled, and retx-BSR-TimerSL and periodic-BSR-TimerSL shall be stopped, when upper layers configure autonomous resource selection.

The MAC entity shall transmit at most one Regular/Periodic Sidelink BSR in a TTI. If the MAC entity is requested to transmit multiple MAC PDUs in a TTI, it may include a padding Sidelink BSR in any of the MAC PDUs which do not contain a Regular/Periodic Sidelink BSR.

All Sidelink BSRs transmitted in a TTI always reflect the buffer status after all MAC PDUs have been built for this TTI. Each LCG shall report at the most one buffer status value per TTI and this value shall be reported in all Sidelink BSRs reporting buffer status for this LCG.

NOTE: A Padding Sidelink BSR is not allowed to cancel a triggered Regular/Periodic Sidelink BSR. A Padding Sidelink BSR is triggered for a specific MAC PDU only and the trigger is cancelled when this MAC PDU has been built.

6.1.3.1 Buffer Status Report MAC Control Elements

Figure 6:
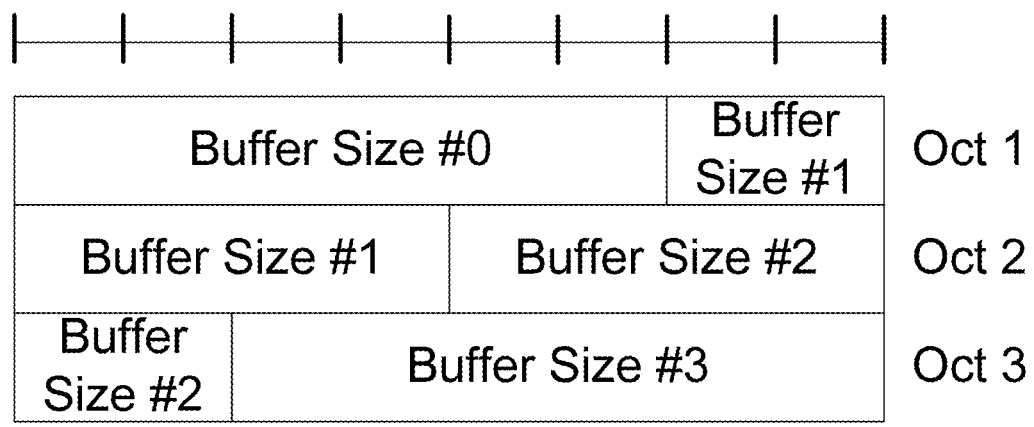
FIG. 6 is a reproduction of FIG. 6.1.3.1-2 of 3GPP TS 36.321 V14.2.0.

Buffer Status Report (BSR) MAC control elements consist of either:
- Short BSR and Truncated BSR format: one LCG ID field and one corresponding Buffer Size field (FIG. 6.1.3.1-1); or
- Long BSR format: four Buffer Size fields, corresponding to LCG IDs #0 through #3 (FIG. 6.1.3.1-2).

The BSR formats are identified by MAC PDU subheaders with LCIDs as specified in table 6.2.1-2.

The fields LCG ID and Buffer Size are defined as follow:
- LCG ID: The Logical Channel Group ID field identifies the group of logical channel(s) which buffer status is being reported. The length of the field is 2 bits. For NB-IoT, the LCG ID is set to #0.
- Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.

Figure 5:
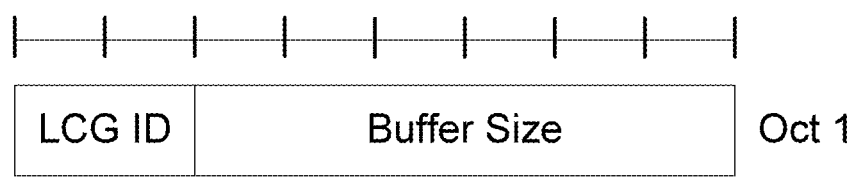
FIG. 5 is a reproduction of FIG. 6.1.3.1-1 of 3GPP TS 36.321 V14.2.0.

[FIG. 6.1.3.1-1 of 3GPP TS 36.321 V14.2.0, entitled "Short BSR and Truncated BSR MAC control element", is reproduced as FIG. 5]

[FIG. 6.1.3.1-2 of 3GPP TS 36.321 V14.2.0, entitled "Long BSR MAC control element", is reproduced as FIG. 6]

[Table 6.1.3.1-1 of 3GPP TS 36.321 V14.2.0, entitled "Buffer size levels for BSR", is reproduced as FIG. 7]

[Table 6.1.3.1-2 of 3GPP TS 36.321 V14.2.0, entitled "Extended Buffer size levels for BSR", is reproduced as FIG. 8]

6.1.3.1a Sidelink BSR MAC Control Elements

Sidelink BSR and Truncated Sidelink BSR MAC control elements consist of one Destination Index field, one LCG ID field and one corresponding Buffer Size field per reported target group.

The Sidelink BSR MAC control elements are identified by MAC PDU subheaders with LCIDs as specified in table 6.2.1-2. They have variable sizes.

For each included group, the fields are defined as follows (FIGS. 6.1.3.1a-1 and 6.1.3.1a-2):
- Destination Index: The Destination Index field identifies the ProSe Destination or the destination for V2X sidelink communication. The length of this field is 4 bits. The value is set to the index of the destination reported in destinationInfoList or v2x-destinationInfoList and if multiple such lists are reported, the value is indexed sequentially across all the lists in the same order as specified in [8];
- LCG ID: The Logical Channel Group ID field identifies the group of logical channel(s) which buffer status is being reported. The length of the field is 2 bits;
- Buffer Size: The Buffer Size field identifies the total amount of data available across all logical channels of a LCG of a ProSe Destination after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. The values taken by the Buffer Size field are shown in Table 6.1.3.1-1;
- R: Reserved bit, set to "0".

Buffer Sizes of LCGs are included in decreasing order of the highest priority of the sidelink logical channel belonging to the LCG irrespective of the value of the Destination Index field.

[FIG. 6.1.3.1a-1 of 3GPP TS 36.321 V14.2.0, entitled "Sidelink BSR and Truncated Sidelink BSR MAC control element for even N", is reproduced as FIG. 9]

[FIG. 6.1.3.1a-2 of 3GPP TS 36.321 V14.2.0, entitled "Sidelink BSR and Truncated Sidelink BSR MAC control element for odd N", is reproduced as FIG. 10]

Logical channel prioritization (LCP) procedure and multiplexing of MAC control element and MAC SDUs are described in 3GPP TS 36.321 as follows:

5.4.3 Multiplexing and Assembly 5.4.3.1 Logical Channel Prioritization

The Logical Channel Prioritization procedure is applied when a new transmission is performed. RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD). For NB-IoT, prioritisedBitRate, bucketSizeDuration and the corresponding steps of the Logical Channel Prioritisation procedure (i.e., Step 1 and Step 2 below) are not applicable.

The MAC entity shall maintain a variable $B_j$ for each logical channel j. $B_j$ shall be initialized to zero when the related logical channel is established, and incremented by the product PBR×TTI duration for each TTI, where PBR is Prioritized Bit Rate of logical channel j. However, the value of $B_j$ can never exceed the bucket size and if the value of $B_j$ is larger than the bucket size of logical channel j, it shall be set to the bucket size. The bucket size of a logical channel is equal to PBR×BSD, where PBR and BSD are configured by upper layers.

The MAC entity shall perform the following Logical Channel Prioritization procedure when a new transmission is performed:

The MAC entity shall allocate resources to the logical channels in the following steps:
- Step 1: All the logical channels with $B_j$>0 are allocated resources in a decreasing priority order. If the PBR of a logical channel is set to "infinity", the MAC entity shall allocate resources for all the data that is available for transmission on the logical channel before meeting the PBR of the lower priority logical channel(s);
- Step 2: the MAC entity shall decrement $B_j$ by the total size of MAC SDUs served to logical channel j in Step 1;
- NOTE: The value of $B_j$ can be negative.
- Step 3: if any resources remain, all the logical channels are served in a strict decreasing priority order (regardless of the value of $B_j$) until either the data for that logical channel or the UL grant is exhausted, whichever comes first. Logical channels configured with equal priority should be served equally.

The UE shall also follow the rules below during the scheduling procedures above:
  the UE should not segment an RLC SDU (or partially transmitted SDU or retransmitted RLC PDU) if the whole SDU (or partially transmitted SDU or retransmitted RLC PDU) fits into the remaining resources of the associated MAC entity;
  if the UE segments an RLC SDU from the logical channel, it shall maximize the size of the segment to fill the grant of the associated MAC entity as much as possible;
  the UE should maximise the transmission of data.
  if the MAC entity is given an UL grant size that is equal to or larger than 4 bytes while having data available for transmission, the MAC entity shall not transmit only padding BSR and/or padding (unless the UL grant size is less than 7 bytes and an AMD PDU segment needs to be transmitted);
  for transmissions on serving cells operating according to Frame Structure Type 3, the MAC entity shall only consider logical channels for which laa-Allowed has been configured.

The MAC entity shall not transmit data for a logical channel corresponding to a radio bearer that is suspended (the conditions for when a radio bearer is considered suspended are defined in [8]).

If the MAC PDU includes only the MAC CE for padding BSR or periodic BSR with zero MAC SDUs and there is no aperiodic CSI requested for this TTI [2], the MAC entity shall not generate a MAC PDU for the HARQ entity in the following cases:
  in case the MAC entity is configured with skip UplinkTx-Dynamic and the grant indicated to the HARQ entity was addressed to a C-RNTI; or
  in case the MAC entity is configured with skipUplinkTxSPS and the grant indicated to the HARQ entity is a configured uplink grant;

For the Logical Channel Prioritization procedure, the MAC entity shall take into account the following relative priority in decreasing order:
  MAC control element for C-RNTI or data from UL-CCCH;
  MAC control element for SPS confirmation;
  MAC control element for BSR, with exception of BSR included for padding;
  MAC control element for PHR, Extended PHR, or Dual Connectivity PHR;
  MAC control element for Sidelink BSR, with exception of Sidelink BSR included for padding;
  data from any Logical Channel, except data from UL-CCCH;
  MAC control element for BSR included for padding;
  MAC control element for Sidelink BSR included for padding.
    NOTE: When the MAC entity is requested to transmit multiple MAC PDUs in one TTI, steps 1 to 3 and the associated rules may be applied either to each grant independently or to the sum of the capacities of the grants. Also the order in which the grants are processed is left up to UE implementation. It is up to the UE implementation to decide in which MAC PDU a MAC control element is included when MAC entity is requested to transmit multiple MAC PDUs in one TTI. When the UE is requested to generate MAC PDU(s) in two MAC entities in one TTI, it is up to UE implementation in which order the grants are processed.

5.4.3.2 Multiplexing of MAC Control Elements and MAC SDUs

The MAC entity shall multiplex MAC control elements and MAC SDUs in a MAC PDU according to subclauses 5.4.3.1 and 6.1.2.

Configuration of logical channel controlled by RRC is described in 3GPP TS 36.331 as follows:
LogicalChannelConfig
  The IE LogicalChannelConfig is used to configure the logical channel parameters.

LogicalChannelConfig information element

```
-- ASN1START
LogicalChannelConfig ::=    SEQUENCE {
    ul-SpecificParameters       SEQUENCE {
        priority                    INTEGER (1..16),
        prioritisedBitRate          ENUMERATED {
                                        kBps0, kBps8, kBps16, kBps32, kBps64,
                                        kBps128, kBps256, infinity, kBps512-v1020,
                                        kBps1024-v1020, kBps2048-v1020, spare5,
                                        spare4, spare3, spare2, spare1 },
        bucketSizeDuration          ENUMERATED {
                                        ms50, ms100, ms150, ms300, ms500, ms1000, spare2,
                                        spare1},
        logicalChannelGroup         INTEGER (0..3)      OPTIONAL         --Need OR
    }                           OPTIONAL,                                -- Cond UL
    ...,
    [[  logicalChannelSR-Mask-r9    ENUMERATED {setup}   OPTIONAL        -- Cond SRmask
    ]],
    [[  logicalChannelSR-Prohibit-r12   BOOLEAN      OPTIONAL            --Need ON
    ]],
    [[  laa-Allowed-r14                 BOOLEAN      OPTIONAL            --Need ON
    ]],
}
-- ASN1STOP
```

| LogicalChannelConfig field descriptions |
| --- |
| bucketSizeDuration |
| Bucket Size Duration for logical channel prioritization in TS 36.321 [6]. Value in milliseconds. Value ms50 corresponds to 50 ms, ms100 corresponds to 100 ms and so on. |
| laa-Allowed |
| Indicates whether the data of a logical channel is allowed to be transmitted via UL of LAA SCells. Value TRUE indicates that the logical channel is allowed to be sent via UL of LAA SCells. Value FALSE indicates that the logical channel is not allowed to be sent via UL of LAA SCells. |
| logicalChannelGroup |
| Mapping of logical channel to logical channel group for BSR reporting in TS 36.321 [6]. |
| logicalChannelSR-Mask |
| Controlling SR triggering on a logical channel basis when an uplink grant is configured. See TS 36.321 [6]. |
| logicalChannelSR-Prohibit |
| Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6]. |
| prioritisedBitRate |
| Prioritized Bit Rate for logical channel prioritization in TS 36.321 [6]. Value in kilobytes/second. Value kBps0 corresponds to 0 kB/second, kBps8 corresponds to 8 kB/second, kBps16 corresponds to 16 kB/second and so on. Infinity is the only applicable value for SRB1 and SRB2 priority |
| Logical channel priority in TS 36.321 [6]. Value is an integer. |

| Conditional presence | Explanation |
| --- | --- |
| SRmask | The field is optionally present if ul-SpecificParameters is present, need OR; otherwise it is not present. |
| UL | The field is mandatory present for UL logical channels; otherwise it is not present. |

The SR and BSR related RRC configurations are described in 3GPP TS 36.331 as follows:

MAC-MainConfig

The IE MAC-MainConfig is used to specify the MAC main configuration for signalling and data radio bearers. All MAC main configuration parameters can be configured independently per Cell Group (i.e. MCG or SCG), unless explicitly specified otherwise.

MAC-MainConfig information element

```
-- ASN1START
MAC-MainConfig ::=              SEQUENCE {
    ul-SCH-Config                   SEQUENCE {
        maxHARQ-Tx                      ENUMERATED {
                                            n1, n2, n3, n4, n5, n6, n7, n8,
                                            n10, n12, n16, n20, n24, n28,
                                            spare2, spare1}             OPTIONAL,   -- Need ON
        periodicBSR-Timer               PeriodicBSR-Timer-r12       OPTIONAL,   -- Need ON
        retxBSR-Timer                   RetxBSR-Timer-r12,
        ttiBundling                     BOOLEAN
    }                                                                       OPTIONAL,   -- Need ON
    drx-Config                      DRX-Config                          OPTIONAL,   -- Need ON
    timeAlignmentTimerDedicated     TimeAlignmentTimer,
    phr-Config                      CHOICE {
        release                         NULL,
        setup                           SEQUENCE {
            periodicPHR-Timer               ENUMERATED {sf10, sf20, sf50, sf100, sf200,
                                                        sf500, sf1000, infinity},
            prohibitPHR-Timer               ENUMERATED fsf0, sf10, sf20, sf50, sf100,
                                                        sf200, sf500, 5f1000},
            dl-PathlossChange               ENUMERATED {dB1, dB3, dB6, infinity}
        }
    }                                                                       OPTIONAL,   -- Need ON
    ...,
    [[  sr-ProhibitTimer-r9             INTEGER (0..7)      OPTIONAL            -- Need ON
    ]],
    [[  mac-MainConfig-v1020            SEQUENCE {
            sCellDeactivationTimer-r10      ENUMERATED {
                                                rf2, rf4, rf8, rf16, rf32, rf64, rf128,
                                                spare}                  OPTIONAL,   -- NeedOP
            extendedBSR-Sizes-r10           ENUMERATED {setup}          OPTIONAL,   -- Need OR
```

| MAC-MainConfig information element |
| --- |

```
            extendedPHR-r10              ENUMERATED {setup}        OPTIONAL   -- Need OR
        }                                                          OPTIONAL -- Need ON
    ]],
    [[  stag-ToReleaseList-r11           STAG-ToReleaseList-r11  OPTIONAL,  -- Need ON
        stag-ToAddModList-r11            STAG-ToAddModList-r11     OPTIONAL,     -- Need ON
        drx-Config-v1130                 DRX-Config-v1130          OPTIONAL      -- Need ON
    ]],
    [[  e-HARQ-Pattern-r12               BOOLEAN                   OPTIONAL, -- Need ON
        dualConnectivityPHR              CHOICE {
            release                          NULL,
            setup                            SEQUENCE {
                phr-ModeOtherCG-r12              ENUMERATED {real, virtual}
            }
        }                                                          OPTIONAL, -- Need ON
        logicalChannelSR-Config-r12      CHOICE {
            release                          NULL,
            setup                            SEQUENCE {
                logicalChannelSR-ProhibitTimer-r12   ENUMERATED {5f20, sf40, sf64, sf128, sf512, sf1024,
sf2560,
spare1}
            }
        }                                                          OPTIONAL   -- Need ON
    ]],
    [[  drx-Config-v1310                 DRX-Config-v1310          OPTIONAL,   -- Need ON
        extendedPHR2-r13                 BOOLEAN     OPTIONAL,       --Need ON
        eDRX-Config-CycleStartOffset-r13 CHOICE {
            release                          NULL,
            setup
                                             CHOICE {
                sf5120                           INTEGER(0..1),
                sf10240                          INTEGER(0..3)
            }
        }                                OPTIONAL    -- NeedON
    ]],
    [[  drx-Config-r13                   CHOICE{
            release                          NULL,
            setup                            DRX-Config-r13
        }                                                          OPTIONAL   -- NeedON
    ]],
    [[  skipUplinkTx-r14                 CHOICE {
            release                          NULL,
            setup                            SEQUENCE {
                skipUplinkTxSPS-r14              ENUMERATED{true}        OPTIONAL,  -- Need OR
                skipUplinkTxDynamic-r14          ENUMERATED{true}        OPTIONAL   -- Need OR
            }
        }                                                          OPTIONAL   -- NeedON
    ]],
    [[  dataInactivityTimerConfig-r14    CHOICE {
            release                          NULL,
            setup                            SEQUENCE {
                dataInactivityTimer-r14          DataInactivityTimer-r14
            }
        }                                                          OPTIONAL    -- Need ON
    ]]
}
MAC-MainConfigSCellr11 ::=           SEQUENCE {
    stag-Id-r11                          STAG-Id-r11    OPTIONAL,     -- Need OP
    ...
}
DRX-Config ::=                       CHOICE {
    release                              NULL,
    setup                                SEQUENCE {
        onDurationTimer                      ENUMERATED {
                                                 psf1, psf2, psf3, psf4, psf5, psf6,
                                                 psf8, psf10, psf20, psf30, psf40,
                                                 psf50, psf60, psf80, psf100,
                                                 psf200},
        drx-InactivityTimer                  ENUMERATED {
                                                 psf1, psf2, psf3, psf4, psf5, psf6,
                                                 psf8, psf10, psf20, psf30, psf40,
                                                 psf50, psf60, psf80, psf100,
                                                 psf200, psf300, psf500, psf750,
                                                 psf1280, psf1920, psf2560, psf0-v1020,
                                                 spare9, spare8, spare7, spare6,
                                                 spare5, spare4, spare3, spare2,
                                                 spare1},
```

| MAC-MainConfig information element |
| --- |

```
    drx-RetransmissionTimer         ENUMERATED {
                                        psf1, psf2, psf4, psf6, psf8, psf16,
                                        psf24, psf33},
    longDRX-CycleStartOffset        CHOICE {
      sf10                              INTEGER(0..9),
      sf20                              INTEGER(0..19),
      sf32                              INTEGER(0..31),
      sf40                              INTEGER(0..39),
      sf64                              INTEGER(0..63),
      sf80                              INTEGER(0..79),
      sf128                             INTEGER(0..127),
      sf160                             INTEGER(0..159),
      sf256                             INTEGER(0..255),
      sf320                             INTEGER(0..319),
      sf512                             INTEGER(0..511),
      sf640                             INTEGER(0..639),
      sf1024                             INTEGER(0..1023),
      sf1280                             INTEGER(0..1279),
      sf2048                             INTEGER(0..2047),
      sf2560                             INTEGER(0..2559)
    },
    shortDRX                        SEQUENCE {
      shortDRX-Cycle                    ENUMERATED {
                                          sf2, sf5, sf8, sf10, sf16, sf20,
                                          sf32, sf40, sf64, sf80, sf128, sf160,
                                          sf256, sf320, sf512, sf640},
      drxShortCycleTimer              INTEGER (1..16)
    } OPTIONAL                                                      -- Need OR
  }
}
DRX-Config-v1130 ::=              SEQUENCE {
  drx-RetransmissionTimer-v1130     ENUMERATED {psf0-v1130}  OPTIONAL,    -- Need OR
  longDRX-CycleStartOffset-v1130    CHOICE {
    sf60-v1130                        INTEGER(0..59),
    sf70-v1130                        INTEGER(0..69)
  }                                                          OPTIONAL,    -- Need OR
  shortDRX-Cycle-v1130              ENUMERATED {sf4-v1130}   OPTIONAL     -- Need OR
}
DRX-Config-v1310 ::=              SEQUENCE {
  longDRX-CycleStartOffset-v1310    SEQUENCE {
    sf60-v1310                        INTEGER(0..59)
  }                                                          OPTIONAL     -- Need OR
}
DRX-Config-r13 ::=                SEQUENCE {
  onDurationTimer-v1310             ENUMERATED {psf300, psf400, psf500, psf600,
                                      psf800, psf1000, psf1200, psf1600}
                                    OPTIONAL,    -- Need OR
  drx-RetransmissionTimer-v1310     ENUMERATED {psf40, psf64, psf80, psf96, psf112,
                                      psf128, psf160, psf320}
                                    OPTIONAL,    --Need OR
  drx-ULRetransmissionTimer-r13     ENUMERATED {psf0, psf1, psf2, psf4, psf6, psf8, psf16,
                                      psf24, psf33, psf40, psf64, psf80, psf96,
                                      psf112, psf128, psf160, psf320}
                                    OPTIONAL     -- Need OR
}
PeriodicBSR-Timer-r12 ::=         ENUMERATED {
                                    sf5, sf10, sf16, sf20, sf32, sf40, sf64, sf80,
                                    sf128, sf160, sf320, sf640, sf1280, sf2560,
                                    infinity, spare1}
RetxBSR-Timer-r12 ::=             ENUMERATED {
                                    sf320, sf640, sf1280, sf2560, sf5120,
                                    sf10240, spare2, spare1}
STAG-ToReleaseList-r11 ::= SEQUENCE (STZE (1..maxSTAG-r11)) OF STAG-Id-r11
STAG-ToAddModList-r11 ::=   SEQUENCE (SIZE (1..maxSTAG-r11)) OF STAG-ToAddMod-r11
STAG-ToAddMod-r11 ::=       SEQUENCE {
  stag-Id-r11                       STAG-Id-r11,
  timeAlignmentTimerSTAG-r11        TimeAlignmentTimer,
  ...
}
STAG-Id-r11::=              INTEGER (1..maxSTAG-r11)
-- ASN1STOP
```

| MAC-MainConfig field descriptions |
| --- |
| dl-PathlossChange |
| DL Pathloss Change and the change of the required power backoff due to power management (as allowed by P-MPRc [42]) for PHR reporting in TS 36.321 [6]. Value in dB. Value dB1 corresponds to 1 dB, dB3 corresponds to 3 dB and so on. The same value applies for each serving cell (although the associated functionality is performed independently for each cell). |
| drx-Config |
| Used to configure DRX as specified in TS 36.321 [6]. E-UTRAN configures the values in DRX-Config-v1130 only if the UE indicates support for IDC indication. E-UTRAN configures drx-Config-v1130, drx-Config-v1310 and drx-Config-r13 only if drx-Config (without suffix) is configured. E-UTRAN configures drx-Config-r13 only if UE supports CE or if the UE is configured with uplink of an LAA SCell. |
| drx-InactivityTimer |
| Timer for DRX in TS 36.321 [6]. Value in number of PDCCH sub-frames. Value psf0 corresponds to 0 PDCCH sub-frame and behaviour as specified in 7.3.2 applies, value psf1 corresponds to 1 PDCCH sub-frame, psf2 corresponds to 2 PDCCH sub-frames and so on. |
| drx-RetransmissionTimer |
| Timer for DRX in TS 36.321 [6]. Value in number of PDCCH sub-frames. Value psf0 corresponds to 0 PDCCH sub-frame and behaviour as specified in 7.3.2 applies, value psf1 corresponds to 1 PDCCH sub-frame, psf2 corresponds to 2 PDCCH sub-frames and so on. In case drx-RetransmissionTimer-v1130 or drx-RetransmissionTimer-v1310 is signalled, the UE shall ignore drx-RetransmissionTimer (i.e. without suffix). |
| drx-ULRetransmissionTimer |
| Timer for DRX in TS 36.321 [6]. Value in number of PDCCH sub-frames. Value psf0 correponds to 0 PDCCH sub-frame and behaviour as specified in 7.3.2 applies, value psf1 corresponds to 1 PDCCH sub-frame, psf2 corresponds to 2 PDCCH sub-frames and so on. |
| drxShortCycleTimer |
| Timer for DRX in TS 36.321 [6]. Value in multiples of shortDRX-Cycle. A value of 1 corresponds to shortDRX-Cycle, a value of 2 corresponds to 2 * shortDRX-Cycle and so on. |
| dualConnectivityPHR |
| Indicates if power headroom shall be reported using Dual Connectivity Power Headroom Report MAC Control Element defined in TS 36.321 [6] (value setup). If PHR functionality and dual connectivity are configured, E-UTRAN always configures the value setup for this field and configures phr-Config and dualConnectivityPHR for both CGs. |
| e-HARQ-Pattern |
| TRUE indicates that enhanced HARQ pattern for TTI bundling is enabled for FDD. E-UTRAN enables this field only when ttiBundling is set to TRUE. |
| eDRX-Config-CycleStartOffset |
| Indicates longDRX-Cycle and drxStartOffset in TS 36.321 [6]. The value of longDRX-Cycle is in number of sub-frames. The value of drxStartOffset, in number of subframes, is indicated by the value of eDRX-Config-CycleStartOffset multiplied by 2560 plus the offset value configured in longDRX-CycleStartOffset. E-UTRAN only configures value setup when the value in longDRX-CycleStartOffset is sf2560. |
| extendedBSR-Sizes |
| If value setup is configured, the BSR index indicates extended BSR size levels as defined in TS 36.321 [6, Table 6.1.3.1-2]. |
| extendedPHR |
| Indicates if power headroom shall be reported using the Extended Power Headroom Report MAC control element defined in TS 36.321 [6] (value setup). E-UTRAN always configures the value setup if more than one and up to eight Serving Cell(s) with uplink is configured and none of the serving cells with uplink configured has a servingCellIndex higher than seven and if PUCCH on SCell is not configured and if dual connectivity is not configured. E-UTRAN configures extendedPHR only if phr-Config is configured. The UE shall release extendedPHR if phr-Config is released. |
| extendedPHR2 |
| Indicates if power headroom shall be reported using the Extended Power Headeroom Report MAC Control Element defined in TS 36.321 [6] (value setup). E-UTRAN always configures the value setup if any of the serving cells with uplink configured has a servingCellIndex higher than seven in case dual connectivity is not configured or if PUCCH SCell (with any number of serving cells with uplink configured) is configured. E-UTRAN configures extendedPHR2 only if phr-Config is configured. The UE shall release extendedPHR if phr-Config is released. |
| logicalChannelSR-ProhibitTimer |
| Timer used to delay the transmission of an SR for logical channels enabled by logicalChannelSR-Prohibit. Value sf20 corresponds to 20 subframes, sf40 corresponds to 40 subframes, and so on. See TS 36.321 [6]. |

| MAC-MainConfig field descriptions |
| --- |
| longDRX-CycleStartOffset |
| longDRX-Cycle and drxStartOffset in TS 36.321 [6] unless eDRX-Config-CycleStartOffset is configured. The value of longDRX-Cycle is in number of sub-frames. Value sf10 corresponds to 10 sub-frames, sf20 corresponds to 20 sub-frames and so on. If shortDRX-Cycle is configured, the value of longDRX-Cycle shall be a multiple of the shortDRX-Cycle value. The value of drxStartOffset value is in number of sub-frames. In case longDRX-CycleStartOffset-v1130 is signalled, the UE shall ignore longDRX-CycleStartOffset (i.e. without suffix). In case longDRX-CycleStartOffset-v1310 is signalled, the UE shall ignore longDRX-CycleStartOffset (i.e. without suffix). |
| maxHARQ-Tx |
| Maximum number of transmissions for UL HARQ in TS 36.321 [6]. |
| onDurationTimer |
| Timer for DRX in TS 36.321 [6]. Value in number of PDCCH sub-frames. Value psf1 corresponds to 1 PDCCH sub-frame, psf2 corresponds to 2 PDCCH sub-frames and so on. In case onDurationTimer-v1310 is signalled, the UE shall ignore onDurationTimer (i.e. without suffix). |
| periodicBSR-Timer |
| Timer for BSR reporting in TS 36.321 [6]. Value in number of sub-frames. Value sf10 corresponds to 10 sub-frames, sf20 corresponds to 20 sub-frames and so on. |
| periodicPHR-Timer |
| Timer for PHR reporting in TS 36.321 [6]. Value in number of sub-frames. Value sf10 corresponds to 10 subframes, sf20 corresponds to 20 subframes and so on. |
| phr-ModeOtherCG |
| Indicates the mode (i.e. real or virtual) used for the PHR of the activated cells that are part of the other Cell Group (i.e. MCG or SCG), when DC is configured. |
| prohibitPHR-Timer |
| Timer for PHR reporting in TS 36.321 [6]. Value in number of sub-frames. Value sf0 corresponds to 0 subframes and behaviour as specified in 7.3.2 applies, sf100 corresponds to 100 subframes and so on. |
| retxBSR-Timer |
| Timer for BSR reporting in TS 36.321 [6]. Value in number of sub-frames. Value sf640 corresponds to 640 sub-frames, sf1280 corresponds to 1280 sub-frames and so on. |
| sCellDeactivationTimer |
| SCell deactivation timer in TS 36.321 [6]. Value in number of radio frames. Value rf4 corresponds to 4 radio frames, value rf8 corresponds to 8 radio frames and so on. E-UTRAN only configures the field if the UE is configured with one or more SCells other than the PSCell and PUCCH SCell. If the field is absent, the UE shall delete any existing value for this field and assume the value to be set to infinity. The same value applies for each SCell of a Cell Group (i.e. MCG or SCG) (although the associated functionality is performed independently for each SCell). Field sCellDeactivationTimer does not apply for the PUCCH SCell. |
| shortDRX-Cycle |
| Short DRX cycle in TS 36.321 [6]. Value in number of sub-frames. Value sf2 corresponds to 2 sub-frames, sf5 corresponds to 5 subframes and so on. In case shortDRX-Cycle-v1130 is signalled, the UE shall ignore shortDRX-Cycle (i.e. without suffix). Short DRX cycle is not configured for UEs in CE. |
| skipUplinkTxDynamic |
| If configured, the UE skips UL transmissions for an uplink grant other than a configured uplink grant if no data is available for transmission in the UE buffer as described in TS 36.321 [6]. |
| skipUplinkTxSPS |
| If configured, the UE skips UL transmissions for a configured uplink grant if no data is available for transmission in the UE buffer as described in TS 36.321 [6]. E-UTRAN always configures skipUplinkTxSPS when semiPersistSchedIntervalUL is shorter than sf10. |
| sr-ProhibitTimer |
| Timer for SR transmission on PUCCH in TS 36.321 [6]. Value in number of SR period(s) of shortest SR period of any serving cell with PUCCH. Value 0 means that behaviour as specified in 7.3.2 applies. Value 1 corresponds to one SR period, Value 2 corresponds to 2*SR periods and so on. SR period is defined in TS 36.213 [23, table 10.1.5-1]. |
| stag-Id |
| Indicates the TAG of an SCell, see TS 36.321 [6]. Uniquely identifies the TAG within the scope of a Cell Group (i.e. MCG or SCG). If the field is not configured for an SCell (e.g. absent in MAC-MainConfigSCell), the SCell is part of the PTAG. |

| MAC-MainConfig field descriptions |
| --- |
| stag-ToAddModList, stag-ToReleaseList |
| Used to configure one or more STAGs. E-UTRAN ensures that a STAG contains at least one SCell with configured uplink. If, due to SCell release a reconfiguration would result in an 'empty' TAG, E-UTRAN includes release of the concerned TAG. timeAlignmentTimerSTAG |
| Indicates the value of the time alignment timer for an STAG, see TS 36.321 [6]. ttiBundling |
| TRUE indicates that TTI bundling TS 36.321 [6] is enabled while FALSE indicates that TTI bundling is disabled. TTI bundling can be enabled for FDD and for TDD only for configurations 0, 1 and 6. The functionality is performed independently per Cell Group (i.e. MCG or SCG), but E-UTRAN does not configure TTI bundling for the SCG. For a TDD PCell, E-UTRAN does not simultaneously enable TTI bundling and semi-persistent scheduling in this release of specification. Furthermore, for a Cell Group, E-UTRAN does not simultaneously configure TTI bundling and SCells with configured uplink, and E-UTRAN does not simultaneously configure TTI bundling and eIMTA. |

The progress of RAN2 in study item for NR design is captured in 3GPP TS 38.804. 3GPP TS 38.804 specifies that multiple numerologies are supported and logical channel in NR could be associated with TTI durations and/or numerologies. The main purpose of such association is for achieving service requirement. For example, urgent services could be associated with shorter TTIs for latency reduction. In the meantime, shorter TTIs also provide more opportunities for data transmissions to achieve higher data rate. Definitions of numerology and TTI duration are described in 3GPP TS 38.804 as follows:

5.4.7 Numerologies and TTI durations

One numerology corresponds to one subcarrier spacing in the frequency domain. By scaling a basic subcarrier spacing by an integer N, different numerologies can be defined in TR 38.802 [14].

One TTI duration corresponds to a number of consecutive symbols in the time domain in one transmission direction. Different TTI durations can be defined when using different number of symbols (e.g. corresponding to a mini-slot, one slot or several slots in one transmission direction).

The combination of one numerology and one TTI duration determines how transmission is to be made on the physical layer.

Which numerologies and/or TTI durations a logical channel of a radio bearer is mapped to can be configured and reconfigured via RRC signalling. The mapping is not visible to RLC, i.e. the RLC configuration is per logical channel with no dependency on numerologies and/or TTI durations, and ARQ can operate on any of the numerologies and/or TTI durations the logical channel is configured with.

A single MAC entity can support one or multiple numerologies and/or TTI durations but in order for the mapping to be respected, logical channel prioritization procedure takes into account the mapping of one LCH to one or more numerologies and/or TTI durations.

NOTE: HARQ operation with multiple numerologies and TTI durations is FFS, and it should be discussed and decided by RAN1.

NOTE: Whether any characteristic of the numerology beyond the TTI is visible to MAC is FFS (depending on progress in RAN1).

In RAN2 #97bis meeting, a new agreement related to SR design was made as follows:

Agreements on SR/BSR

The SR should at least distinguish the "numerology/TTI type" of the logical channel that triggered the SR (how this is done is FFS).

In RAN2 #98 meeting, new agreements related to SR design were made as follows:

Agreements

1. Multiple SR configurations can be configured to the UE and which SR configuration is used depends on the LCH that triggers the SR. The granularity of SR configuration for a logical channel is FFS.
2. From RAN2 point of view a single bit SR with multiple SR configuration is sufficient to distinguish the "numerology/TTI length" of the logical channel that trigger the SR. RAN2 has not identified other use cases for which multibit SR is need with sufficient support.
3. RAN2 does not see the need to convey buffer status information.
4. Send LS to RAN1 to indicate to RAN1 that RAN2 doesn't see the need to support multibit SR.

Based on the latest agreement, a SR will need to reflect TTI and/or numerology information of the uplink logical channel which triggers the SR. The main purpose of such agreement is to accelerate uplink resource request and to avoid resource waste caused by TTI/numerology configuration of logical channels. How to reflect TTI and/or numerology information will need further study. Potential methods are discussed below.

Method 1—Network provides multiple SR configurations to UE. Different SR configurations may contain different radio resources in frequency domain, time domain, and/or code domain and each SR configuration is linked to TTI/numerology information. The linking could be established based on implicit association (e.g., a numerology used for SR transmission according to a SR configuration is linked to requesting the resource on the numerology) and/or explicit association (e.g., TTI/numerology information is included in each SR configuration). The TTI/numerology information could be one or multiple following candidates:

1. Numerology (e.g. numerology index)
2. TTI length/duration (e.g. maximum TTI threshold, specific TTI length/duration (range))
3. Logical channel identity
4. Logical channel group identity 5. Logical channel priority
6. QoS flow ID And the UE may directly associate SR configuration with logical channel(s) explicitly or implicitly. For example, if SR configuration includes logical channel (group) identity, the data belonging to certain logical channel (group) arrives may trigger BSR and may also trigger corresponding SR based on SR configuration. As another example, if each SR configuration includes numerology information for performing SR transmission, data belonging to certain logical channel (group) arrives, then a SR configuration using same numerology as the logical channel (group) suggested to use will be triggered.

Method 2—A new SR with multiple bits is defined in NR. The multiple bits in SR could be designed as one or multiple fields. Each field could be used to indicate one or multiple information listed as follows:
1. Numerology
2. TTI length/duration (e.g. maximum TTI threshold, specific TTI length/duration (range))
3. Logical channel identity (e.g. bitmaps representing different logical channels, field for indicating LCID)
4. Logical channel group identity
5. Logical channel priority
6. QoS flow ID One possible example could be there are two fields in a SR. The first field represents numerology, and the second field represents TTI length/duration. If a logical channel suggested to numerology A and numerology B and TTI length below 0.5 ms has data coming, the SR could indicate numerology A and numerology B in the first field and indicate TTI below 0.5 ms in the second field. Alternatively, the SR could indicate either numerology A or numerology B in the first field and indicate TTI below 0.5 ms in the second field. Alternatively, the SR could indicate only numerology A in the first field and indicate TTI below 0.5 ms in the second field. The UE that only indicates numerology A may depend on network configuration (e.g. network configures UE to indicate which one, UE only receives numerology A configuration from network, . . . ). The UE only indicating numerology A may depend on shorter slot length on numerology A. In one embodiment, the logical channel has highest priority comparing with priorities of other logical channels with data available for transmission.

Another example could be one field in a SR for indicating logical channel identity. A UE will set the LCID to identity of the logical channel with highest priority in all logical channels having data. Since network provides TTI and/or numerology configuration of logical channel to the UE, network can understand the TTI/numerology need of the UE.

Method 3—This method is a hybrid of the previous two methods. Multiple SR configurations could be configured to a UE, and at least one of those SR configurations supports multiple bits SR. The multiple SR configurations and multiple bits SR independently represent one or multiple following information:
1. Numerology
2. TTI length/duration (e.g. maximum TTI threshold, specific TTI length/duration (range))
3. Logical channel identity (e.g. bitmaps representing different logical channels, field for indicating LC ID)
4. Logical channel group identity
5. Logical channel priority
6. QoS flow ID The information represents by multiple bits SR and multiple SR configurations could be different or have certain level overlap. For example, multiple bits SR are used to indicate specific LCID within certain group of logical channels, while different SR configurations are used to indicate whether data is available in different group of logical channels. The specific LCID could be used to identify logical channel with highest priority or shortest TTI and/or numerology with the group of logical channels which having data. As another example, multiple bits SR and different SR configuration are used to indicate different information. The multiple bits SR is used to indicate TTI length/duration information and the multiple SR configurations are used to indicate different numerologies.

On the other hand, there are still some possible cases not covered by the agreement. It is not clear how to handle SR triggering/setting for those cases. Those possible cases are observed and listed below.

Case 1: Sidelink BSR

In LTE, sidelink interface is introduced for direct communication between UEs. Similar to BSR, Sidelink BSR is used to request sidelink resource from base station. A UE will trigger SR when it needs to transmit sidelink BSR and has no uplink resource. Since the base station will provide only uplink resource for responding SR from a UE and uplink resource cannot be used for sidelink transmission, the resource waste may still occur following the latest agreement. Moreover, it is not clear whether a sidelink logical channel will be associated with the TTI length and/or numerology.

Case 2: Timer and/or counter controlled based control element (e.g. retx-BSR timer)

In LTE, there are some timers and/or counters designed for handling un-expecting conditions. When the counters reach a threshold or the timers expire, the UE may trigger MAC control element and may further trigger SR. Retransmission BSR timer is one example in LTE. More specifically, for retransmission BSR timer case, the UE could trigger BSR if the retransmission timer expires and the UE still has data available for transmission for any of the logical channels belonging to a LCG. In NR, it is quite possible to use such design in many procedures. If an un-expected MAC control element is triggered by timer and/or counter, the UE may trigger SR for forwarding the MAC control element to network as soon as possible.

Case 3: Potential new uplink MAC control element which can trigger SR

New control element(s) could be introduced in NR for different purposes. Here, the new control element(s) will trigger SR. The new control element is designed for UE to autonomously report information to the network (e.g. base station, TRP, CU and/or DU, etc.).

The new MAC control element may or may not be related to logical channel. For example, there could be beam related control element (e.g. beam report, beam quality report, beam failure indication, etc.). Since UE may detect such condition sooner than network side, the beam related control element may need to report to network as soon as possible. The beam related control element may be for uplink and/or downlink. The beam related control element may be for UE beam and/or network beam.

As another example, SPS assistance information message is introduced in Rel-14. There could be a new MAC control element for rapidly updating the latest information. The new MAC control element may indicate one or multiple information listed below for assisting network to update corresponding SPS:
1. Logical channel identity
2. SPS configuration index 3. Cell and/or frequency information
4. Beam information
5. Radio bearer identity
6. QoS flow ID
7. Periodicity
8. Start offset
9. Indication for whether Service/traffic is terminated
10. Packet size (e.g. TB size, MAC PDU size, RLC PDU size, PDCP PDU size, IP packet size, etc.)

Since network may not be able to immediately detect traffic pattern change, it is better for the new control element being able to trigger SR when UE has no uplink resource.

The other possible information, which could be reported by the new MAC CE, can be one or multiple following information:
1. DL Channel quality
2. Data rate
3. Data arrival
4. UE transmission power
5. Traffic characteristic of one or multiple RBs and/or one or multiple logical channels change (e.g. message size, latency requirement, priority, communication path (uplink, sidelink, relay, etc.), MCS suggestion, reliability, destination and/or source of sidelink, RNTI association, mapping between RB and QoS flow ID, transmission power setting, how many (re)transmission opportunities, mapping between cell and RB/LC, mapping between HARQ process/entity and LC/RB, etc.)
6. UE beam-forming (e.g. how many beams in any time, power limitation after beam-forming, beam-forming on-off, etc.)
7. UE mode (e.g. coverage enhanced mode, etc.)
8. UE mobility (e.g. speed, etc.)
9. Congestion detection (e.g. detecting whether a specific time sidelink and/or uplink is congested, etc.)

Moreover, the new MAC CE could also be a request for initiating certain service or function. The service or function could be one or multiple following candidates.
1. System information request (e.g. other SI request MAC CE)
2. Resource request (e.g. (sidelink) contention resource request, grant-free resource request, preamble resource request, reserved uplink/sidelink resource in specific timing and/or specific continuous period, etc.)
3. Time Alignment request
4. Packet duplication function request
5. Cell activation/deactivation request
6. Downlink MAC CE request
7. TTI bundling request
8. Positioning request
9. HARQ configuration change request (e.g. change HARQ process number and/or reset HARQ
10. Change data rate request (e.g. data rate of UE, data rate of certain cell, and/or data rate of one or multiple LCs, etc.)

Possible cases based on each aforementioned method are discussed below. In one embodiment, logical channel mentioned below belongs to a LCG. Alternatively, logical channel mentioned below does not have to belong to a LCG.

Applying Method 1—In case 1, possible options are proposed for handling how sidelink BSR trigger SR for requesting uplink resource.

Option 1 (Pre-defined rule for UE to select SR configuration)—Possibly, the UE triggers SR transmission according to SR configuration associated with default or access numerology when SR is triggered due to sidelink BSR. The default numerology could be default numerology defined in specification for control element to request resource. The default numerology could be numerology used for receiving system information in RRC_IDLE state and/or RRC_INACTIVE state. The default numerology could be a numerology used for performing initial access. The default numerology could be different for different UEs (e.g. NB-IoT UE and normal UE may have different default numerologies due to UE capability).

Another possibility could be that UE always triggers SR transmission according to SR configuration associated with the largest (e.g. SCS=480 khz, SCS=120 khz) or the smallest numerology (e.g. SCS=15 khz, SCS=2.5 khz) which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be SR configuration.

Another possibility could be that UE always triggers SR transmission according to SR configuration with the densest SR transmission opportunity. Yet another possibility could be that UE triggers SR transmission using all SR configurations the UE being configured.

Moreover, the numerology could be replaced by one or multiple TTI/numerology information (e.g. LCG and/or TTI length, etc.) mentioned in the description of Method 1. Alternatively, considering all possible simple rules mentioned above, another possibility could be the network configures which rule a UE shall follow when sidelink BSR is triggered.

Option 2 (Network configures the association between sidelink BSR and SR configuration)—Possibly, the network could provide numerology and/or TTI information to a service (e.g. sidelink, MBMS, V2X, V2V, relay, MTC, URLLC, IoT etc.). And a MAC control element related to the service will trigger SR transmission by similar rule as logical channel with data. The MAC control element will trigger SR transmission according to SR configuration associated with the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will trigger SR transmission according to SR configuration associated with the numerology and/or TTI information. Moreover, the MAC control element may or may not be limited to only use uplink resource related to the numerology and/or TTI information for transmission.

Yet another possibility could be that SR configuration includes MAC control element information (e.g. LCID(s) of MAC control element(s), MAC control element corresponding bitmap, etc.).

Moreover, the numerology and/or TTI information could be replaced by one or multiple information mentioned in description of Method 1.

Another possibility could be that network provides SR configuration index/identity in service configuration related to the MAC control element. And the UE triggers SR according to the SR configuration index/identity for the MAC control element.

Option 3 (All SR configurations can be candidates, and the UE selects one of them)—The UE could possibly trigger SR transmission according to the SR configuration which has the closest SR transmission opportunity to the MAC control element trigger timing. The closest SR transmission may need to take UE processing capability into account.

Option 4 (Defined SR configuration for control element (e.g. Sidelink BSR))—The UE could possibly be configured with a SR configuration used to dedicatedly handle one or multiple MAC control element(s). There could be more than one SR configurations used to dedicated for handling MAC control elements.

Option 5 (UE can autonomously select one of multiple SR configurations, instead of all SR configurations, and the multiple SR configurations are decided based on some conditions)—The UE could possibly be configured with one or multiple criteria for deciding appropriate set of SR configurations. The criteria could be threshold for TTI length and/or numerology. The criteria could be LCG(s).

Option 6 (UE triggers SR configuration related to logical channel having data)—Assuming the sidelink logical channel will also be associated different TTI lengths and/or numerologies, the UE could apply solution similar to uplink design.

The UE could possibly trigger SR transmission according to SR configuration associated with TTI length and/or numerology of highest priority sidelink logical channel within all sidelink logical channels having data in all ProSe destinations. Another possibility could be that the UE triggers SR transmission according to SR configuration associated with TTI length and/or numerology of sidelink logical channel for latest sidelink BSR triggering.

In case 2, the following possible options for handling SR triggering for a timer and/or counter controlled based control element are considered and proposed:

Option 1 (Pre-defined rule for UE to select SR configuration)—The UE could possibly trigger SR transmission according to SR configuration associated with default or access numerology when the control element needs to trigger SR. The default numerology could be default numerology defined in specification for control element to request resource. The default numerology could be numerology used for receiving system information in RRC_IDLE state and/or RRC_INACTIVE state. The default numerology could be a numerology used for performing initial access. The default numerology could be different for different UEs (e.g. NB-IoT UE and normal UE may have different default numerologies due to UE capability).

Alternatively, the UE could always triggers SR transmission according to SR configuration associated with the largest or the smallest numerology which the UE could use. The numerology that a UE could use would need to take UE capability into account. In one embodiment, the numerology that a UE could use would also need to take configuration provided from network into account. If the UE does not have a configuration related to certain numerology, the UE may not be able to transmit SR on that numerology even the UE is capable to use. The configuration could be SR configuration.

Another possibility could be that UE always SR transmission according to SR configuration with the densest SR transmission opportunity. Yet another possibility could be that UE triggers SR transmission on all SR configurations the UE being configured. Moreover, the numerology could be replaced by one or multiple TTI/numerology information (e.g. LCG and/or TTI length, . . . ) mentioned in the description of Method 1. Alternatively, considering all possible simple rules mentioned above, another possibility could be network configures which rule a UE shall follow when timer/counter control based MAC CE is triggered.

Option 2 (Network configures the association between such timer/counter control based MAC CE and SR configuration)—The network could possibly provide numerology and/or TTI information to a service (e.g. sidelink, MBMS, V2X, V2V, relay, MTC, URLLC, IoT etc.). A MAC control element related to the service will trigger SR configuration by similar rule as logical channel with data. The MAC control element will trigger SR transmission according to SR configuration associated with the numerology and/or TTI information. The numerology and/or TTI information could be provided in service configuration (e.g. sidelink communication configuration, sidelink discovery configuration, etc.).

Alternatively, the network could possibly provide numerology and/or TTI information to a MAC control element. More specifically, the numerology and/or TTI information could be provided to specific timer or counter for handling timer/counter controlled based MAC CE in case 2. The MAC control element will trigger SR transmission according to SR configuration associated with the numerology and/or TTI information. Moreover, the MAC control element may or may not be limited to only use uplink resource related to the numerology and/or TTI information for transmission.

Another possibility could be that SR configuration includes MAC control element information (e.g. LCID(s) of MAC control element(s), MAC control element corresponding bitmap, timer and/or counter IE related to timer/counter control based MAC CE). Moreover, the numerology and/or TTI information could be replaced by one or multiple information mentioned in description of Method 1.

Another possibility could be that network provides SR configuration index/identity in service configuration related to the MAC control element. And the UE triggers SR according to the SR configuration index/identity for the MAC control element.

Option 3 (All SR configurations can be candidate, and UE selects one of them)—The UE could possibly trigger SR transmission according to SR configuration which has the closest SR transmission opportunity to the MAC control element trigger timing. The closest SR transmission may need to take UE processing capability into account.

Option 4—(Defined SR configuration for control element (e.g. for timer/counter control based MAC CE, for MAC CE not related to logical channel))—The UE would possibly be configured with a SR configuration used to dedicatedly handle one or multiple MAC control element(s). There could be more than one SR configurations used to dedicated for handling MAC control elements.

Option 5—(UE could autonomously select one of multiple SR configurations, instead of all SR configurations; and the multiple SR configurations are decided based on some conditions)—The UE would possibly be configured with one or multiple criteria for deciding appropriate set of SR configurations. The criteria could be threshold for TTI length and/or numerology. The criteria could be LCG(s).

Option 6 (Trigger SR based on buffer status)—The UE possibly trigger SR transmission based on current which logical channel(s) having data. More specifically, the UE would trigger SR transmission according to SR configuration associated with the TTI and/or numerology of the highest priority logical channel within all (sidelink) logical channels having data.

Alternatively, the UE could trigger SR transmission according to SR configuration associated with LCG of the highest priority logical channel within all (sidelink) logical channels having data.

Option 7 (Trigger SR based on timer/counter parameter)—Normally, a timer and/or counter will increase or decrease based on certain time unit. Possibly, a UE triggers SR transmission according to SR configuration associated with the time unit. There may be parameters (e.g. 1 slot, 14 OFDM symbols, etc.) for translate time unit to corresponding numerology and/or TTI. For example, if 1 ms subframe is the time unit of a timer and UE triggers a control element controlled by the timer, the control element will use SR configuration on 15 khz numerology.

In case 3, possible options for handling SR triggering for potential new control element are as follows:

Option 1 (Pre-defined rule for UE to select SR configuration)—The UE possibly triggers SR transmission according to SR configuration associated with default or access numerology when new MAC CE needs to trigger SR. The default numerology could be default numerology defined in specification for control element to request resource. The default numerology could be numerology used for receiving system information in RRC_IDLE state and/or RRC_INACTIVE state. The default numerology could be a numerology used for performing initial access. The default numerology could be different for different UEs (e.g. NB-IoT UE and normal UE may have different default numerologies due to UE capability).

Alternatively, the UE could always triggers SR transmission according to SR configuration associated with the largest or the smallest numerology which the UE can use. The numerology which a UE can use will need to take UE capability into account. In one embodiment, the numerology that a UE could use would also need to take configuration provided from network into account. If the UE does not have a configuration related to certain numerology, the UE may not be able to transmit SR on that numerology even the UE is capable to use. The configuration could be SR configuration.

Another possibility could be that UE always SR transmission according to SR configuration with the densest SR transmission opportunity. Yet another possibility could be that UE triggers SR transmission on all SR configurations the UE being configured. Moreover, the numerology could be replaced by one or multiple TTI/numerology information (e.g. LCG and/or TTI length, . . . ) mentioned in the description of Method 1. Alternatively, considering all possible simple rules mentioned above, another possibility could be network configures which rule a UE shall follow when the new control element is triggered.

Option 2 (Network configures the association between new MAC CE and SR configuration)—Possibly, network could provide numerology and/or TTI information to a service (e.g. sidelink, MBMS, V2X, V2V, relay, MTC, URLLC, IoT etc.). And a MAC control element related to the service will SR transmission of a SR configuration by similar rule as logical channel with data. The MAC control element will trigger SR transmission according to SR configuration associated with the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will trigger SR transmission according to SR configuration associated with the numerology and/or TTI information. Moreover, the MAC control element may or may not be limited to only use uplink resource related to the numerology and/or TTI information for transmission.

Another possibility could be that SR configuration includes MAC control element information (e.g. LCID(s) of MAC control element(s), MAC control element corresponding bitmap, . . . ). Moreover, the numerology and/or TTI information could be replaced by one or multiple information mentioned in the description of Method 1.

Another possibility could be that network provides SR configuration index/identity in service configuration related to the MAC control element. And the UE triggers SR according to the SR configuration index/identity for the MAC control element.

Option 3 (All SR configurations can be candidate, and the UE selects one of them)—Possibly, UE triggers SR transmission according to SR configuration which has the closest SR transmission to the MAC control element trigger timing. The closest SR transmission may need to take UE processing capability into account.

Option 4 (Defined SR configuration for new MAC control element)—Possibly, UE will be configured with a SR configuration used to dedicatedly handle one or multiple MAC multiple MAC control element(s). There could be more than one SR configurations used to dedicated for handling the MAC control element(s).

Option 5 (UE could autonomously select one of multiple SR configurations, instead of all SR configurations; and the multiple SR configurations are decided based on some conditions)—Possibly, UE will be configured with one or multiple criteria for deciding appropriate set of SR configurations. The criteria could be threshold for TTI length and/or numerology. The criteria could be LCG(s).

Applying Method 2

In case 1, possible options for handling how sidelink BSR trigger SR for requesting uplink resource are as follows:

Option 1 (Pre-defined rule for UE to set multiple bits SR)—Possibly, UE sets multiple bits SR to default or access numerology when sidelink BSR needs to trigger SR. The default numerology could be default numerology defined in specification for MAC control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE sets multiple bits SR to the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be data transmission related configuration.

Yet another possibility could be that UE sets multiple bits SR to request all numerologies that the UE can use. Moreover, the numerology could be replaced by one or multiple TTI/numerology information (e.g. LCG and/or TTI length, etc.) mentioned in the description of Method 2. Alternatively, considering all possible simple rules mentioned above, another possibility could be network configures which rule a UE shall follow when sidelink BSR is triggered.

Option 2 (Network configures the association between sidelink BSR and multiple bits SR setting)—Possibly, network could provide numerology and/or TTI information to a service (e.g. sidelink, MBMS, V2X, V2V, relay, MTC, URLLC, IoT etc.). And a MAC control element related to the service will set multiple bits SR by similar rule as logical channel with data. The MAC control element will set multiple bits SR to the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will set multiple bits SR to the numerology and/or TTI information. Moreover, the MAC control element may or may not be limited to only use uplink resource related to the numerology and/or TTI information for transmission.

Yet another possibility could be that SR configuration includes how to set MAC control element information (e.g. association between LCID(s) of MAC control element(s) and multiple bits setting, etc.). Moreover, the numerology and/or TTI information could be replaced by one or multiple information mentioned in the description of Method 1.

Option 3—In this option, all possible setting of multiple bits SR can be candidate. And the UE decides how to set by itself.

Option 4 (Defined dedicated setting of multiple bits SR for control element (e.g. Sidelink BSR))—Possibly, UE will be configured with a dedicated setting of one or multiple fields in the multiple bits SR for handling one or multiple MAC control element(s). There could be more than one dedicated setting used to handle different MAC control elements.

Option 5 (UE can autonomously select one of multiple settings of multiple bits SR, instead of all possible settings)—The multiple SR settings are decided based on some conditions)—Possibly, UE will be configured with one or multiple criteria for deciding appropriate set of SR settings. The criteria could be threshold for TTI length and/or numerology. The criteria could be LCG(s).

Option 6 (UE sets multiple bits SR based on logical channel having data)—Assuming sidelink logical channel will also be associated different TTI lengths and/or numerologies. In such assumption, UE could apply solution similar to uplink design. Possibly, UE sets multiple bits SR to TTI length and/or numerology of highest priority sidelink logical channel within all sidelink logical channels having data in all ProSe destinations. Another possibility could be that UE set multiple bits SR to TTI length and/or numerology of sidelink logical channel for latest sidelink BSR triggering.

In case 2, possible options for handling SR triggering for a timer and/or counter controlled based control element are as follows:

Option 1 (Pre-defined rule for UE to set multiple bits SR)—Possibly, UE sets multiple bits SR to default or access numerology when timer/counter control based MAC CE needs to trigger SR. The default numerology could be default numerology defined in specification for control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE sets multiple bits SR to the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be data transmission related configuration.

Yet another possibility could be that UE sets multiple bits SR to request all numerology the UE can use. Moreover, the numerology could be replaced by one or multiple TTI/numerology information (e.g. LCG and/or TTI length, . . . ) mentioned in the description of Method 2. Alternatively, considering all possible simple rules mentioned above, another possibility could be network configures which rule a UE shall follow when timer/counter control based MAC CE is triggered.

Option 2 (Network configures the association between timer/counter control based MAC CE and multiple bits SR setting)—Possibly, network could provide numerology and/or TTI information to a service. And a MAC control element related to the service will set multiple bits SR by similar rule as logical channel with data. The MAC control element will set multiple bits SR to the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will set multiple bits SR to the numerology and/or TTI information. Moreover, the MAC control element may or may not be limited to only use uplink resource related to the numerology and/or TTI information for transmission.

Yet another possibility could be that SR configuration includes how to set MAC control element information (e.g. association between LCID(s) of MAC control element(s) and multiple bits setting, . . . ). Moreover, the numerology and/or TTI information could be replaced by one or multiple information mentioned in the description of Method 2.

Option 3—In this option, all possible setting of multiple bits SR can be candidate, and UE decides how to set by itself.

Option 4 (Defined dedicated setting of multiple bits SR for timer/counter control based MAC CE)—Possibly, UE will be configured with a dedicated setting of one or multiple fields in the multiple bits SR for handling one or multiple control element(s). There could be more than one dedicated setting used to handle different control elements.

Option 5: UE can autonomously select one of multiple settings of multiple bits SR, instead of all possible settings; and the multiple SR settings are decided based on some conditions—Possibly, UE will be configured with one or multiple criteria for deciding appropriate set of SR settings (e.g. how to set different fields of SR). The criteria could be threshold for TTI length and/or numerology. The criteria could be LCG(s).

Option 6 (Set multiple bits SR based on buffer status)—Possibly, UE sets multiple bits SR based on current which logical channel(s) having data. More specifically, the UE will set multiple bits SR to the TTI and/or numerology of the highest priority logical channel within all (sidelink) logical channels having data.

Alternatively, the UE will set multiple bits SR to LCG of the highest priority logical channel within all (sidelink) logical channels having data.

Option 7 (Set multiple bits SR based on timer/counter parameter)—Normally, a timer and/or counter will increase or decrease based on certain time unit. Possibly, a UE set multiple bits SR based on the time unit. There may be parameters (e.g. 1 slot, 14 OFDM symbols, . . . ) for translate time unit to corresponding numerology and/or TTI. For example, if 1 ms subframe is the time unit of a timer and UE triggers a control element controlled by the timer, the control element will set multiple bits SR to 15 khz numerology.

In case 3, possible options for handling SR triggering for potential new control element are as follows:

Option 1 (Pre-defined rule for UE to set multiple bits SR)—Possibly, UE sets multiple bits SR to default or access numerology when the new control element needs to trigger SR. The default numerology could be default numerology defined in specification for control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE sets multiple bits SR to the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be data transmission related configuration.

Yet another possibility could be that UE sets multiple bits SR to request all numerology the UE can use. Moreover, the numerology could be replaced by one or multiple TTI/numerology information (e.g. LCG and/or TTI length, etc.) mentioned in the description of Method 2. Alternatively, considering all possible simple rules mentioned above, another possibility could be network configures which rule a UE shall follow when new MAC control element is triggered.

Option 2 (Network configures the association between the new MAC control element and multiple bits SR setting)—Possibly, network could provide numerology and/or TTI information to a service (e.g. sidelink, MBMS, V2X, V2V, relay, MTC, URLLC, IoT etc.). A MAC control element related to the service will set multiple bits SR by similar rule as logical channel with data. The MAC control element will set multiple bits SR to the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will set multiple bits SR to the numerology and/or TTI information. Moreover, the MAC control element may or may not be limited to only use uplink resource related to the numerology and/or TTI information for transmission.

Yet another possibility could be that SR configuration includes how to set MAC control element information (e.g. association between LCID(s) of MAC control element(s) and multiple bits setting, etc.). Moreover, the numerology and/or TTI information could be replaced by one or multiple information mentioned in the description of Method 2.

Option 3—All possible setting of multiple bits SR can be candidate, and the UE decides how to set by itself.

Option 4 (Defined dedicated setting of multiple bits SR for control element)—Possibly, UE will be configured with a dedicated setting of one or multiple fields in the multiple bits SR for handling one or multiple control element(s). There could be more than one dedicated setting used to handle different control elements.

Option 5 (UE can autonomously select one of multiple settings of multiple bits SR, instead of all possible settings; and the multiple SR settings are decided based on some conditions)—Possibly, UE will be configured with one or multiple criteria for deciding appropriate set of SR settings. The criteria could be threshold for TTI length and/or numerology. The criteria could be LCG(s).

Applying Method 3

In case 1, some possible options for handling how sidelink BSR trigger SR for requesting uplink resource are as follows:

Option 1 (Pre-defined rule for UE to select SR configuration and to set multiple bits SR accordingly)—Possibly, UE triggers and sets SR transmission according to SR configuration associated with default or access numerology when sidelink BSR needs to trigger SR. The default numerology could be default numerology defined in specification for control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE always triggers and sets SR transmission according to SR configuration associated with the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be SR configuration.

Yet another possibility could be that UE always triggers SR configuration with the densest SR transmission opportunity. Moreover, the numerology could be replaced by one or multiple TTI/numerology information (e.g. LCG and/or TTI length, etc.) mentioned in the description of Method 3. Alternatively, considering all possible simple rules mentioned above, another possibility could be network configures which rule a UE shall follow when sidelink BSR is triggered.

Option 2 (Network configures the association between sidelink BSR and SR configuration and multiple bits SR setting)—Possibly, network could provide numerology and/or TTI information to a service (e.g. sidelink, MBMS, V2X, V2V, relay, MTC, URLLC, IoT etc.). A MAC control element related to the service will trigger and set SR transmission by similar rule as logical channel with data. The MAC control element will trigger and set SR transmission according to SR configuration associated with the numerology and/or TTI information. The numerology and/or TTI information could be provided in service configuration (e.g. sidelink communication configuration, sidelink discovery configuration, etc.).

Another possibility could be that network provides numerology and/or TTI information to a MAC control element. The MAC control element will trigger SR transmission according to SR configuration associated with the numerology and/or TTI information. Moreover, the MAC control element may or may not be limited to only use uplink resource related to the numerology and/or TTI information for transmission.

Yet another possibility could be that a SR configuration includes a MAC control element information and/or how to set multiple bits SR for the MAC CE (e.g. LCID(s) of MAC control element(s), MAC control element corresponding bitmap, etc.). Moreover, the numerology and/or TTI information could be replaced by one or multiple information mentioned in the description of Method 3.

Another possibility could be that network provides SR configuration index/identity and/or how to set multiple bits SR in service configuration related to the MAC control element. And the UE triggers SR according to the SR configuration index/identity for the MAC control element and also set the multiple bits SR based on the service configuration.

Option 3 (UE implementation)—All SR configurations and/or multiple bits SR settings can be candidate. The UE can decide select which SR configuration and how to set it.

Option 4 (Defined SR configuration and multiple bits SR setting for control element (e.g. Sidelink BSR))—Possibly, UE will be configured a SR configuration and specific multiple bits SR setting used to dedicatedly handle one or multiple control element(s). There could be more than one SR configuration and/or specific SR setting used to dedicated for handling control elements.

Option 5 (UE can autonomously select one of multiple SR configurations and/or multiple bits SR setting; and the multiple SR configurations and/or multiple bits SR setting are decided based on some conditions)—Possibly, UE will be configured with one or multiple criteria for deciding appropriate set of SR configurations and/or multiple bits SR setting. The criteria could be threshold for TTI length and/or numerology. The criteria could be LCG(s).

Option 6 (UE triggers and sets SR transmission according to SR configuration associated with logical channel having data)—Assuming the sidelink logical channel will also be associated with different TTI lengths and/or numerologies, the UE can apply solution similar to uplink design. Possibly, UE triggers and sets SR transmission according to SR configuration associated with TTI length and/or numerology of highest priority sidelink logical channel within all sidelink logical channels having data in all ProSe destinations.

Another possibility could be that UE triggers and sets SR transmission according to SR configuration associated with TTI length and/or numerology of sidelink logical channel for latest sidelink BSR triggering.

In case 2, some possible options for handling SR triggering for a timer and/or counter controlled based control element are as follows:

Option 1 (Pre-defined rule for UE to select SR configuration and to set multiple bits SR accordingly)—Possibly, UE triggers and sets SR transmission according to SR configuration associated with default or initial access numerology when the timer/counter control based MAC CE needs to trigger SR. The default numerology could be default numerology defined in specification for control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE always triggers and sets SR transmission according to SR configuration associated with the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be SR configuration.

Yet another possibility could be that UE always triggers SR configuration with the densest SR transmission opportunity. Moreover, the numerology could be replaced by one or multiple TTI/numerology information (e.g. LCG and/or TTI length, etc.) mentioned in the description of Method 3. Alternatively, considering all possible simple rules mentioned above, another possibility could be network configures which rule a UE shall follow when new MAC control element is triggered.

Option 2 (Network configures the association between the timer/counter control based MAC CE and SR configuration and multiple bits SR setting)—Possibly, network could provide numerology and/or TTI information to a service. A MAC control element related to the service will trigger and set SR transmission by similar rule as logical channel with data. The MAC control element will trigger and set SR transmission according to SR configuration associated with the numerology and/or TTI information. The numerology and/or TTI information could be provided in service configuration (e.g. sidelink communication configuration, sidelink discovery configuration, . . . ).

Another possibility could be that network provides numerology and/or TTI information to a MAC control element. The MAC control element will trigger SR transmission according to SR configuration associated with the numerology and/or TTI information. Moreover, the MAC control element may or may not be limited to only use uplink resource related to the numerology and/or TTI information for transmission.

Yet another possibility could be that a SR configuration includes a MAC control element information and/or how to set multiple bits SR for the MAC CE (e.g. LCID(s) of MAC control element(s), MAC control element corresponding bitmap, . . . ). Moreover, the numerology and/or TTI information could be replaced by one or multiple information mentioned in the description of Method 3.

Another possibility could be that network provides SR configuration index/identity and/or how to set multiple bits SR in service configuration related to the MAC control element. And the UE triggers SR according to the SR configuration index/identity for the MAC control element and also set the multiple bits SR based on the service configuration.

Option 3 (UE implementation)—All SR configurations and/or multiple bits SR settings can be candidate; and the UE can decide select which SR configuration and how to set it.

Option 4 (Defined SR configuration and multiple bits SR setting for control element (e.g. Sidelink BSR))—Possibly, UE will be configured a SR configuration and specific multiple bits SR setting used to dedicatedly handle one or multiple control element(s). There could be more than one SR configuration and/or specific SR setting used to dedicated for handling MAC control elements.

Option 5 (UE can autonomously select one of multiple SR configurations and/or multiple bits SR setting, and the multiple SR configurations and/or multiple bits SR setting are decided based on some conditions)—Possibly, UE will be configured with one or multiple criteria for deciding appropriate set of SR configurations and/or multiple bits SR setting. The criteria could be threshold for TTI length and/or numerology. The criteria could be LCG(s).

Option 6 (Trigger and set SR based on buffer status)—Possibly, the UE triggers and sets SR transmission based on which logical channel(s) currently having data. More specifically, the UE will trigger and set SR transmission according to SR configuration associated with the TTI and/or numerology of the highest priority logical channel within all (sidelink) logical channels having data.

Alternatively, the UE will trigger and set SR transmission according to SR configuration associated with LCG of the highest priority logical channel within all (sidelink) logical channels having data.

Option 7 (Trigger and set SR based on timer/counter parameter)—Normally, a timer and/or counter will increase or decrease based on certain time unit. Possibly, a UE triggers and sets SR transmission according to SR configuration associated with the time unit. There may be parameters (e.g. 1 slot, 14 OFDM symbols, . . . ) for translate time unit to corresponding numerology and/or TTI. For example, if 1 ms subframe is the time unit of a timer and UE triggers a control element controlled by the timer, the control element will trigger and set SR transmission according to SR configuration associated with 15 khz numerology.

In case 3, some possible options for handling SR triggering for potential new control element are as follows:

Option 1 (Pre-defined rule for UE to select SR configuration and to set multiple bits SR accordingly)—Possibly, the UE triggers and sets SR transmission according to SR configuration associated with default or access numerology when new MAC CE needs to trigger SR. The default numerology could be default numerology defined in specification for control element to request resource. The default numerology could be numerology used for receiving system information in RRC_IDLE state and/or RRC_INACTIVE state. The default numerology could be different for different UEs (e.g. NB-IoT UE and normal UE may have different default numerologies due to UE capability).

Another possibility could be that UE always triggers and sets SR transmission according to SR configuration associated with the largest or the smallest numerology which the UE can use. The numerology which a UE can use will need to take UE capability into account. In one embodiment, the numerology which a UE can use will also need to take configuration provided from network into account. If the UE does not have a configuration related to certain numerology, the UE may not be able to transmit SR on that numerology even the UE is capable to use. The configuration could be SR configuration.

Yet another possibility could be that UE always triggers SR configuration with the densest SR transmission opportunity. Moreover, the numerology could be replaced by one or multiple TTI/numerology information (e.g. LCG and/or TTI length, etc.) mentioned in the description of Method 3. Alternatively, considering all possible simple rules mentioned above, another possibility could be network configures which rule a UE shall follow when new MAC control element is triggered.

Option 2 (Network configures the association between new MAC CE and SR configuration and multiple bits SR setting)—Possibly, network could provide numerology and/or TTI information to a service. A MAC control element related to the service will trigger and set SR transmission by similar rule as logical channel with data. The MAC control element will trigger and set SR transmission according to SR configuration associated with the numerology and/or TTI information. The numerology and/or TTI information could be provided in service configuration (e.g. sidelink communication configuration, sidelink discovery configuration, . . . ).

Another possibility could be that network provides numerology and/or TTI information to a MAC control element. The MAC control element will trigger SR transmission according to SR configuration associated with the numerology and/or TTI information. Moreover, the MAC control element may or may not be limited to only use uplink resource related to the numerology and/or TTI information for transmission.

Yet another possibility could be that a SR configuration includes a MAC control element information and/or how to set multiple bits SR for the MAC CE (e.g. LCID(s) of MAC control element(s), MAC control element corresponding bitmap, . . . ). Moreover, the numerology and/or TTI information could be replaced by one or multiple information mentioned in the description of Method 3.

Another possibility could be that network provides SR configuration index/identity and/or how to set multiple bits SR in service configuration related to the MAC control element. And the UE triggers SR according to the SR configuration index/identity for the MAC control element and also set the multiple bits SR based on the service configuration.

Option 3 (UE implementation)—All SR configurations and/or multiple bits SR settings can be candidate; and the UE can decide select which SR configuration and how to set it.

Option 4 (Defined SR configuration and multiple bits SR setting for control element (e.g. Sidelink BSR))—Possibly, the UE will be configured a SR configuration and specific multiple bits SR setting used to dedicatedly handle one or multiple control element(s). There could be more than one SR configuration and/or specific SR setting used to dedicated for handling control elements.

Option 5 (UE can autonomously select one of multiple SR configurations and/or multiple bits SR setting, and the multiple SR configurations and/or multiple bits SR setting are decided based on some conditions)—Possibly, the UE will be configured with one or multiple criteria for deciding appropriate set of SR configurations and/or multiple bits SR setting. The criteria could be threshold for TTI length and/or numerology. The criteria could be LCG(s).

Figure 11:
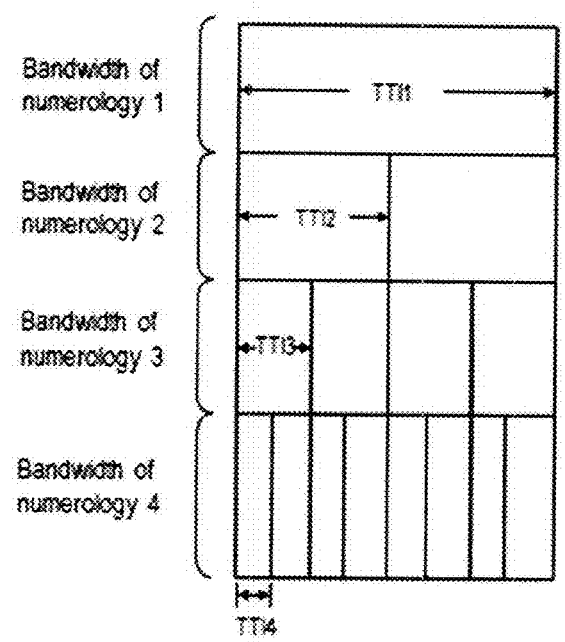
FIG. 11 is a diagram according to one exemplary embodiment.

FIG. 11 is an exemplary illustration of numerology and TTI concept. As shown in FIG. 11, the numerology is interpreted as sub-carrier spacing (SCS) in this example. The TTI refers to time domain duration of a scheduling (e.g. one or multiple OFDM symbols, millisecond, slot, subframe, . . . ). Alternatively, the numerology could be interpreted as a specific TTI duration in certain SCS. Moreover, a band can be semi-statically separated into different sub-bands for supporting different numerologies in system point of view. From UE point of view, such separation may not be visible. Alternatively, there could be no separation and network allocate resource on different numerologies dynamically based on control signal.

Figure 12:
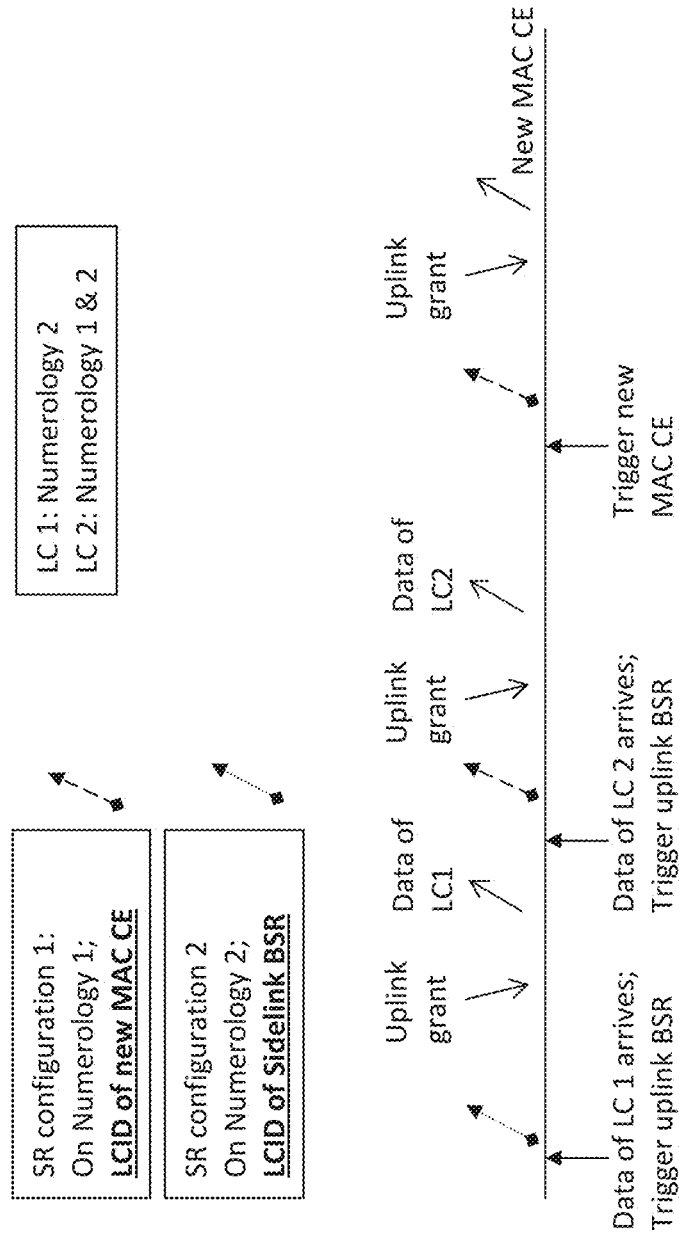
FIG. 12 is a diagram according to one exemplary embodiment.

FIG. 12 is an example for applying option 2 of method 1 in case 3. In the former part, the data of logical channel 1 (LC1) and the data of logical channel 2 (LC2) triggers uplink BSR independently. The SR configurations used by LC1 and LC2 are different for reflecting resource need on different numerologies. Moreover, SR configurations could include identity of new MAC CE for establishing association. Based on the association, in latter part, when the UE triggers new MAC CE and there is no uplink resource, the UE transmits SR according to SR configuration 1. On the other hand, if the UE triggers a sidelink BSR when there is no uplink resource, the UE will transmit SR according to SR configuration 2.

Figure 13:
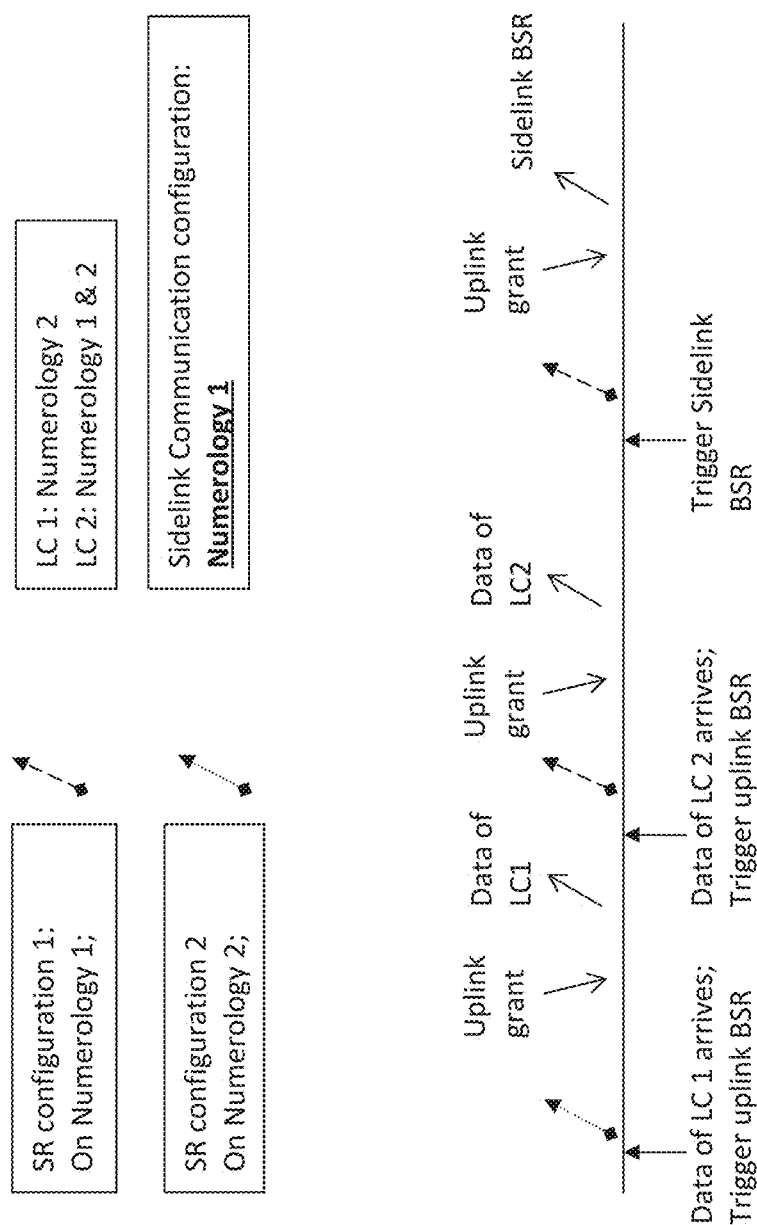
FIG. 13 is a diagram according to one exemplary embodiment.

FIG. 13 is an example of applying option 2 of method 1 in case 1. Similar to FIG. 12, the association is established by including numerology information (i.e. numerology 1) in sidelink service configuration. When the UE triggers a sidelink BSR and there is no uplink resource, the UE will transmit SR according to SR configuration 1.

Figure 14:
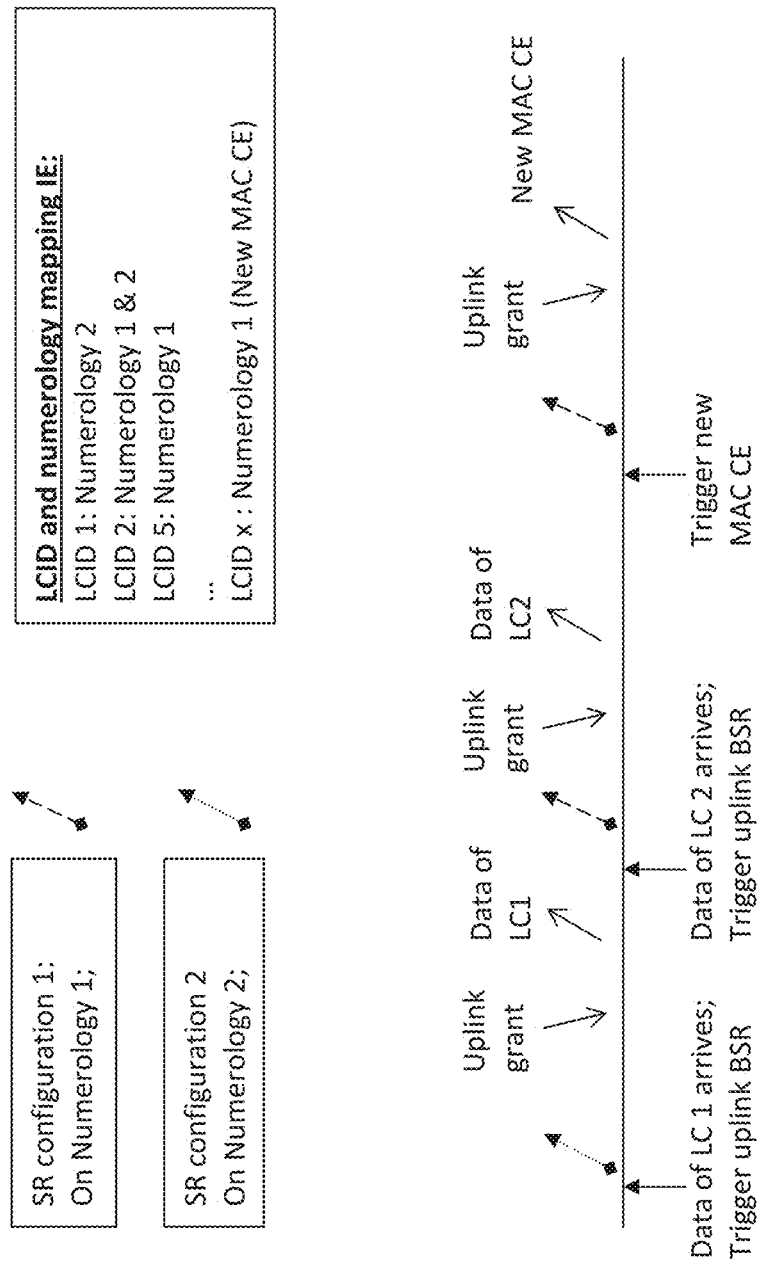
FIG. 14 is a diagram according to one exemplary embodiment.

FIG. 14 is an example of applying option 2 of method 1 in case 3. Similar to previous example, the association is established by mapping table between numerology and identity of new MAC CE.

Figure 15:
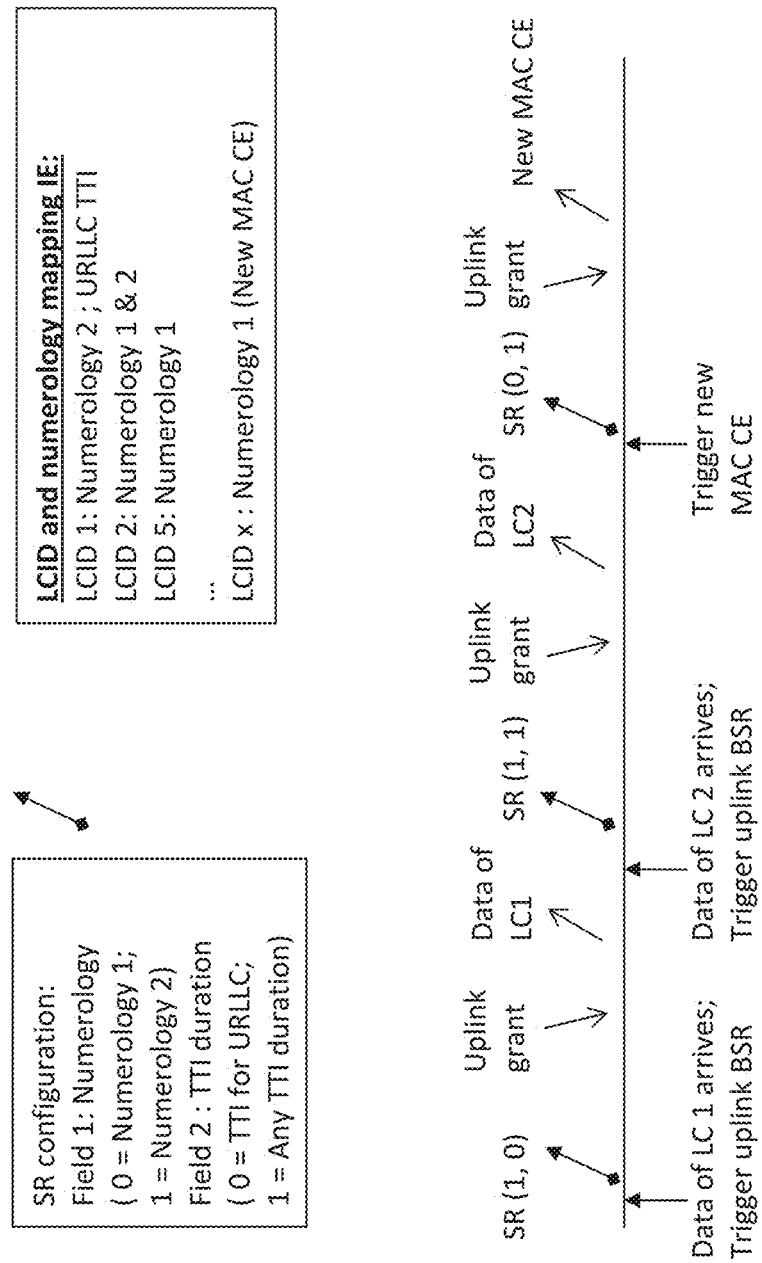
FIG. 15 is a diagram according to one exemplary embodiment.

FIG. 15 is an example of applying option 2 of method 2 in case 3. The SR includes two different fields for separately indicating TTI duration need and numerology need. In former part, the data of logical channel 1 and the data of logical channel 2 triggers uplink BSR independently. The SR transmission for each data arrival event is set in different values according to the logical channel configuration. In latter part, since the new MAC CE also has corresponding logical channel configuration, the SR transmission for forwarding new MAC CE shall be set accordingly.

Figure 16:
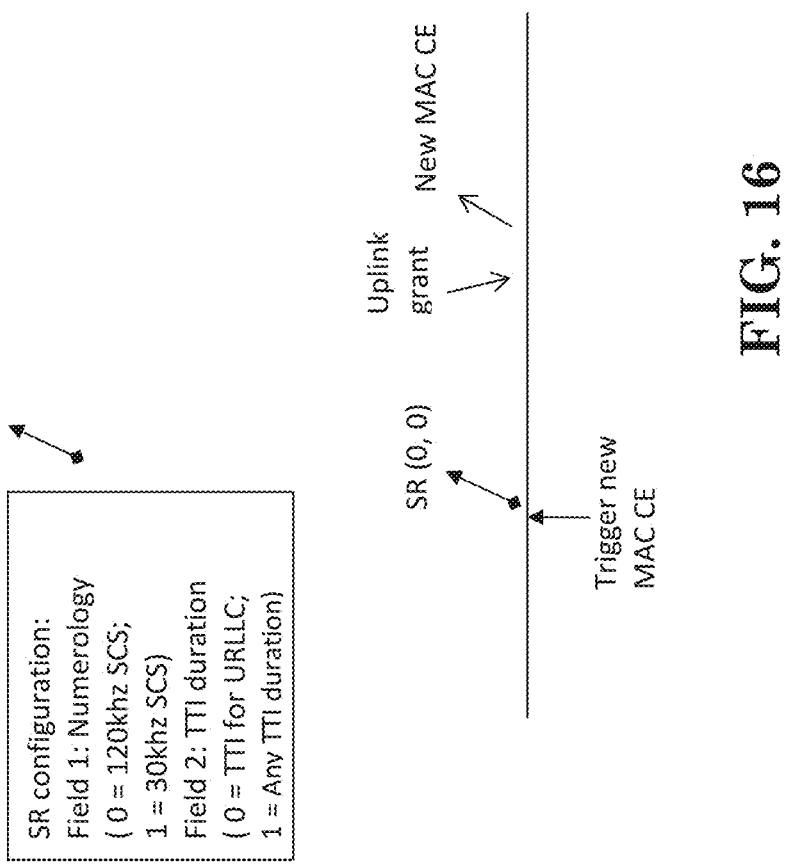
FIG. 16 is a diagram according to one exemplary embodiment.

FIG. 16 is an example of applying option 1 of method 2 in case 3. In this example, the UE will select combination of TTI and numerology for delivering the new MAC CE as soon as possible. Hence, the UE set fields in SR to 120 khz SCS and TTI for urgent service.

Figure 17:
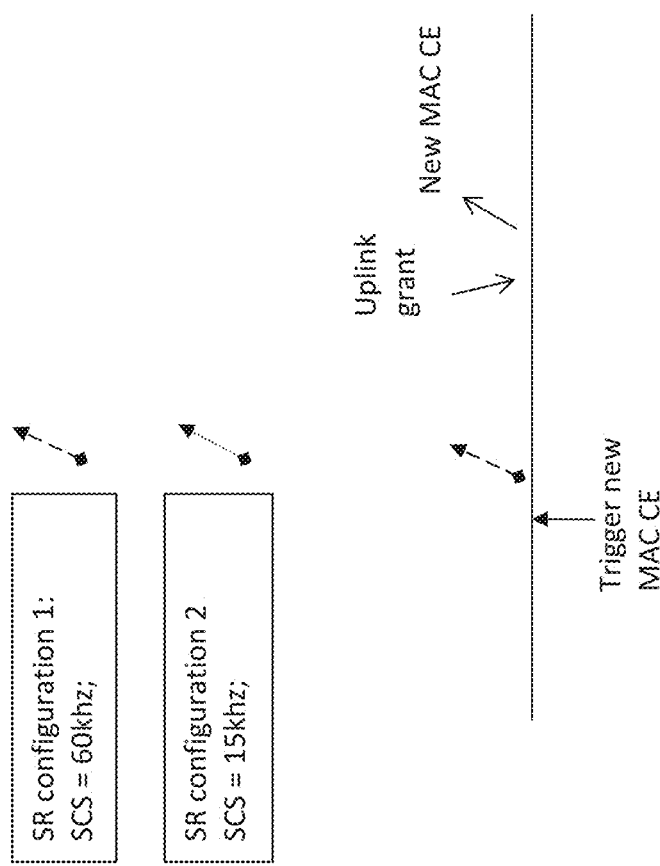
FIG. 17 is a diagram according to one exemplary embodiment.

FIG. 17 is an example of applying option 1 of method 1 in case 3. In this example, the UE will trigger and transmit SR of SR configuration related to the largest numerology for the new MAC CE. Hence, the UE transmit SR according to SR configuration 1.

Figure 18:
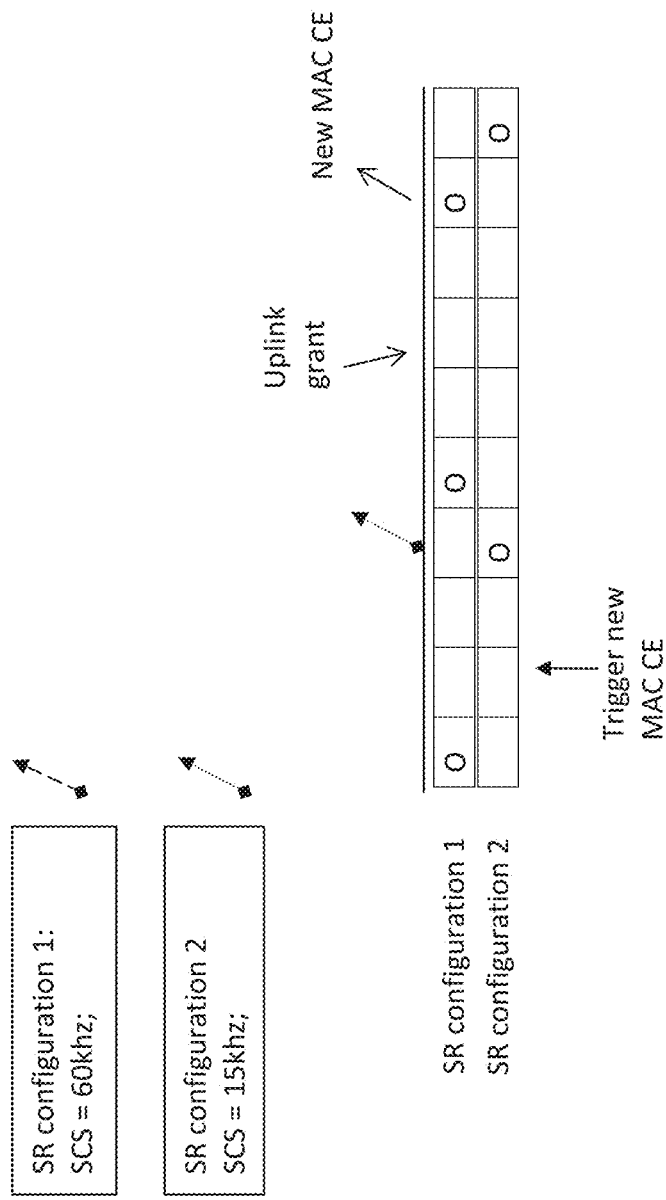
FIG. 18 is a diagram according to one exemplary embodiment.

FIG. 18 is an example of applying option 3 of method 1 in case 3. In this example, each SR configuration will have its SR transmission opportunities. The SR transmission opportunities are shown in different table with "O" indication. When the UE triggers a new MAC CE, the UE will select the closest SR transmission opportunities next to the triggering timing regardless SR configuration. In this example, the SR transmission opportunity in SR configuration 2 is selected. In different alternative, the UE may take SR configurations into account. More specifically, the UE will not consider all SR configurations when selecting appropriate SR transmission resource. The UE will preclude some SR configurations based on criteria and/or threshold. The criteria could be one or multiple information candidate mentioned in this disclosure. The threshold could be information a SR configuration associated with, like numerology, TTI duration, LCG, priority, TB size, etc.

PDCCH Monitoring Discussion

In the current NR design, multiple numerologies are introduced for supporting variant service requirements and UE capabilities. More specifically, different numerologies mean different Single Carrier Spacing (SCS) and can support different TTI durations. Data transmission on different numerologies will have different latencies due to different TTI durations. The larger SCS is used the shorter TTI duration is supported.

In LTE, after a UE transmits a SR, the UE needs to keep monitoring control channel (e.g. PDCCH) for receiving corresponding scheduling from base station until no pending SR exists (or SR is cancelled). Regarding control channel for scheduling numerology of data transmission, some possible designs can be considered below:

Alternative 1: A control channel on a numerology can only schedule data channel(s) on the numerology.

Alternative 2: A control channel on a numerology can schedule data channel(s) on one or multiple numerologies.

Alternative 3: A control channel on a numerology can schedule any numerology which UE can support and/or UE is configured with.

For alternative 1, a control channel will be associated with specific data numerology for scheduling. The UE will expect that the data resource scheduling (e.g. downlink assignment, uplink grant, sidelink grant, SPS scheduling, grant-free activation command) received from the control channel is occur on the specific numerology. The association could be configured by network (e.g. base station). The association could be implicit established. The implicit association could be control channel on the same numerology as data channel, on the same sub-band as sub-band of data channel on certain numerology, or in same cell as cell of a data channel on certain numerology.

Regarding alternative 2, the association between control channel and data channel on different numerologies could be implicit or explicit. For instance, in implicit association case, a control channel can be used to schedule data transmission on any numerology larger/smaller and equal to the numerology of control channel. By this way, once UE is configured with a control channel, the UE will establish the association by itself. For another example, in explicit association, when network provides configuration of a control channel, the network can associate the control channel to one or multiple numerologies. One possible way is to include numerology related information (e.g. numerology indexes) into control channel configuration. Other possible ways could be to include the control channel information (e.g. control channel configuration index) in numerology related configuration, or to map one or multiple numerologies of data channel on different cells.

Then the cross carrier scheduling method in LTE can be reused for this purpose. In carrier aggregation, a control channel can be used to schedule one or multiple cells. Based on the design, the association between control channel and numerology of data channel can be established. Moreover, a UE can be configured with multiple control channels. Different control channels may use different alternatives (e.g. default control channel uses alternative 3 and additional control channel(s) use alternative 2).

For alternative 3, the control channel could schedule data transmission on any numerology (UE is configured with or UE is capable to use). The scheduling control message transmitted on a control channel applied with alternative 3 may include information related to numerology of a data transmission.

Different cases based on the alternatives and the methods for SR reflecting numerology/TTI information are discussed below. And the assumption is based on UE having multiple control resource sets or called control channels (e.g. multiple downlink control channels). Each control resource set could apply one of the three alternatives on data numerology scheduling. Moreover, the multiple control resource set could be allocated for one cell or for carrier aggregation case. The different control resource sets may be separated from time and/or frequency and/or code domain.

Method 1+Alternative 1 or Alternative 2

Case 1: Special SR Triggering Event (e.g. Sidelink BSR, Timer and/or Counter Controlled Based Control Element (e.g. Retx-BSR Timer), Potential New Uplink MAC Control Element Which Can Trigger SR)

Option 1 (Monitoring control channel(s) responsible for scheduling numerology related to SR configuration(s) with triggered SR)—In this option, since each SR configuration is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Option 2 (Monitoring control channel(s) responsible for scheduling numerology related to SR configuration(s) with triggered SR and numerology larger or smaller than numerology related to the SR configuration(s) with triggered SR)—In this option, since each SR configuration is associated with one or multiple numerologies, the SR transmission based on specific configuration can inform base station about the TTI duration and/or numerology of uplink need. It would be reasonable for base station to schedule resource based on the received SR transmission(s). Hence, control channel which can provide corresponding scheduling should be monitored.

Moreover, for increasing system scheduling flexibility, it is also beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried by SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether the UE will also monitor smaller or larger numerology may be done as follows:
1. Configured by network
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Option 3 (Monitoring control channel(s) for all numerologies UE is configured with or UE can support)—It is the simplest way for UE to directly monitor all control channels which the UE can monitor.

Option 4 (Monitoring control channel(s) responsible for scheduling the largest or smallest numerology related to SR configuration(s) with triggered SR)—In this option, UE always monitors either largest or smallest numerology. The largest or smallest numerology could be limited to those numerologies associated with SR configuration(s) with trigger SR. The network (e.g. base station) will share the same understanding and schedule based on the same rule. By limiting number of control channels for monitoring, the power consumption could be reduced.

Moreover, since UE may have multiple control channels for different numerologies, UE may monitor other control channel which are not largest or smallest based on conditions other than SR transmission. The conditions other than SR transmission could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Option 5 (Monitoring control channel(s) which can schedule most numerologies related to SR configuration(s) with triggered SR or most numerologies UE is configured with or UE can support)—In this option, UE will select control channel which schedule more numerology for reducing power consumption on monitoring. The UE may take only those numerologies related to SR configuration(s) with triggered SR into account for calculating number of numerologies scheduled by a control channel.

Option 6 (Monitoring specific control channel(s) associated with the special SR triggering event)—In this option, since UE knows SR is triggered for special event and network will share the same understanding based on received SR, the UE could monitor control channel(s) associated with special SR triggering event, instead of all control channels.

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or other possible RRC configuration provided through system information or dedicated signaling. For example, a sidelink BSR triggers a SR and the SR is transmitted to the network.

Assuming not all PDCCHs (e.g. all control resource sets) can schedule sidelink resource, if the SR could indicate sidelink BSR existence, the UE will monitor PDCCH(s) which can schedule sidelink resources. And which PDCCH can be used to schedule sidelink resource may be decided by sidelink related configuration (e.g. communication configuration, pool configuration, or numerology configuration) and/or cell configuration.

The association could be predefined. For example, UE monitors default control channel for special event.

Option 7 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After UE transmits SR transmission, the UE will monitor the first set and/or the third set. Moreover, the second set may be monitor based on conditions listed below, instead of SR transmission condition.

The conditions could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.

8. A sidelink grant for a pending HARQ (re-)transmission can occur.

Case 2: SR is Triggered by Uplink Data Arrival

Option 1 (Monitoring control channel(s) responsible for scheduling numerology related to SR configuration(s) with triggered SR)—In this option, since each SR configuration is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Option 2 (Monitoring control channel(s) responsible for scheduling numerology related to SR configuration(s) with triggered SR and numerology larger or smaller than numerology related to the SR configuration(s) with triggered SR)—In this option, since each SR configuration is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Moreover, for increasing system scheduling flexibility, it is also beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried by SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether UE will also monitor smaller or larger numerology may be:
1. Configured by network
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Option 3 (Monitoring control channel(s) for all numerologies UE is configured with or UE can support)—It is the simplest way for UE to directly monitor all control channels which the UE can monitor.

Option 4 (Monitoring control channel(s) responsible for scheduling the largest or smallest numerology related to SR configuration(s) with triggered SR)—In this option, UE always monitors either largest or smallest numerology. The largest or smallest numerology could be limited to those numerologies associated with SR configuration(s) with trigger SR. The network (e.g. base station) will share the same understanding and schedule based on the same rule. By limiting number of control channels for monitoring, the power consumption could be reduced.

Moreover, since UE may have multiple control channels for different numerologies, the UE may monitor other control channel which are not largest or smallest based on conditions other than SR transmission. The conditions other than SR transmission could be one or multiple options listed below:

1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity
8. A sidelink grant for a pending HARQ (re-)transmission can occur Option 5 (Monitoring control channel(s) which can schedule most numerologies related to SR configuration(s) with triggered SR or most numerologies UE is configured with or UE can support)—In this option, UE will select control channel which schedule more numerology for reducing power consumption on monitoring. The UE may take only those numerologies related to SR configuration(s) with triggered SR into account for calculating number of numerologies scheduled by a control channel.

Option 6 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After UE transmits SR transmission, the UE will monitor the first set and/or the third set. Moreover, the second set may be monitor based on conditions listed below, instead of SR transmission condition.

The conditions could be one or multiple options listed in below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity
8. A sidelink grant for a pending HARQ (re-)transmission can occur Method 2+Alternative 1 or Alternative 2

Case 1: Special SR Triggering Event (e.g. Sidelink BSR, Timer and/or Counter Controlled Based Control Element (e.g. Retx-BSR Timer), Potential New Uplink MAC Control Element Which Can Trigger SR)

Option 1 (Monitoring control channel(s) responsible for scheduling numerology related to the multiple bits setting of the last SR transmission)—In this option, since a multiple bits setting is associated with one or multiple numerologies, a base station can schedule resource based on the received SR transmission(s). Hence, control channel which can provide corresponding numerology scheduling should be monitored.

Option 2 (Monitoring control channel(s) responsible for scheduling numerology related to the multiple bits setting of the last SR transmission and numerology larger or smaller than numerology related to the multiple bits setting of the last SR transmission)—In this option, since each kind of multiple bits setting in SR is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Moreover, for increasing system scheduling flexibility, it is beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried by SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether UE will also monitor smaller or larger numerology may be:
1. Configured by network
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Moreover, since the UE may have multiple control channels for different numerologies, the UE may monitor other control channel which are not largest or smallest based on conditions other than SR transmission. The conditions other than SR transmission could be one or multiple options listed in below:

Option 4 (Monitoring control channel(s) responsible for scheduling the largest or smallest numerology related to the multiple bits setting of the last SR transmission)—In this option, UE always monitors either largest or smallest numerology. The largest or smallest numerology could be limited to those numerologies informed by SR transmission. The network (e.g. base station) will share the same understanding and schedule based on the same rule. By limiting number of control channels for monitoring, the power consumption could be reduced.

Moreover, since the UE may have multiple control channels for different numerologies, the UE may monitor other control channel which are not largest or smallest based on conditions other than SR transmission. The conditions other than SR transmission could be one or multiple options listed in below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity
8. A sidelink grant for a pending HARQ (re-)transmission can occur Option 5 (Monitoring control channel(s) which can schedule most numerologies related to the multiple bits setting of the last SR transmission or most numerologies UE is configured with or UE can support)—In this option, UE will select control channel which schedule more numerology for reducing power consumption on monitoring. And the UE may take only those numerologies informed by SR transmission into account for calculating number of numerologies scheduled by a control channel.

Option 6 (Monitoring specific control channel(s) associated with the special SR triggering event)—In this option, since the UE knows SR is triggered for special event and network will share the same understanding based on received SR, the UE could monitor control channel(s) associated with special SR triggering event, instead of all control channels.

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or . . . . For example, a sidelink BSR triggers a SR and the SR is transmitted to the network. Assume not all PDCCHs (e.g. all control resource sets) can schedule sidelink resource. If the SR could indicate sidelink BSR existence, UE will monitor PDCCH(s) which can schedule sidelink resource. And which PDCCH can be used to schedule sidelink resource may be decided by sidelink related configuration (e.g. communication configuration, pool configuration, or numerology configuration) and/or cell configuration.

The association could be predefined. For example, UE monitors default control channel for special event.

Option 7 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After UE transmits SR transmission, the UE will monitor the first set and/or the third set. Moreover, the second set may be monitor based on conditions listed below, instead of SR transmission condition.

The conditions could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. an uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Case 2: SR is Triggered By Uplink Data Arrival

Option 1 (Monitoring control channel(s) responsible for scheduling numerology related to the multiple bits setting of the last SR transmission)—In this option, since a multiple bits setting is associated with one or multiple numerologies, a base station can schedule resource based on the received SR transmission(s). Hence, control channel which can provide corresponding numerology scheduling should be monitored.

Option 2 (Monitoring control channel(s) responsible for scheduling numerology related to the multiple bits setting of the last SR transmission and numerology larger or smaller than numerology related to the multiple bits setting of the last SR transmission)—In this option, since each kind of multiple bits setting in SR is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Moreover, for increasing system scheduling flexibility, it is also beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried by SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether UE will also monitor smaller or larger numerology may be:
1. Configured by network
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Option 3 (Monitoring control channel(s) for all numerologies UE is configured with or UE can support)—It is the simplest way for UE to directly monitor all control channels which the UE can monitor.

Option 4 (Monitoring control channel(s) responsible for scheduling the largest or smallest numerology related to the multiple bits setting of the last SR transmission)—In this option, UE always monitors either largest or smallest numerology. The largest or smallest numerology could be limited to those numerologies informed by SR transmission. The network (e.g. base station) will share the same understanding and schedule based on the same rule. By limiting number of control channels for monitoring, the power consumption could be reduced.

Moreover, since the UE may have multiple control channels for different numerologies, the UE may monitor other control channel which are not largest or smallest based on conditions other than SR transmission. The conditions other than SR transmission could be one or multiple options listed in below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Option 5 (Monitoring control channel(s) which can schedule most numerologies related to the multiple bits setting of the last SR transmission or most numerologies UE is configured with or UE can support)—In this option, UE will select control channel which schedule more numerology for reducing power consumption on monitoring. The UE may take only those numerologies informed by SR transmission into account for calculating number of numerologies scheduled by a control channel.

Option 6 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After UE transmits SR transmission, the UE will monitor the first set and/or the third set. Moreover, the second set may be monitor based on conditions listed below, instead of SR transmission condition.

The conditions could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. an uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Method 3+Alternative 1 or Alternative 2

Case 1: Special SR Triggering Event (e.g. Sidelink BSR, Timer and/or Counter Controlled Based Control Element (e.g. Retx-BSR Timer), Potential New Uplink MAC Control Element Which Can Trigger SR)

Option 1 (Monitoring control channel(s) responsible for scheduling numerology related to each SR configuration with triggered SR and/or the multiple bits setting of the last SR transmission of each SR configuration)—In this option, since a multiple bits SR transmission based on a SR configuration is associated with one or multiple numerologies, the SR transmission can inform base station about the TTI duration and/or numerology of uplink need. It is reasonable for base station to schedule resource based on the received SR transmission(s). Hence, control channel which can provide corresponding scheduling should be monitored.

Option 2 (Monitoring control channel(s) responsible for scheduling numerology related to each SR configuration with triggered SR and/or the multiple bits setting of the last SR transmission of each SR configuration, and numerology larger or smaller than numerology related to each SR configuration with triggered SR and/or the multiple bits setting of the last SR transmission of each SR configuration)—In this option, since a multiple bits SR transmission based on a SR configuration is associated with one or multiple numerologies, the SR transmission based on specific configuration can inform base station about the TTI duration and/or numerology of uplink need. It would be reasonable for base station to schedule resource based on the received SR transmission(s). Hence, control channel which can provide corresponding scheduling should be monitored.

Moreover, for increasing system scheduling flexibility, it is also beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried from SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether UE will also monitor smaller or larger numerology may be:
1. Configured by network.
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Option 3 (Monitoring control channel(s) for all numerologies UE is configured with or UE can support)—It is the simplest way for UE to directly monitor all control channels which the UE can monitor.

Option 4 (Monitoring control channel(s) responsible for scheduling the largest or smallest numerology related to SR configuration(s) with triggered SR and/or the multiple bits setting of the last SR transmission of each SR configuration)—In this option, UE always monitors either largest or smallest numerology. The largest or smallest numerology could be limited to those numerologies informed by SR transmission. The network (e.g. base station) will share the same understanding and schedule based on the same rule. By limiting number of control channels for monitoring, the power consumption could be reduced.

Moreover, since the UE may have multiple control channels for different numerologies, the UE may monitor other control channel which are not largest or smallest based on conditions other than SR transmission. The conditions other than SR transmission could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Option 5 (Monitoring control channel(s) which can schedule most numerologies related to SR configuration(s) with triggered SR and/or the multiple bits setting of the last SR transmission of each SR configuration, or most numerologies UE is configured with or UE can support)—In this option, the UE will select control channel which schedule more numerology for reducing power consumption on monitoring. The UE may take only those numerologies informed by SR transmission into account for calculating number of numerologies scheduled by a control channel.

Option 6 (Monitoring specific control channel(s) associated with the special SR triggering event)—In this option, since UE knows SR is triggered for special event and network will share the same understanding based on received SR, the UE could monitor control channel(s) associated with special SR triggering event, instead of all control channels.

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or . . . . For example, a sidelink BSR triggers a SR and the SR is transmitted to the network. Assuming not all PDCCH can schedule sidelink resource, if the SR could indicate sidelink BSR existence, the UE will monitor PDCCH(s) which can schedule sidelink resource. And which PDCCH can be used to schedule sidelink resource may be decided by sidelink related configuration (e.g. communication configuration, pool configuration, or numerology configuration) and/or cell configuration.

The association could be predefined. For example, UE monitors default control channel for special event.

Option 7 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After the UE transmits SR transmission, the UE will monitor the first set and/or the third set. Moreover, the second set may be monitor based on conditions listed below, instead of SR transmission condition.

The conditions could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Case 2: SR is Triggered By Uplink Data Arrival

Option 1 (Monitoring control channel(s) responsible for scheduling numerology related to each SR configuration with triggered SR and/or the multiple bits setting of the last SR transmission of each SR configuration)—In this option, since a multiple bits SR transmission based on a SR configuration is associated with one or multiple numerologies, the SR transmission can inform base station about the TTI duration and/or numerology of uplink need. It would be reasonable for base station to schedule resource based on the received SR transmission(s). Hence, control channel which can provide corresponding scheduling should be monitored.

Option 2 (Monitoring control channel(s) responsible for scheduling numerology related to each SR configuration with triggered SR and/or the multiple bits setting of the last SR transmission of each SR configuration, and numerology larger or smaller than numerology related to each SR configuration with triggered SR and/or the multiple bits setting of the last SR transmission of each SR configuration)—In this option, since a multiple bits SR transmission based on a SR configuration is associated with one or multiple numerologies, the SR transmission based on specific configuration can inform base station about the TTI duration and/or numerology of uplink need. It is reasonable for base station to schedule resource based on the received SR transmission(s). Hence, control channel which can provide corresponding scheduling should be monitored.

Moreover, for increasing system scheduling flexibility, it is also beneficial to allow base station to schedule resource on different numerologies or with different TTI durations, instead of only numerologies and/or TTI durations informed by SR transmission. One possible rule is to let UE also monitor control channel which can schedule numerology smaller or larger than numerologies information carried from SR transmission. The range for how large or how small could be configured by base station and/or decided based on predefined rule (e.g. until largest or smallest numerology UE is configured with). For URLLC service, larger numerology resource could be also suitable for a UE from latency perspective. For eMTC service, the smaller numerology could be suitable for a UE from low complexity perspective and reliability perspective.

Whether UE will also monitor smaller or larger numerology may be:
1. Configured by network.
2. Decided by UE itself based on ongoing service and/or current SR transmission(s) (e.g. SR request TTI/numerology less than a threshold, SR triggered for certain logical channel(s))
3. Decided based on UE category/type/complexity
4. Decided based on UE subscription Option 3 (Monitoring control channel(s) for all numerologies UE is configured with or UE can support)—It is the simplest way for UE to directly monitor all control channels which the UE can monitor.

Option 4 (Monitoring control channel(s) responsible for scheduling the largest or smallest numerology related to SR configuration(s) with triggered SR and/or the multiple bits setting of the last SR transmission of each SR configuration)—In this option, the UE always monitors either largest or smallest numerology. The largest or smallest numerology could be limited to those numerologies informed by SR transmission. The network (e.g. base station) will share the same understanding and schedule based on the same rule. By limiting number of control channels for monitoring, the power consumption could be reduced.

Moreover, since the UE may have multiple control channels for different numerologies, the UE may monitor other control channel which are not largest or smallest based on conditions other than SR transmission. The conditions other than SR transmission could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Option 5 (Monitoring control channel(s) which can schedule most numerologies related to SR configuration(s) with triggered SR and/or the multiple bits setting of the last SR transmission of each SR configuration, or most numerologies UE is configured with or UE can support)—In this option, the UE will select control channel which schedule more numerology for reducing power consumption on monitoring. The UE may take only those numerologies informed by SR transmission into account for calculating number of numerologies scheduled by a control channel.

Option 6 (Monitoring control channel(s) for uplink)—In this option, control channels could be separated into two sets or three sets. The first set is used for uplink scheduling. The second set is used for downlink scheduling. The third set is used for both downlink scheduling and uplink scheduling. After the UE transmits SR transmission, the UE will monitor the first set and/or the third set. Moreover, the second set may be monitor based on conditions listed below, instead of SR transmission condition.

The conditions could be one or multiple options listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Method 1+Alternative 3

Case 1: Special SR Triggering Event (e.g. Sidelink BSR, Timer and/or Counter Controlled Based Control Element (e.g. Retx-BSR Timer), Potential New Uplink MAC Control Element Which Can Trigger SR)

Option 1 (Monitoring all control channel(s) UE is configured with)—The UE just monitors all configured control channels.

Option 2 (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, UE can reduce control resource set(s) for monitoring for reducing power consumption.

Option 3 (Monitoring specific control channel(s) associated with the special SR triggering event)—In this option, since the UE knows SR is triggered for special event and network will share the same understanding based on received SR, the UE could monitor control channel(s) associated with special SR triggering event, instead of all control channels (e.g. all control resource sets configured to the UE).

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or . . . . For example, a sidelink BSR triggers a SR and the SR is transmitted to the network. Assuming not all PDCCH (e.g. all control resource sets configured to the UE) can schedule sidelink resource, if the SR could indicate sidelink BSR existence, the UE will monitor PDCCH(s) which can schedule sidelink resource. And which PDCCH can be used to schedule sidelink resource may be decided by sidelink related configuration (e.g. communication configuration, pool configuration, or numerology configuration) and/or cell configuration.

The association could be predefined. For example, the UE monitors default control channel for the special event.

Option 4 (Monitoring specific control channel(s) (e.g. default control channel, configured by network, control channels for uplink scheduling) regardless SR triggering event)—In this option, the UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer or counter). By this way, UE can reduce power consumption on control channel monitoring. For another example, a UE will monitor default numerology after performing SR transmission and SR is still pending in the UE.

In one embodiment, the UE monitor only default numerology may be controlled by a timer as previous example. For another example, if control channel is used for different link scheduling (e.g. downlink, uplink, sidelink, relay link, . . . ), a UE should monitor control channel for uplink after performing SR transmission and SR is still pending in the UE.

Moreover, the UE may monitor other control channel(s) based on one or multiple conditions listed in DRX mechanism for monitoring PDCCH, except for the SR triggering condition. The possible candidates for the conditions are listed below:

1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Case 2: SR is Triggered by Uplink Data Arrival

Option 1 (Monitoring all control channel(s) UE is configured with)—The UE just monitors all configured control channels.

Option 2 (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, the UE can reduce control resource set for monitoring for reducing power consumption.

Option 3 (Monitoring specific control channel (e.g. default control channel, configured by network) regardless SR triggering event)—In this option, the UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer or counter). By this way, UE can reduce power consumption on control channel monitoring. For another example, a UE will monitor default numerology after performing SR transmission and SR is still pending in the UE. The UE monitor only default numerology may be controlled by a timer as previous example. For another example, if control channel is used for different link scheduling (e.g. downlink, uplink, sidelink, relay link, etc.), a UE should monitor control channel for uplink after performing SR transmission and SR is still pending in the UE.

Moreover, the UE may monitor other control channel(s) based on one or multiple conditions listed in DRX mechanism for monitoring PDCCH, except for the SR triggering condition. The possible candidates for the conditions are listed below:

1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Method 2+Alternative 3

Case 1: Special SR Triggering Event (e.g. Sidelink BSR, Timer and/or Counter Controlled Based Control Element (e.g. Retx-BSR Timer), Potential New Uplink MAC Control Element Which Can Trigger SR)

Option 1 (Monitoring all control channel(s) UE is configured with)—The UE just monitors all configured control channels.

Option 2 (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, the UE can reduce control resource set for monitoring for reducing power consumption.

Option 3 (Monitoring specific control channel(s) associated with the special SR triggering event)—In this option, since the UE knows SR is triggered for special event and network will share the same understanding based on received SR, the UE could monitor control channel(s) (e.g. control resource sets) associated with special SR triggering event, instead of all control channels.

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or MAC configuration. For example, a sidelink BSR triggers a SR and the SR is transmitted to the network.

Assuming not all PDCCHs (e.g. control resource sets configured to the UE) can schedule sidelink resource, if the SR could indicate sidelink BSR existence, the UE will monitor PDCCH(s) which can schedule sidelink resource. And which PDCCH can be used to schedule sidelink resource may be decided by sidelink related configuration (e.g. communication configuration, pool configuration, or numerology configuration) and/or cell configuration.

The association could be predefined. For example, UE monitors default control channel for special event.

Option 4 (Monitoring specific control channel (e.g. default control channel, configured by network) regardless SR triggering event)—In this option, the UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer or counter). By this way, UE can reduce power consumption on control channel monitoring. For another example, a UE will monitor default numerology after performing SR transmission and SR is still pending in the UE. The UE monitor only default numerology may be controlled by a timer as previous example. For another example, if control channel is used for different link scheduling (e.g. downlink, uplink, sidelink, relay link, etc.), a UE should monitor control channel for uplink after performing SR transmission and SR is still pending in the UE.

Moreover, the UE may monitor other control channel(s) based on one or multiple conditions listed in DRX mechanism for monitoring PDCCH, except for the SR triggering condition. Possible options for the conditions are listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Case 2: SR is Triggered by Uplink Data Arrival

Option 1 (Monitoring all control channel(s) UE is configured with)—The UE just monitors all configured control channels.

Option 2 (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, the UE can reduce control resource set for monitoring for reducing power consumption.

Option 3 (Monitoring specific control channel (e.g. default control channel, configured by network) regardless SR triggering event)—In this option, the UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer/counter). By this way, UE can reduce power consumption on control channel monitoring.

As another example, a UE will monitor default numerology after performing SR transmission and SR is still pending in the UE. The UE monitor only default numerology may be controlled by a timer as previous example.

As yet another example, if control channel is used for different link scheduling (e.g. downlink, uplink, sidelink, relay link, etc.), a UE should monitor control channel for uplink after performing SR transmission and SR is still pending in the UE.

Moreover, the UE may monitor other control channel(s) (e.g. other control resource sets) based on one or multiple conditions listed in DRX mechanism for monitoring PDCCH, except for the SR triggering condition. Possible candidates for the conditions are listed below:
1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Method 3+Alternative 3

Case 1: Special SR Triggering Event (e.g. Sidelink BSR, Timer and/or Counter Controlled Based Control Element (e.g. Retx-BSR timer), Potential New Uplink MAC Control Element Which Can Trigger SR)

Option 1 (Monitoring all control channel(s) UE is configured with)—The UE just monitors all configured control channels.

Option 2 (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, the UE can reduce control resource set(s) for monitoring for reducing power consumption.

Option 3 (Monitoring specific control channel(s) associated with the special SR triggering event)—In this option, since UE knows SR is triggered for special event and network will share the same understanding based on received SR, the UE could monitor control channel(s) associated with special SR triggering event, instead of all control channels.

The association could be configured by network (e.g. base station). The association could be provided in service configuration (e.g. sidelink configuration), control channel configuration (e.g. include control element identity in control channel configuration), cell configuration (e.g. both control channel and control element belong to same cell), or MAC configuration. For example, a sidelink BSR triggers a SR and the SR is transmitted to the network. Assuming not all PDCCH can schedule sidelink resource, if the SR could indicate sidelink BSR existence, the UE will monitor PDCCH(s) which can schedule sidelink resource. And which PDCCH can be used to schedule sidelink resource may be decided by sidelink related configuration (e.g. communication configuration, pool configuration, or numerology configuration) and/or cell configuration.

The association could be predefined. For example, the UE monitors default control channel for special event.

Option 4 (Monitoring specific control channel (e.g. default control channel, configured by network) regardless SR triggering event)—In this option, the UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer or counter). By this way, UE can reduce power consumption on control channel monitoring. For another example, a UE will monitor default numerology after performing SR transmission and SR is still pending in the UE. The UE monitor only default numerology may be controlled by a timer as previous example.

As another example, if control channel is used for different link scheduling (e.g. downlink, uplink, sidelink, relay link, etc.), a UE should monitor control channel for uplink after performing SR transmission and SR is still pending in the UE. Moreover, the UE may monitor other control channel(s) based on one or multiple conditions listed in DRX mechanism for monitoring PDCCH, except for the SR triggering condition. Possible candidates for the conditions are listed below:

1. DurationTimer is running
2. drx-InactivityTimer is running
3. drx-RetransmissionTimer is running
4. drx-ULRetransmissionTimer is running
5. ContentionResolutionTimer is running
6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Case 2: SR is Triggered by Uplink Data Arrival

Option 1 (Monitoring all control channel(s) UE is configured with)—The UE just monitors all configured control channels.

Option 2: (Monitoring specific control channel(s) for each SR configuration with triggered SR)—In this option, a control channel will be associated with a SR configuration. Hence, after a UE transmits a SR based on a SR configuration, the UE will monitor the associated control channel. The association could be established based on cell configuration, service configuration (e.g. sidelink configuration, V2X configuration), control channel configuration, SR configuration, or MAC configuration. By this way, the UE can reduce control resource set for monitoring for reducing power consumption.

Option 3 (Monitoring specific control channel (e.g. default control channel, configured by network) regardless SR triggering event)—In this option, UE will monitor specific control channel(s) regardless information carried by SR transmission.

The specific control channel could be configured by network or determined by predefined rule. For example, if a UE is configured with control channel A, B, C, network could further configure the UE to monitor only control channel A and B after performing SR transmission and SR is still pending in the UE. The UE may apply this mechanism after certain period is passed (e.g. controlled by a timer/counter). By this way, UE can reduce power consumption on control channel monitoring.

As another example, a UE will monitor default numerology after performing SR transmission and SR is still pending in the UE. The UE monitor only default numerology may be controlled by a timer as previous example.

As yet another example, if control channel is used for different link scheduling (e.g. downlink, uplink, sidelink, relay link, . . . ), a UE should monitor control channel for uplink after performing SR transmission and SR is still pending in the UE.

Moreover, the UE may monitor other control channel(s) based on one or multiple conditions listed in DRX mechanism for monitoring PDCCH, except for the SR triggering condition. Possible candidates for the conditions are listed below:

1. DurationTimer is running
2. drx-InactivityTimer is running
3. drx-RetransmissionTimer is running
4. drx-ULRetransmissionTimer is running
5. ContentionResolutionTimer is running 6. An uplink grant for a pending HARQ retransmission can occur and there is data in the corresponding HARQ buffer for synchronous HARQ process
7. A PDCCH indicating a new transmission addressed to the C-RNTI of the MAC entity has not been received after successful reception of a Random Access Response for the preamble not selected by the MAC entity.
8. A sidelink grant for a pending HARQ (re-)transmission can occur.

Furthermore, the case for uplink data arrival and cases for each special SR triggering event could apply different options on PDCCH monitoring.

For example, for uplink data arrival case, the UE could apply monitoring all control channels or corresponding control channel for scheduling numerology related to numerology information carried by SR transmission, while special event applies option 3 for monitoring specific control channel(s) associated with the special SR triggering event. In this case, SR transmission will indicate special event based on setting of multiple bits SR and/or which SR configuration is used.

As another example, the UE monitors control channels for uplink in uplink data arrival cases, and the UE monitors all control channels for a special SR triggering event case (e.g. sidelink BSR or retxBSR timer expiry or new control element).

For different special SR triggering events, the UE could also apply different options. For example, the UE could apply specific control monitoring for sidelink BSR case, and all control channels monitoring for retxBSR timer expiry case and corresponding scheduling control channel to information carried by SR for uplink data arrival case.

Moreover, regarding PDCCH monitoring period, one possibility is to keep monitoring control channel(s) responsible for scheduling numerology related to SR configuration(s) with triggered SR after SR of the SR configuration is transmitted and until SR of the SR configuration is cancelled (e.g. no pending SR for the SR configuration) or SRs of all SR configuration with triggered SR are cancelled (e.g. no pending SR in the UE). Another possibility is to monitor control channel(s) responsible for scheduling numerology related to a SR configuration with triggered SR within certain period (e.g. control by timer) after performing corresponding SR transmission.

An additional possibility is to monitor one or multiple control channels regardless SR of which SR configuration with triggered SR being transmitted. The possibility mentioned above could also be applied on different control channels at the same time. For example, for a control channel (e.g. default control channel), a UE monitors the control channel after the UE performs a SR transmission. The UE will further monitor another control channel after the UE performs a SR transmission. In addition, the UE will monitor another control channel within certain period instead of monitoring till no SR pending.

Figure 19:
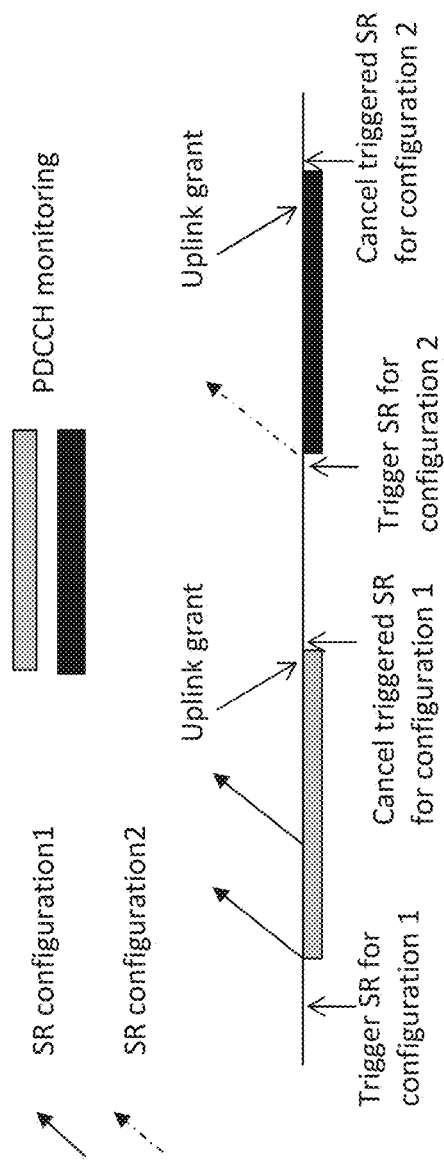
FIG. 19 is a diagram according to one exemplary embodiment.

The default control channel could be defined by one or multiple condition(s) below:
1. Control channel on PCell
2. Control channel used to monitor Paging message
3. Control channel used to monitor SI-RNTI
4. Control channel used for scheduling default numerology
5. Control channel with very first index or very last index The SR configuration with triggered SR refers to a SR configuration that has pending SR and UE already performs SR transmission once based on the SR configuration since last SR cancellation for the SR configuration. An example is shown in FIG. 19. In particular, FIG. 19 shows an exemplary embodiment of a PDCCH monitoring period of a SR configuration with triggered SR. The grey period in FIG. 19 is the PDCCH monitoring period for SR configuration 1 with triggered SR. The black period in FIG. 19 is the PDCCH monitoring period for SR configuration 2 with triggered SR.

As shown in FIG. 19, the UE starts to monitor control channel (e.g. PDCCH) for a SR configuration with triggered SR, when UE performs a SR transmission based on the SR configuration and there is SR pending for the SR configuration or for all SR configurations or in the UE.

The control channel could be a PDCCH. The control channel could be downlink control channel (e.g. ePDCCH, sPDCCH, etc.). The control channel could be a control resource set. The control channel is a downlink channel which UE can receives control signalling for scheduling resource to a data transmission.

Figure 20:
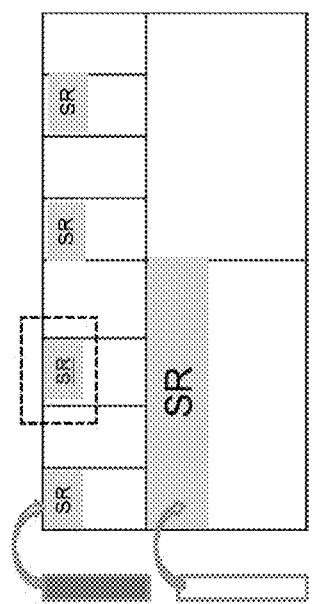
FIG. 20 is a diagram according to one exemplary embodiment.

FIG. 20 is an example of applying option 1 for method 1 and alternative 1 in case 2. There are two SR configurations and two control channels (in front part and arrow means numerology can be scheduled by the control channel). Each SR configuration is associated with one uplink data numerology need. When the UE performs SR transmission in the second transmission opportunity of the SR configuration on the top, the UE will monitor the control channel in deep grey.

Figure 21:
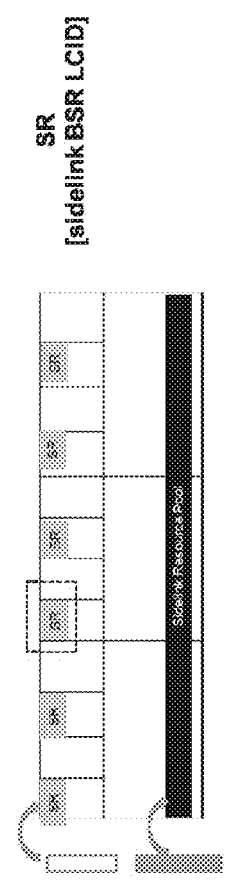
FIG. 21 is a diagram according to one exemplary embodiment.

FIG. 21 is an example for applying option 6 for method 2 and alternative 1 in case 1. A UE transmits a SR with multiple bits SR to a base station. The multiple bits SR shows existence of a sidelink BSR. The network will implicitly understand to schedule uplink resource on the control channel which can also schedule sidelink resource. On the other hand, if the multiple bits SR shows numerology for uplink data arrival case, the UE could monitor control channel following rule in previous example.

Figure 22:
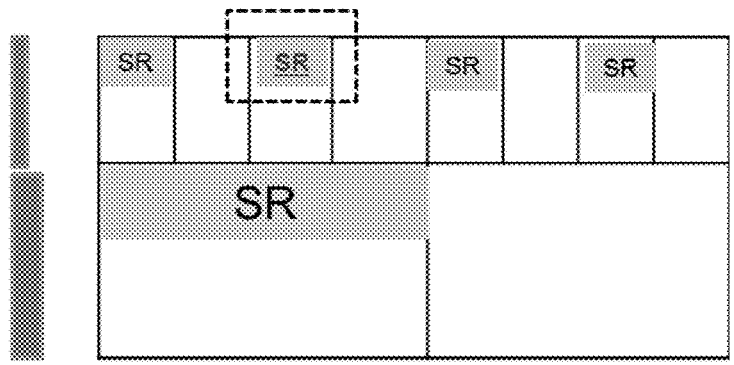
FIG. 22 is a diagram according to one exemplary embodiment.

FIG. 22 is an example for applying option 3 for method 1 and alternative 1 in case 1. When the UE performs SR transmission in the second transmission opportunity of the SR configuration on the top, the UE will monitor all control channels (in deep grey).

Figure 23:
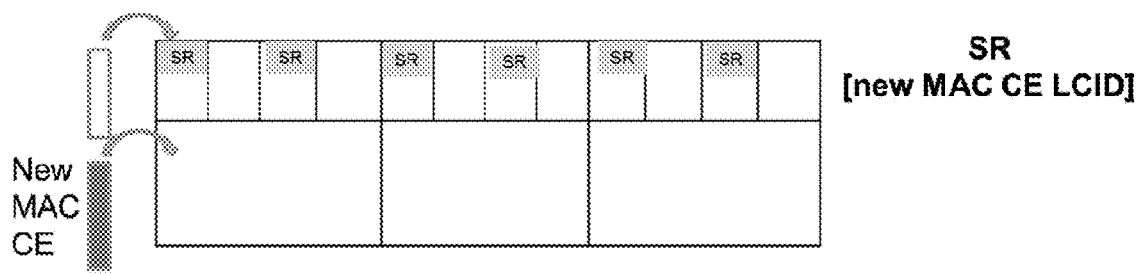
FIG. 23 is a diagram according to one exemplary embodiment.

FIG. 23 is an example for applying option 6 of method 2 and alternative 1 in case 1. A UE transmits a SR with multiple bits SR to a base station. The multiple bits SR shows existence of a new MAC CE. Since a control channel is associated with the new MAC CE, the UE just monitors the control channel (in deep grey).

Figure 24:
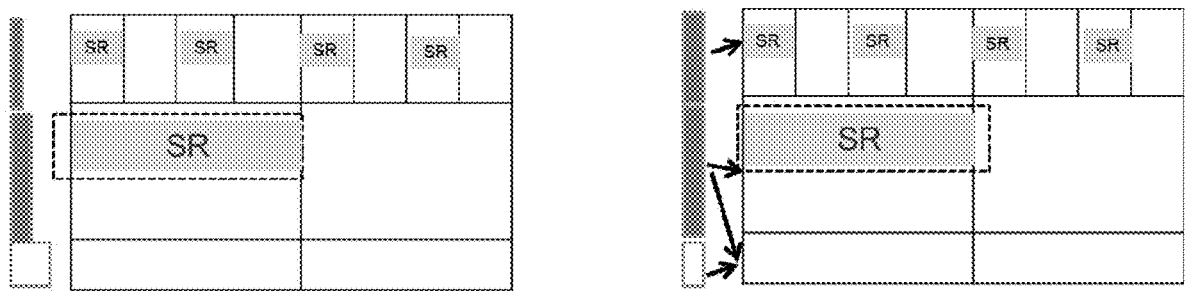
FIG. 24 is a diagram according to one exemplary embodiment.

FIG. 24 is an example for applying option 4 of method 1 and alternative 1 in case 2. There are two SR configurations and two control channels (in front part and arrow means numerology can be scheduled by the control channel). Each SR configuration is associated with one or multiple uplink data numerology need. When the UE performs SR transmission based on the second SR configuration, the UE will monitor the control channel in deep grey. Assuming the second SR configuration is related to data numerology in the middle, the UE will monitor control channels (in deep grey) for scheduling numerology in the middle and numerology larger than middle.

Figure 25:
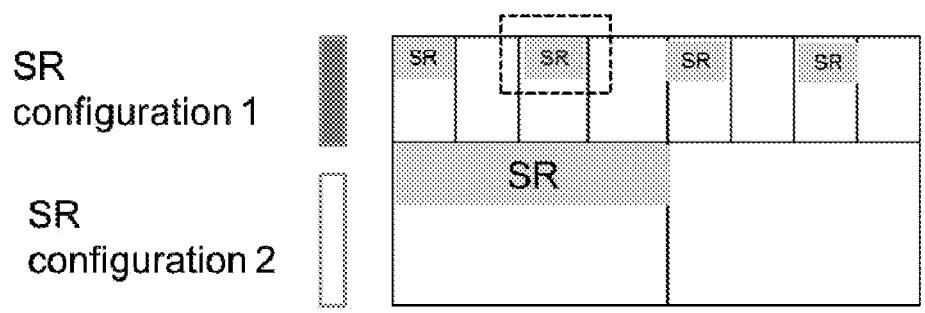
FIG. 25 is a diagram according to one exemplary embodiment.

FIG. 25 is an example for applying option 2 of method 1 and alternative 3 in case 2. There are two SR configurations and two control channels (in front part and arrow means numerology can be scheduled by the control channel). Each SR configuration is associated with one uplink data numerology need. When the UE performs SR transmission in the second transmission opportunity of the SR configuration on the top, the UE will monitor the control channel in deep grey because the control channel is associated with the SR configuration 1.

Figure 26:
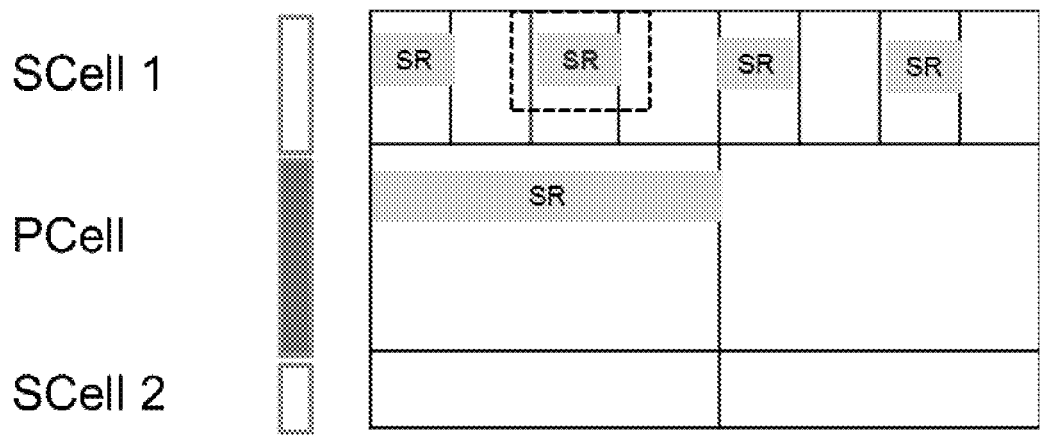
FIG. 26 is a diagram according to one exemplary embodiment.

FIG. 26 is an example for applying option 4 of method 1 and alternative 3 in case 1. There are two SR configurations and two control channels (in front part and arrow means numerology can be scheduled by the control channel). Each SR configuration is associated with one uplink data numerology need. When the UE performs SR transmission in the second transmission opportunity of the SR configuration on the top, the UE will monitor the control channel in deep grey because the control channel is default control channel.

Figure 27:
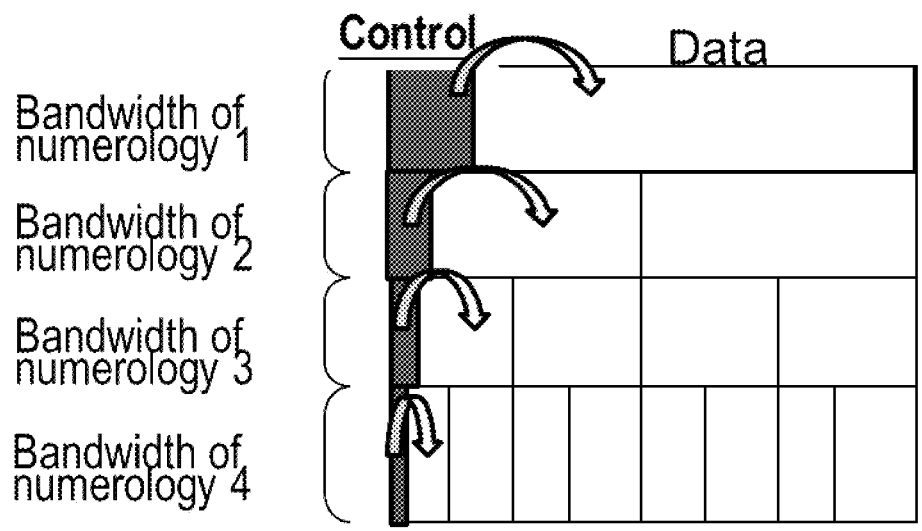
FIG. 27 is a diagram according to one exemplary embodiment.

FIG. 27 is an example for applying Alternative 1 on all control channel(s). In particular, FIG. 27 illustrates a one-to-one mapping between a control channel and scheduling of data numerology. As shown in FIG. 27, each control channel (shown as a deep grey portion) can schedule data transmission on specific numerology.

Figure 28:
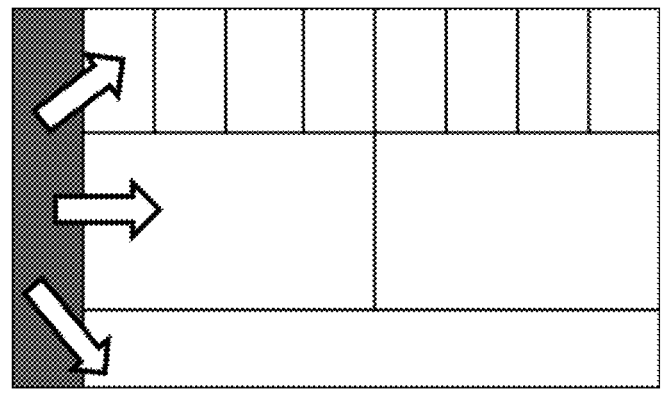
FIG. 28 is a diagram according to one exemplary embodiment.

FIG. 28 is an example for applying Alternative 3 on all control channel(s). In particular, FIG. 28 illustrates a one-to-one mapping between a control channel and scheduling of data numerology. The control channel (shown as a deep grey portion) can schedule data transmission on three different numerologies.

Figure 29:
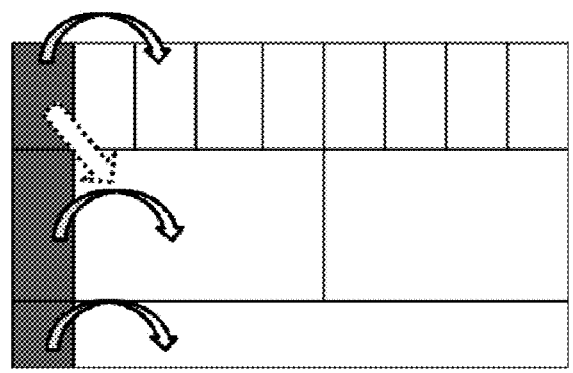
FIG. 29 is a diagram according to one exemplary embodiment.

FIG. 29 is an example for applying Alternative 2 on control channel(s). In particular, FIG. 29 illustrates a one-to-one mapping between a control channel and scheduling of data numerology. The control channel on the top is configured to be able to schedule data transmission on multiple numerologies, while other two control channels are configured to be able to schedule data transmission on specific numerology.

Figure 30:
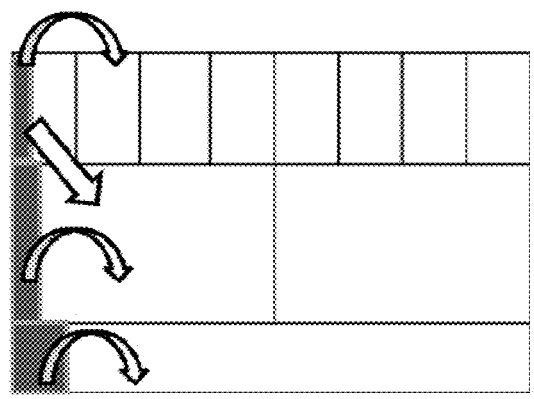
FIG. 30 is a diagram according to one exemplary embodiment.

FIG. 30 is an example for applying both alternative 1 and Alternative 2 on control channel(s). In particular, FIG. 30 illustrates a one-to-one mapping between a control channel and scheduling of data numerology. The control channel on the top is applied with alternative 2, while other two control channels are applied with alternative 1.

SR Update Mechanism

How to transmit SR for special event (e.g. sidelink BSR/timer controlled based MAC CE/new uplink MAC CE) and how to monitor downlink control resource sets when SR is transmitted and not cancelled are discussed above. The discussion now turns to how to handle new coming event triggering SR when there is ongoing SR transmission.

Possible cases for occurring order of different SR triggering conditions are listed below:

| | |
|---|---|
| Case A. | Uplink data arrival (ongoing); Higher priority uplink data arrival (new) |
| Case B. | Special event (ongoing); Uplink data arrival (new) |
| Case C. | Uplink data arrival (ongoing); Special event (new) |
| Case D. | Special event (ongoing); Special event (new) |

Note:
The special event can be referred to cases 1, 2, and 3 (e.g. sidelink BSR, etc.) in above discussion.

Applying Method 1 (Multiple SR Resource Sets/Multiple SR Configurations for Requesting Resource on Different Numerologies)

In case A, a UE is transmitting SR for uplink data arrival case. More specifically, the uplink data arrival means that a regular BSR is triggered due to buffer becoming non-empty or higher priority data coming. Since SR transmission may not be received, the UE should keep transmitting SR in its SR transmission opportunities. While UE keeps transmitting SR, higher priority data may arrive and trigger another regular BSR. In such condition, the case A will occur.

Assuming the new data arrival will trigger SR based on different SR configurations from SR configuration of ongoing SR transmission, the following possible solutions regarding how to handle SR transmission(s) based on the multiple SR configurations in case A are proposed:

Solution 1 (Parallel SR transmissions based on multiple SR configurations)—In this solution, the UE can support to transmit multiple SR transmissions based on different SR configurations. The multiple SR transmissions may occur on same or different cells (e.g. all on PCell or one on PCell, other on SCell). Hence, the new uplink data arrival event triggers SR transmission based on a SR configuration, while current SR transmission performed based on another SR configuration.

Based on this solution, the network can derive more information from SR transmissions belonging to the same UE. For example, if ongoing event is for delay sensitive data and new data arrival is for latency endurable data, parallel multiple SR transmission based on different SR configurations can help network (e.g. gNB) to provide data resource for delay sensitive for satisfying the need of both new events and current event.

Solution 2 (Update SR transmission to reflect highest priority need (either new event or current buffer size)—The UE may or may not support parallel multiple SR transmissions based on different SR configurations. If the UE does not support, the UE will need to stop current SR transmission for initiating SR transmission based on a SR configuration different from current used SR configuration.

Depending on whether the new event is triggered for higher priority data, the UE will decide whether to switch to use a different SR configuration to perform SR transmission. More specifically, the UE will change to use SR configuration related to new event (e.g. logical channel which trigger new event) if the new event is higher priority data coming. The UE will not change to use SR configuration related to new event (e.g. logical channel which trigger new event), if the new event is for data with priority lower than the priority of the logical channel triggered ongoing SR transmission. By this way, the UE can transmit less SR transmissions and reduce power consumption.

Solution 3 (Keep using ongoing SR configuration instead of initiating SR transmission based on a different SR configuration for new arrival data)—The UE will keep transmitting SR transmission based on current used SR configuration, regardless whether there is higher priority data coming.

Solution 4 (Decide whether to change SR configuration based on latency)—The UE will decide whether to use a SR configuration related to new event based on latency requirement of data. If the latency requirement of data related to new event is tighter than requirement of any data in the buffer, the UE will initiate SR transmission based on SR configuration related to new event. Regarding ongoing SR transmission, the UE may or may not stop current SR transmission even if a new SR transmission for a different SR configuration is initiated. The latency could be derived based on QoS of the logical channel to which the data belongs. The latency could be derived based on TTI and/or numerology of the logical channel to which the data belongs.

Solution 5 (Use SR configuration related to latest SR triggering event to perform SR transmission)—The UE will initiate SR transmission based on SR configuration related to the new event (e.g. higher priority data coming, retx-BSR timer expiry, etc.).

In case B, a UE is transmitting SR for special event case. More specifically, the special event could be referred to cases 1, 2, and 3 (e.g. sidelink BSR, timer controlled based MAC CE, or new uplink MAC CE) as discussed above.

Since SR transmission may not be received, the UE should keep transmitting SR in its SR transmission opportunities. While the UE keeps transmitting SR, uplink data may arrive and trigger a regular BSR. In such condition, case B will occur. The difference between case B and case C is the triggering order between the special event and uplink data arrival event.

Assuming the new coming event (e.g. uplink data arrival or special event) will trigger SR based on different SR configurations from SR configuration of ongoing SR transmission, possible solutions based different special event regarding how to handle SR transmission(s) based on the multiple SR configurations are proposed as follows:

Regular Sidelink BSR Triggers SR

Solution 1 (Parallel SR transmissions based on multiple SR configurations)—In this solution, the UE can support to transmit multiple SR transmissions based on different SR configurations. The multiple SR transmissions may occur on same or different cells (e.g. all on PCell or one on PCell, other on SCell or any other possible combination between multiple SCells and PCell). Hence, the new event (e.g. uplink data arrival) triggers SR transmission based on a SR configuration, while current SR transmission performed based on another SR configuration.

Based on this solution, the network can derive more information from SR transmissions belonging to the same UE. For example, the network (e.g. gNB) can discover the occurrence of uplink data arrival and special event.

Solution 2 (Update SR transmission to reflect highest priority need (either new event or current buffer size)—The UE may or may not support parallel multiple SR transmissions based on different SR configurations. If UE does not support, the UE will need to stop current SR transmission for initiating SR transmission based on a SR configuration different from current used SR configuration.

Since UE needs to reflect higher priority need in this solution, the priority between special event and uplink data arrival will need to be defined clearly. Some possible options are listed below:

1. Follow Logical channel prioritization rule—In the current LCP mechanism, each MAC CE and data will have corresponding priority for deciding including order and/or deciding what should be included if there is not enough resource to accommodate all data and uplink MAC CE. The priority comparison could occur between the uplink data and MAC CE (regular sidelink BSR) related to the special event. Moreover, the uplink data may not belong to any LCG or be configured or indicated as special data (e.g. with special indication or threshold in configuration of logical channel the special data belonging to, or duplication data in one leg). Since the uplink data arrival event triggers regular BSR and indirectly triggers SR, the priority comparison could occur between the regular uplink BSR and MAC CE (regular sidelink BSR) related to the special event.

Depending on priority comparison result, the SR transmission will be performed based on a SR configuration related to event with higher priority. The UE may stop using current SR configuration.

2. Follow network configuration (e.g. threshold, configuration of specific logical channel, etc.)—In this option, network (e.g. gNB) can set up the prioritization between new coming event and current event. More specifically, network can set up prioritization based on configuring a threshold or sending an indication (in configuration).

For example, the network can provide a threshold related to priority of sidelink data to decide whether regular sidelink BSR is more important than regular uplink BSR. If sidelink BSR is for reporting data with priority above the threshold, the regular sidelink BSR is more important. Alternatively, it can also be that the regular sidelink BSR is more important if sidelink BSR is for reporting data with priority below the threshold. There could be more than one thresholds (or called limitation) for creating a range for prioritization. The priority of sidelink data could be replaced to priority of uplink logical channel, or QoS flow.

As another example, the network can provide an indication in a (sidelink) logical channel configuration or in a sidelink service configuration (e.g. V2V, D2D relay, V2X, MBMS, URLLC, full-duplex, etc.) or in MAC CE related configuration. If such indication is included, the priority could be prioritized.

In one embodiment, if the indication is in a logical channel configuration, the regular uplink BSR will be prioritized if the data becoming available for that logical channel. Furthermore, if the indication is in a sidelink service configuration (e.g. V2V, D2D relay, etc.), the sidelink BSR will be prioritized if the data becoming available for service. In addition, if the indication is in a MAC CE related configuration, the MAC CE will be prioritized.

The indication may or may not indicate how much it can be prioritized. If the indication cannot indicate how much it can be prioritized (e.g. prioritized over uplink BSR, or SPS confirmation, or even CCCH SDU), the MAC CE (e.g. sidelink BSR, New uplink MAC CE, or Timer controlled based MAC CE) will be prioritized over what MAC CE or what data should be predefined. If the indication indicates how much it can be prioritized, the indication may include sort of index (e.g. LCP rule position, etc.) or value (e.g. priority) or bitmap (e.g. priority bitmap or LCP rule position bitmap) for informing the prioritized result.

By this way, UE can transmit less SR transmission and reduce power consumption.

Solution 3 (Keep using ongoing SR configuration instead of initiating SR transmission based on a different SR configuration for new arrival data)—The UE will keep transmitting SR transmission based on current used SR configuration, regardless of what new coming event is. The SR configuration used to performing SR transmission may be updated if SR triggering event related to current SR transmission is cancelled.

Solution 4 (Decide whether to change SR configuration based on latency)—The UE will decide whether to use a SR configuration related to new event based on latency requirement of data (e.g. sidelink data). If the latency requirement of data related to new event is tighter than requirement of any data in the buffer, the UE will initiate SR transmission based on SR configuration related to new event. Regarding ongoing SR transmission, the UE may or may not stop current SR transmission even if a new SR transmission for a different SR configuration is initiated.

The latency comparison may occur between uplink data and sidelink data. For example, if minimum latency requirement of the sidelink data in the buffer is associated with 1 ms and minimum latency requirement of the uplink data in the buffer is 4 ms (e.g. eMBB), the sidelink BSR will be prioritized. Alternatively, the comparison occur between MAC CEs.

Moreover, since MAC CE has no latency requirement in LTE, the latency requirement for MAC CE may need to be defined and/or to be configured for applying this solution. For example, the sidelink BSR will be defined with a latency requirement based on numerology of sidelink resource pool or cell for performing sidelink transmission. As another example, the sidelink BSR will be defined with a latency requirement based on sidelink logical channel (with data) or sidelink QoS flow (with data).

Solution 5 (Use SR configuration related to latest SR triggering event to perform SR transmission)—The UE will initiate SR transmission based on SR configuration related to the new event (e.g. higher priority data coming or retx-BSR timer expiry, or special event, etc.). For example, assume the sidelink BSR is triggered when SR for uplink BSR is transmitted. The SR configuration used for current SR transmission will be changed to SR configuration related to sidelink BSR.

Solution 6 (Always prioritize uplink data need over the special event (e.g. sidelink BSR))—If new coming event is regular sidelink BSR and current SR transmission reflects uplink data need, the UE will keep using the current SR configuration. On the contrary, if new coming event is for uplink data need and current SR transmission is for regular sidelink BSR, the UE will change the current SR configuration to a different SR configuration related to the new coming event.

Timer Controlled Based MAC CE Triggers SR

Solution 1 (Parallel SR transmissions based on multiple SR configurations)—In this solution, the UE can support to transmit multiple SR transmissions based on different SR configurations. The multiple SR transmissions may occur on same or different cells (e.g. all on PCell or one on PCell, other on SCell or any other possible combination between multiple SCells and PCell). Hence, the new event (e.g. uplink data arrival, special event) triggers SR transmission based on a SR configuration, while current SR transmission performed based on another SR configuration.

Based on this solution, the network can derive more information from SR transmissions belonging to the same UE. For example, the network (e.g. gNB) can discover the occurrence of uplink data arrival and special event.

Solution 2 (Update SR transmission to reflect highest priority need (either new event or current buffer size))—The UE may or may not support parallel multiple SR transmissions based on different SR configurations. If UE does not support, the UE will need to stop current SR transmission for initiating SR transmission based on a SR configuration different from current used SR configuration.

Since the UE needs to reflect higher priority need in this solution, the priority between special event and uplink data arrival will need to be defined clearly. Possible options are listed below:

1. Follow Logical channel prioritization rule—In the current LCP mechanism, each MAC CE and data will have corresponding priority for deciding including order and/or deciding what should be included if there is not enough resources to accommodate all data and uplink MAC CE. The priority comparison could occur between the uplink data (e.g. highest priority data in the buffer) and MAC CE (Timer controlled based MAC CE) related to the special event. Moreover, the uplink data may not belong to any LCG or be configured or indicated as special data (e.g. with special indication or threshold in configuration of logical channel the special data belonging to, or duplication data in one leg). Since the uplink data arrival event triggers regular BSR and indirectly triggers SR, the priority comparison could occur between the regular uplink BSR and MAC CE (Timer controlled based MAC CE) related to the special event.

Depending on priority comparison result, SR transmission will be performed based on a SR configuration related to event with higher priority. The UE may stop using current SR configuration.

2. Follow network configuration (e.g. threshold, configuration of specific logical channel, etc.)—In this candidate, network (e.g. gNB) can set up the prioritization between new coming event and current event. More specifically, network can set up prioritization based on configuring a threshold or sending an indication (in configuration).

For example, network can provide a threshold related to priority of uplink logical channel to decide whether Timer controlled based MAC CE is more important than regular uplink BSR. If BSR is for reporting data belonging to a logical channel with priority above the threshold, the regular uplink BSR is more important. Alternatively, the regular uplink BSR could be more important if BSR is for reporting data belonging to a logical channel with priority below the threshold. There could be more than one thresholds (or called limitation) for creating a range for prioritization. The priority of uplink logical channel could be replaced to QoS flow.

As another example, the network can provide an indication in a logical channel configuration or in a service configuration (e.g. V2X, relay, MBMS, URLLC, full-duplex, etc.) or in MAC CE related configuration. If such indication is included, the priority could be prioritized.

In one embodiment, if the indication is in a logical channel configuration, the regular uplink BSR will be prioritized if the data becoming available for that logical channel. Furthermore, if the indication is in a service configuration (e.g. V2V, D2D relay, etc.), the BSR will be prioritized if the data becoming available for service. In addition, if the indication is in a MAC CE related configuration, the MAC CE will be prioritized.

The indication may or may not indicate how much it can be prioritized. If the indication cannot indicate how much it can be prioritized then the MAC CE (e.g. sidelink BSR, New uplink MAC CE, or Timer controlled based MAC CE) will be prioritized over what MAC CE or what data should be predefined. If the indication indicates how much it can be prioritized, the indication may include sort of index (e.g. LCP rule position, etc.) or value (e.g. priority) or bitmap (e.g. priority bitmap or LCP rule position bitmap) for informing the prioritized result. By this way, UE can transmit less SR transmission and reduce power consumption.

Solution 3 (Keep using ongoing SR configuration instead of initiating SR transmission based on a different SR configuration for new arrival data)—The UE will keep transmitting SR transmission based on current used SR configuration, regardless of what new coming event is. The SR configuration used to performing SR transmission may be updated if SR triggering event related to current SR transmission is cancelled.

Solution 4 (Decide whether to change SR configuration based on latency)—The UE will decide whether to use a SR configuration related to new event based on latency requirement of new coming event (e.g. regular BSR for a logical channel or timer controlled based MAC CE). If the latency requirement related to new event is tighter than latency requirement of any other current SR triggering event(s), the UE will initiate SR transmission based on SR configuration related to new event. Regarding ongoing SR transmission, the UE may or may not stop current SR transmission even if a new SR transmission for a different SR configuration is initiated.

Since MAC CE has no latency requirement in LTE, the latency requirement for MAC CE may need to be defined and/or to be configured for applying this solution. One possible way is to associate the timer controlled based MAC CE with certain TTI duration and/or certain numerology (in related configuration). The associated TTI duration and/or numerology may also be used for timer counting.

Solution 5 (Use SR configuration related to latest SR triggering event to perform SR transmission)—The UE will initiate SR transmission based on SR configuration related to the new event (e.g. higher priority data coming or retx-BSR timer expiry, or special event . . . ). For example, assuming the Timer controlled based MAC CE is triggered when SR for uplink BSR is transmitted, the SR configuration used for current SR transmission will be changed to SR configuration related to Timer controlled based MAC CE.

Solution 6 (Always prioritize uplink data need over the special event (e.g. Timer controlled based MAC CE))—If the new coming event is Timer controlled based MAC CE and current SR transmission reflects uplink data need, the UE will keep using the current SR configuration. On the contrary, if new coming event is for uplink data need and current SR transmission is for Timer controlled based MAC CE, the UE will change the current SR configuration to a different SR configuration related to the new coming event.

Solution 7 (Define prioritization between each special event and uplink data arrival case by case)—It is possible to define relation between each potential uplink MAC CE(s) and uplink BSR and any other MAC CE which can trigger SR transmission (e.g. sidelink BSR, timer controlled based MAC CE). In this solution, for example, a timer controlled based MAC CE (e.g. beam related MAC CE) could be defined to always prioritize over uplink data arrival. Moreover, another timer controlled based (e.g. (sidelink) PHR) could be defined to have lower priority compared with uplink data arrival (e.g. regular BSR). Based on defined result, the UE may always prioritize a special event (e.g. a specific MAC CE which is not BSR) over uplink data arrival case (e.g. regular BSR). In addition, the UE may also always prioritize uplink data arrival case (e.g. regular BSR) over another special event (e.g. a specific MAC CE which is not BSR). The UE may also always prioritize a special event over another special event based on defined result.

New Uplink MAC CE Triggers SR (Case 3 in Above Discussion)

Solution 1 (Parallel SR transmissions based on multiple SR configurations)—In this solution, the UE can support to transmit multiple SR transmissions based on different SR configurations. The multiple SR transmissions may occur on same or different cells (e.g. all on PCell or one on PCell, other on SCell or any other possible combination between multiple SCells and PCell). Hence, the new event (e.g. uplink data arrival, special event) triggers SR transmission based on a SR configuration, while current SR transmission performed based on another SR configuration.

Based on this solution, the network can derive more information from SR transmissions belonging to the same UE. For example, the network (e.g. gNB) can discover the occurrence of uplink data arrival and special event.

Solution 2 (Update SR transmission to reflect highest priority need (either new event or current buffer size))—The UE may or may not support parallel multiple SR transmissions based on different SR configurations. If UE does not support, the UE will need to stop current SR transmission for initiating SR transmission based on a SR configuration different from current used SR configuration.

Since UE needs to reflect higher priority need in this solution, the priority between special event and uplink data arrival will need to be defined clearly. Possible options are listed below:

1. Follow Logical channel prioritization rule—In the current LCP mechanism, each MAC CE and data will have corresponding priority for deciding including order and/or deciding what should be included if there is not enough resource to accommodate all data and uplink MAC CE. The priority comparison could occur between the uplink data (e.g. highest priority data in the buffer) and MAC CE New uplink MAC CE) related to the special event. Moreover, the uplink data may not belong to any LCG or be configured or indicated as special data (e.g. with special indication or threshold in configuration of logical channel the special data belonging to, or duplication data in one leg). Since the uplink data arrival event triggers regular BSR and indirectly triggers SR, the priority comparison could occur between the regular uplink BSR and MAC CE (New uplink MAC CE) related to the special event.

Depending on priority comparison result, SR transmission will be performed based on a SR configuration related to event with higher priority. The UE may stop using current SR configuration.

2. Follow network configuration (e.g. threshold, configuration of specific logical channel, etc.)—In this option, the network (e.g. gNB) can set up the prioritization between new coming event and current event. More specifically, the network can set up prioritization based on configuring a threshold or sending an indication (in configuration).

For example, the network can provide a threshold related to priority of uplink logical channel to decide whether New uplink MAC CE is more important than regular uplink BSR. If BSR is for reporting data belonging to a logical channel with priority above the threshold, the regular uplink BSR is more important. Alternatively, the regular uplink BSR could be more important if BSR is for reporting data belonging to a logical channel with priority below the threshold. There could be more than one thresholds (or called limitation) for creating a range for prioritization. The priority of uplink logical channel could be replaced to QoS flow.

As another example, the network can provide an indication in a logical channel configuration or in a service configuration (e.g. V2X, relay, MBMS, URLLC, full-duplex, etc.) or in New uplink MAC CE related configuration. If such indication is included, the priority could be prioritized.

In one embodiment, if the indication is in a logical channel configuration, the regular uplink BSR will be prioritized if the data becoming available for that logical channel. Furthermore, if the indication is in a service configuration (e.g. V2V, D2D relay, etc.), the BSR will be prioritized if the data becoming available for service. In addition, if the indication is in a New uplink MAC CE related configuration, the New uplink MAC CE will be prioritized.

The indication may or may not indicate how much it can be prioritized. If the indication cannot indicate how much it can be prioritized, the MAC CE (e.g. sidelink BSR/New uplink MAC CE/Timer controlled based MAC CE) will be prioritized over what MAC CE or what data should be predefined. If the indication indicates how much it can be prioritized, the indication may include sort of index (e.g. LCP rule position, etc.) or value (e.g. priority) or bitmap (e.g. priority bitmap or LCP rule position bitmap) for informing the prioritized result. By this way, the UE can transmit less SR transmission and reduce power consumption.

Solution 3 (Keep using ongoing SR configuration instead of initiating SR transmission based on a different SR configuration for new arrival data)—The UE will keep transmitting SR transmission based on current used SR configuration, regardless of what new coming event is. The SR configuration used to performing SR transmission may be updated if SR triggering event related to current SR transmission is cancelled.

Solution 4 (Decide whether to change SR configuration based on latency)—The UE will decide whether to use a SR configuration related to new event based on latency requirement of new coming event (e.g. regular BSR for a logical channel or Potential new MAC CE). If the latency requirement related to new event is tighter than latency requirement of any other current SR triggering event(s), the UE will initiate SR transmission based on SR configuration related to new event. Regarding ongoing SR transmission, the UE may or may not stop current SR transmission even if a new SR transmission for a different SR configuration is initiated.

Since MAC CE has no latency requirement in LTE, the latency requirement for MAC CE may need to be defined and/or to be configured for applying this solution. Since MAC CE has no latency requirement in LTE, the latency requirement for MAC CE may need to be defined and/or to be configured for applying this solution. One possible way is to associate the potential new MAC CE with certain TTI duration and/or certain numerology (in related configuration). The associated TTI duration and/or numerology may also be used for timer counting.

Solution 5 (Use SR configuration related to latest SR triggering event to perform SR transmission)—The UE will initiate SR transmission based on SR configuration related to the new event (e.g. higher priority data coming or retx-BSR timer expiry, or special event . . . ). For example, assume the New uplink MAC CE is triggered when SR for uplink BSR is transmitted. The SR configuration used for current SR transmission will be changed to SR configuration related to New uplink MAC CE.

Solution 6 (Always prioritize uplink data need over the special event (e.g. New uplink MAC CE))—If new coming event is Timer controlled based MAC CE and current SR transmission reflects uplink data need, the UE will keep using the current SR configuration. On the contrary, if new coming event is for uplink data need and current SR transmission is for New uplink MAC CE, the UE will change the current SR configuration to a different SR configuration related to the new coming event.

Solution 7 (Define prioritization between each special event and uplink data arrival case by case)—Relation between each potential uplink MAC CE(s) and uplink BSR and any other MAC CE which can trigger SR transmission (e.g. sidelink BSR, timer controlled based MAC CE) could be defined. In this solution, for example, a potential uplink MAC CE (e.g. beam related MAC CE) could be defined to be always prioritized over uplink data arrival. In addition, another potential uplink MAC CE (e.g. (sidelink) PHR) has lower priority compared with uplink data arrival (e.g. regular BSR) could be defined. Based on defined result, the UE may always prioritize a special event (e.g. a specific MAC CE which is not BSR) over uplink data arrival case (e.g. regular BSR). Furthermore, the UE may also always prioritize uplink data arrival case (e.g. regular BSR) over another special event (e.g. a specific MAC CE which is not BSR). The UE may also always prioritize a special event over another special event based on defined result.

In case D, a UE is transmitting SR for special event case. More specifically, the special event could be referred to cases 1, 2, and 3 (e.g. sidelink BSR/timer controlled based MAC CE/new uplink MAC CE) as discussed above. Since SR transmission may not be received, the UE should keep transmitting SR in its SR transmission opportunities. While UE keeps transmitting SR, another special event may be triggered and indirectly trigger SR. In such condition, case D will occur.

Solution 1 (Parallel SR transmissions based on multiple SR configurations)—In this solution, the UE can support to transmit multiple SR transmissions based on different SR configurations. The multiple SR transmissions may occur on same or different cells (e.g. all on PCell or one on PCell, other on SCell or any other possible combination between multiple SCells and PCell). Hence, the new event (e.g. special event) triggers SR transmission based on a SR configuration, while current SR transmission performed based on another SR configuration (for previous SR triggering event).

Based on this solution, the network can derive more information from SR transmissions belonging to the same UE. For example, the network (e.g. gNB) can discover the occurrence of different special events.

Solution 2 (Update SR transmission to reflect highest priority need (either new event or current buffer size)—The UE may or may not support parallel multiple SR transmissions based on different SR configurations. If UE does not support, the UE will need to stop current SR transmission for initiating SR transmission based on a SR configuration different from current used SR configuration.

Since the UE needs to reflect higher priority need in this solution, the priority between the special events will need to be defined clearly. Possible candidates are listed below:

1. Follow Logical channel prioritization rule—In the current LCP mechanism, each uplink MAC CE and data will have corresponding priority for deciding including order and/or deciding what should be included if no enough resource can accommodate all data and uplink MAC CE. The priority comparison could occur between MAC CEs related to different special events.

Depending on priority comparison result, SR transmission will be performed based on a SR configuration related to event with higher priority. The UE may stop using current SR configuration to perform SR transmission.

2. Follow network configuration (e.g. threshold, configuration of specific logical channel, etc.)—In this candidate, the network (e.g. gNB) can set up the prioritization between new coming event and current event. More specifically, the network can set up prioritization based on configuring a threshold or sending an indication (in configuration).

For example, the network can provide a threshold related to priority of sidelink logical channel to decide whether certain special event(s) is more important than regular sidelink BSR. If sidelink BSR is for reporting data belonging to a logical channel with priority above the threshold, the regular sidelink BSR is more important. Alternatively, the regular sidelink BSR could be more important if sidelink BSR is for reporting sidelink data belonging to a logical channel with priority below the threshold. There could be more than one thresholds (or called limitation) for creating a range for prioritization.

As another example, network can provide an indication in a service configuration (e.g. V2V, V2X, relay, MBMS, URLLC, full-duplex, etc.) or in special event related configuration (e.g. beam-forming configuration, SPS configuration, grant free configuration, Packet duplication configuration). If such indication is included, the priority of related MAC CE could be prioritized.

In one embodiment, if the indication is in a service configuration (e.g. V2V, D2D relay, . . . ), the BSR will be prioritized if the data becoming available for service. Furthermore, if the indication is in a special event related configuration, the corresponding MAC CE will be prioritized.

The indication may or may not indicate how much it can be prioritized. If the indication cannot indicate how much it can be prioritized, the MAC CE (e.g. sidelink BSR/New uplink MAC CE/Timer controlled based MAC CE) will be prioritized over what MAC CE or what data should be predefined. If the indication indicates how much it can be prioritized, the indication may include sort of index (e.g. LCP rule position, etc.) or value (e.g. priority) or bitmap (e.g. priority bitmap or LCP rule position bitmap) for informing the prioritized result. By this way, the UE can transmit less SR transmission and reduce power consumption.

Solution 3 (Keep using ongoing SR configuration instead of initiating SR transmission based on a different SR configuration for new arrival data)—The UE will keep transmitting SR transmission based on current used SR configuration, regardless of what new coming event is. The SR configuration used to performing SR transmission may be updated if SR triggering event related to current SR transmission is cancelled.

Solution 4 (Decide whether to change SR configuration based on latency)—The UE will decide whether to use a SR configuration related to new event based on latency requirement of new coming special event. If the latency requirement related to new event is tighter than latency requirement of any other current SR triggering event(s), the UE will initiate SR transmission based on SR configuration related to new event. Regarding ongoing SR transmission, the UE may or may not stop current SR transmission even if a new SR transmission for a different SR configuration is initiated.

Since MAC CE has no latency requirement in LTE, the latency requirement for MAC CE may need to be defined and/or to be configured for applying this solution.

Solution 5 (Use SR configuration related to latest SR triggering event to perform SR transmission)—The UE will initiate SR transmission based on SR configuration related to the new event (e.g. retx-BSR timer expiry, or special event). For example, assuming the New uplink MAC CE is triggered when SR for sidelink BSR is transmitted, the SR configuration used for current SR transmission will be changed to SR configuration related to New uplink MAC CE.

Solution 6 (Define prioritization between each special event case by case)—Relation between each potential uplink MAC CE(s) and uplink BSR and any other MAC CE which can trigger SR transmission (e.g. sidelink BSR, timer controlled based MAC CE) could be defined. In this solution, for example, a potential uplink MAC CE (e.g. beam related MAC CE) could be defined to be always prioritized over sidelink BSR. Moreover, another potential uplink MAC CE (e.g. (sidelink) PHR) has lower priority compared with a timer controlled based MAC CE could be defined. Based on defined result, the UE may always prioritize a special event (e.g. a specific MAC CE which is not BSR) over another special event.

How SR configuration is related to or associated with new event can be referred to the above discussion about how to trigger SR for special event. Furthermore, the relation between SR configuration and uplink data arrival is between logical channel information and SR configuration. The logical channel information could be LCID, TTI duration limitation, numerology, or cell belonging.

Figure 31:
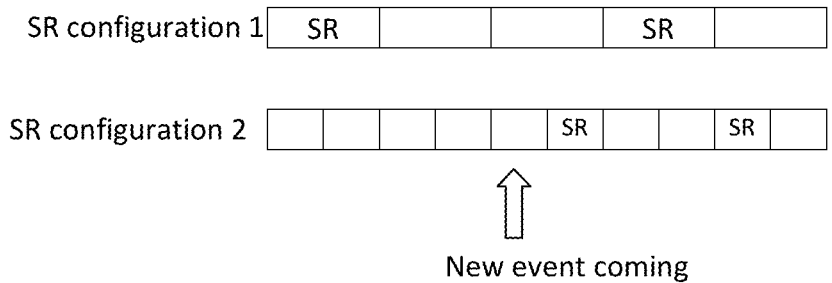
FIG. 31 is a diagram according to one exemplary embodiment.

FIG. 31 is an exemplary embodiment for the parallel multiple SR transmissions based on different SR configurations. The UE is performing SR transmission based on SR configuration 1. When a new event is coming and the new event is related to SR configuration 2, UE will also perform SR transmission based SR configuration 2, while SR transmissions based on SR configuration 1 will not be stopped and/or cancelled.

Figure 32:
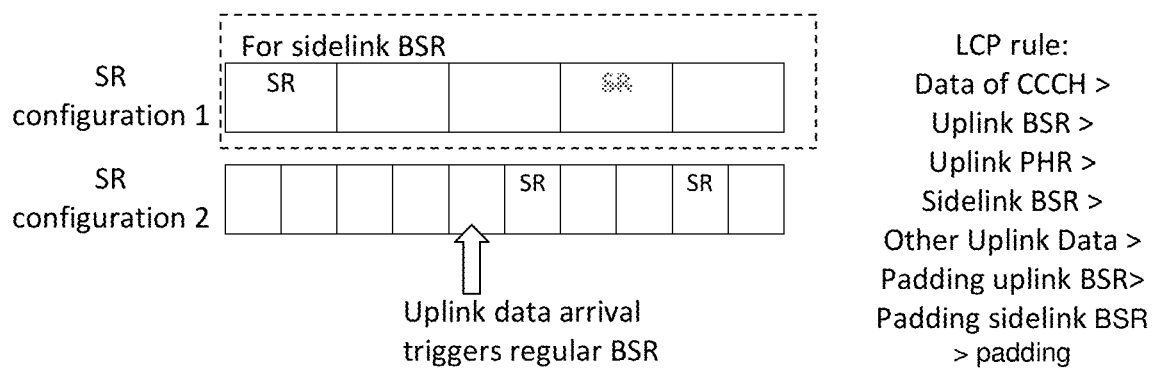
FIG. 32 is a diagram according to one exemplary embodiment.

FIG. 32 is an exemplary embodiment for following LCP rule to prioritize. In particular, FIG. 32 illustrates following LCP rule to decide perform SR transmission based on which SR configuration in multiple SR configurations. As shown in FIG. 32, the UE is transmitting SR based on SR configuration related to Sidelink. More specifically, SR configuration is related to sidelink BSR. However, when a regular uplink BSR is triggered by uplink data arrival and SR configuration 2 is related to the regular uplink BSR for reflecting the need of uplink data in buffer (e.g. logical channel which indirectly trigger SR), the SR transmission based on SR configuration 1 will be stopped because sidelink BSR has lower priority than uplink BSR. The UE will start to perform SR transmission based on SR configuration 2.

Figure 33:
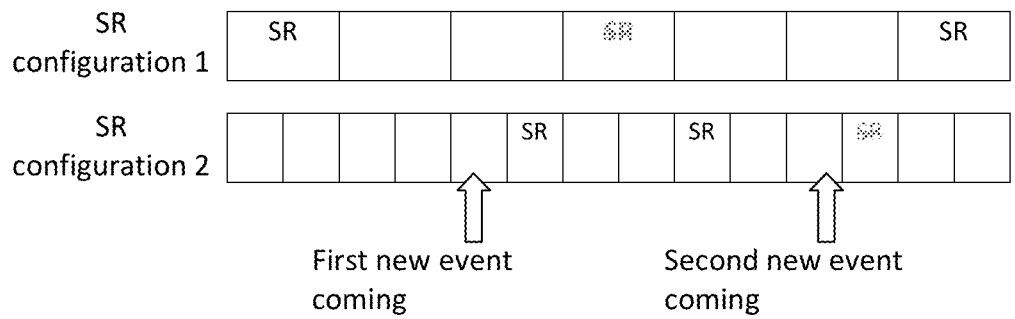
FIG. 33 is a diagram according to one exemplary embodiment.

FIG. 33 is an exemplary embodiment for following the latest event. In particular, FIG. 33 illustrates parallel multiple SR transmissions based on different SR configurations. In this example, the first new event is associated with SR configuration 2. Hence, the UE will change to perform SR transmission based on SR configuration 2 and stop SR transmission based on SR configuration 1 based on the solution. When a second new event related to SR configuration 1 occurs, the UE will change back to use SR configuration 1 to perform SR transmissions.

Figure 34:
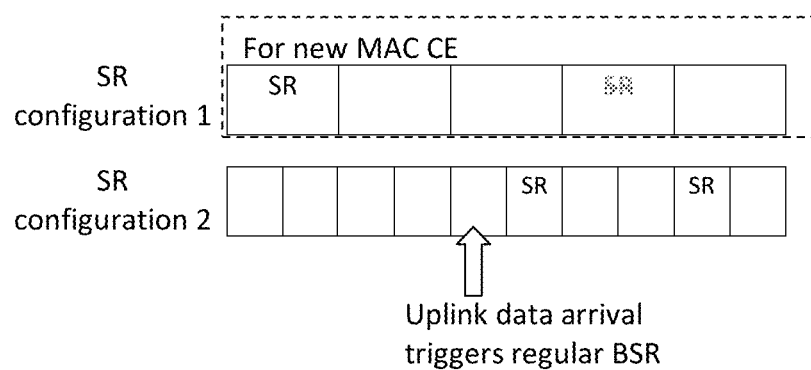
FIG. 34 is a diagram according to one exemplary embodiment.

FIG. 34 is an exemplary embodiment for always following uplink data need. When a UE is transmitting SR for new uplink MAC CE which is related to SR configuration 2, an uplink data arrival event occurs. The UE will change to use SR configuration 2 to perform SR transmission due to uplink data arrival event related to SR configuration 2. The uplink data arrival event is related to SR configuration 2 because the TTI/numerology type need of the uplink data should be distinguished by SR configuration 2.

Figure 35:
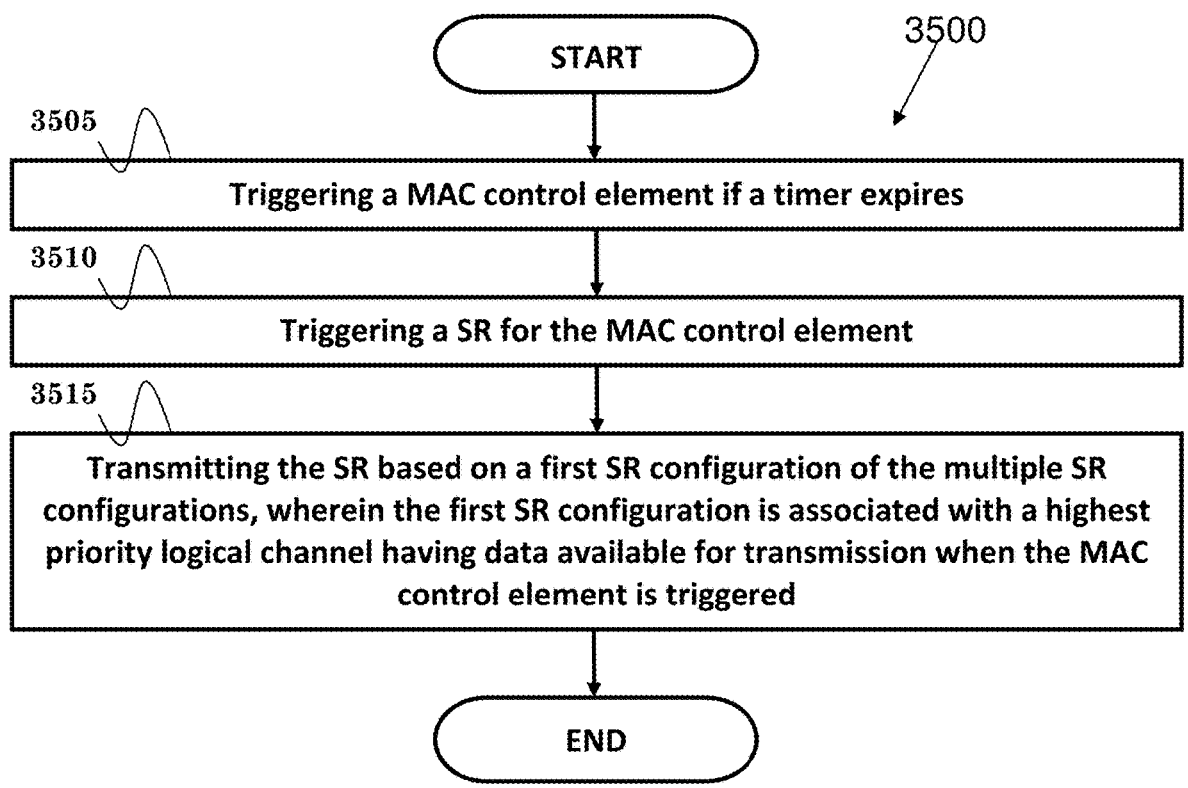
FIG. 35 is a flow chart according to one exemplary embodiment.

FIG. 35 is a flow chart 3500 according to one exemplary embodiment of a UE, wherein the UE is allocated with multiple SR configurations by a network node. In step 3505, the UE triggers a MAC control element if a timer expires. In one embodiment, the MAC control element could be triggered if the UE has data for any logical channels that belong to a Logical Channel Group. In step 3510, the UE triggers a SR for the MAC control element. In step 3515, the UE transmits the SR based on a first SR configuration of the multiple SR configurations, wherein the first SR configuration is associated with a highest priority logical channel having data available for transmission when the MAC control element is triggered.

In one embodiment, the timer could be a retxBSR-Timer. The MAC control element could be a BSR. The first SR configuration could be associated with the highest priority logical channel based on an identity of the highest priority logical channel.

Referring back to FIGS. 3 and 4, in one exemplary embodiment of a UE wherein the UE is allocated with multiple SR configurations by a network node, the device 300 includes a program code 312 stored in the memory 310. The CPU 308 could execute program code 312 to enable the UE (i) to trigger a MAC control element if a timer expires, (ii) to trigger a SR for the MAC control element, and (iii) to transmit the SR based on a first SR configuration of the multiple SR configurations, wherein the first SR configuration is associated with a highest priority logical channel having data available for transmission when the MAC control element is triggered. Furthermore, the CPU 308 can execute the program code 312 to perform all of the above-described actions and steps or others described herein.

Figure 36:
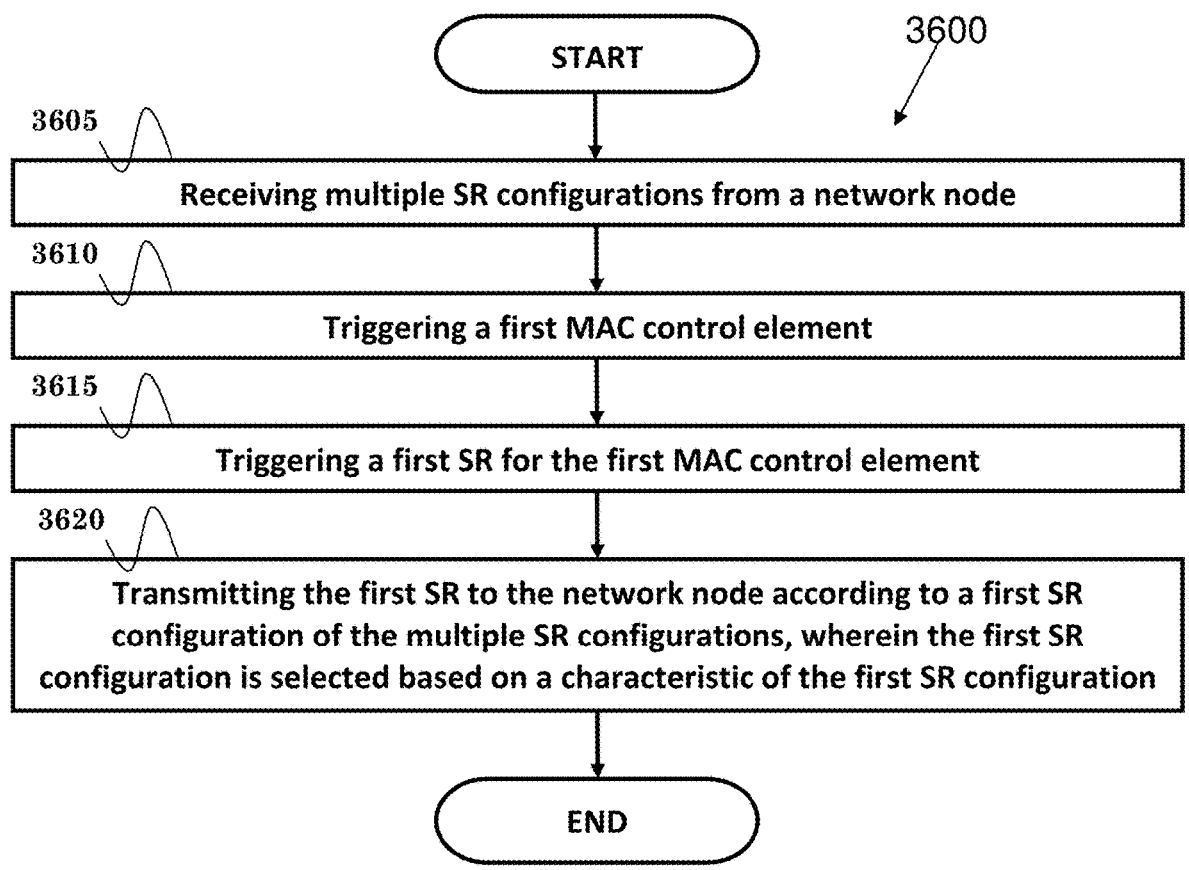
FIG. 36 is a flow chart according to one exemplary embodiment.

FIG. 36 is a flow chart 3600 according to one exemplary embodiment of a UE. In step 3605, the UE receives multiple SR configurations from a network node. In step 3610, the UE triggering a first MAC control element. In one embodiment, the first MAC control element could be triggered if the UE has data for any logical channels that belong to a Logical Channel Group (LCG). In step 3615, the UE triggers a first SR for the first MAC control element. In step 3620, the UE transmits a first SR to the network node according to a first SR configuration of the multiple SR configurations, wherein the first SR configuration is selected based on a characteristic of the first SR configuration.

In one embodiment, the characteristic could be the first SR configuration has the closest SR transmission opportunity after the first MAC control element is triggered. The first MAC control element could be a sidelink BSR. The first MAC control element could be triggered due to a timer expiry. The timer could be a retxBSR-Timer.

In one embodiment, the UE could trigger a second MAC control element for an uplink data of a first logical channel. And the UE could trigger a second SR for the second MAC control element. Furthermore, the UE could transmit the second SR to the network node according to a second SR configuration of the multiple SR configurations, wherein the second SR configuration is selected based on an association between the first logical channel and the second SR configuration.

In one embodiment, the UE could perform the second SR transmission according to the second SR configuration without suspending or stopping performing a third SR transmission according to the first SR configuration. Alternatively, the UE could stop performing a third SR transmission according to the first SR configuration when the UE triggers the second MAC control element.

Referring back to FIGS. 3 and 4, in one exemplary embodiment of a UE, the device 300 includes a program code 312 stored in the memory 310. The CPU 308 could execute program code 312 to enable the UE (i) to receive multiple SR configurations from a network node, (ii) to trigger a first MAC control element, (iii) to trigger a first SR for the first MAC control element, and (iv) to transmit the first SR to the network node according to a first SR configuration of the multiple SR configurations, wherein the first SR configuration is selected based on a characteristic of the first SR configuration. Furthermore, the CPU 308 can execute the program code 312 to perform all of the above-described actions and steps or others described herein.

Figure 37:
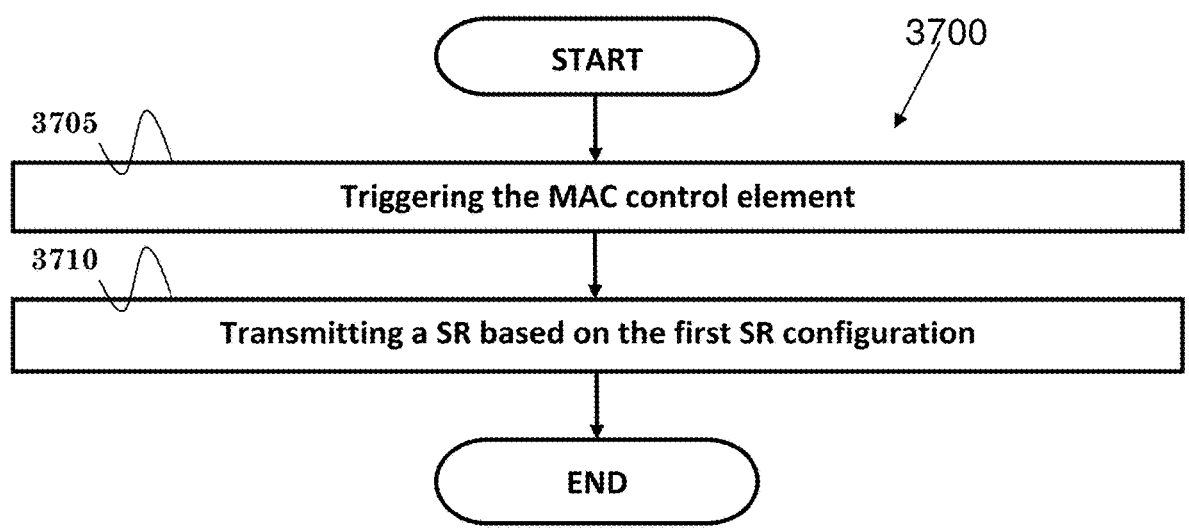
FIG. 37 is a flow chart according to one exemplary embodiment.

FIG. 37 is a flow chart 3700 according to one exemplary embodiment of a UE, wherein the UE is allocated with multiple SR configurations by a network node and there is an association between a MAC control element and a first SR configuration in the multiple SR configurations. In step 3705, the UE triggers the MAC control element. In step 3710, the UE transmits a SR based on the first SR configuration.

In one embodiment, the association could be established by linking the MAC control element to a TTI (Transmission Time Interval) length information (e.g. Maximum TTI threshold, etc.). The first SR configuration could be associated with the TTI length information.

Alternatively, the association could be established by linking the MAC control element to a numerology information. The first SR configuration could be associated with the numerology information.

Furthermore, the association could be established by linking the MAC control element to one or multiple logical channel identity. The first SR configuration could be associated with the logical channel identity.

In addition, the association could be established by linking the MAC control element to one or multiple logical channel group(s). The first SR configuration is associated with the logical channel group. Also, the first SR configuration could include information related to the MAC control element (e.g. identity of MAC CE, corresponding service identity (e.g. sidelink, MBMS, V2X), etc.).

The association could also be established by including information related to the MAC control element in the first SR configuration.

The association could be established by including information (e.g. index, identity, etc.) of the first SR configuration into a configuration related to the MAC control element. The configuration could be a service configuration (e.g. sidelink configuration, V2X configuration, MBMS configuration, etc.). The configuration could be a MAC configuration.

Referring back to FIGS. 3 and 4, in one exemplary embodiment of a UE, the device 300 includes a program code 312 stored in the memory 310. The CPU 308 could execute program code 312 to enable the UE (i) to trigger the MAC control element, and (ii) to transmit a SR based on the first SR configuration. Furthermore, the CPU 308 can execute the program code 312 to perform all of the above-described actions and steps or others described herein.

Figure 38:
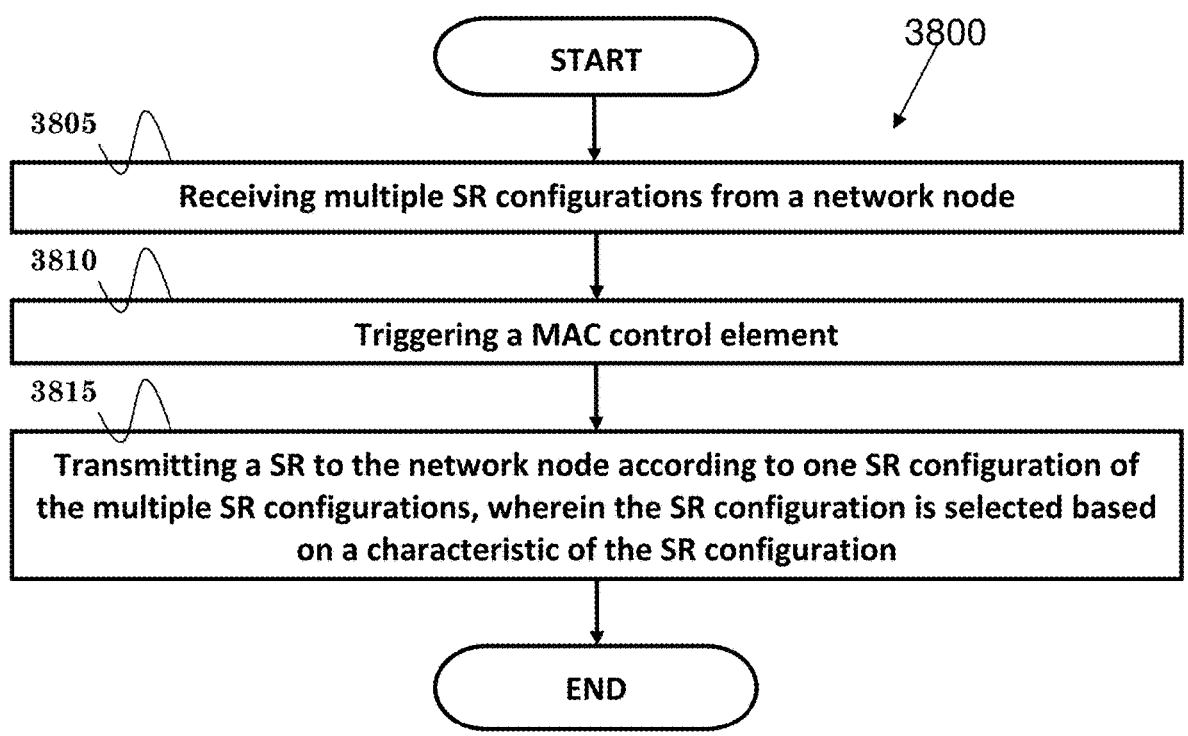
FIG. 38 is a flow chart according to one exemplary embodiment.

FIG. 38 is a flow chart 3800 according to one exemplary embodiment of a UE, wherein the UE is allocated with multiple SR configurations by a network node with pre-defined rule for selecting SR configuration. In step 3805, the UE receives multiple SR configurations from a network node. In step 3810, the UE triggers a MAC control element. In step 3815, the UE transmits a SR to the network node according to one SR configuration of the multiple SR configurations, wherein the SR configuration is selected based on a characteristic of the SR configuration.

In one embodiment, the characteristic could be SR configuration used for requesting resource on default numerology or access numerology. The characteristic could also be SR configuration allocated on default numerology or access numerology. Furthermore, the characteristic could be SR configuration with densest SR transmission opportunities comparing with other SR configuration(s). In addition, the characteristic could be SR configuration has the closest SR transmission opportunity after the trigger timing of the MAC control element. The characteristic could also be SR configuration is used for requesting shortest TTI and/or largest numerology resource which the UE can use. Furthermore, the characteristic could be SR configuration dedicated for requesting transmission resource for the MAC control element.

In one embodiment, the UE does not have multiple connectivities.

Referring back to FIGS. 3 and 4, in one exemplary embodiment of a UE wherein the UE is allocated with multiple SR configurations by a network node with pre-defined rule for selecting SR configuration, the device 300 includes a program code 312 stored in the memory 310. The CPU 308 could execute program code 312 to enable the UE (i) to receive multiple SR configurations from a network node, (ii) to trigger a MAC control element, and (iii) to transmit a SR to the network node according to one SR configuration of the multiple SR configurations, wherein the SR configuration is selected based on a characteristic of the SR configuration. Furthermore, the CPU 308 can execute the program code 312 to perform all of the above-described actions and steps or others described herein.

Figure 39:
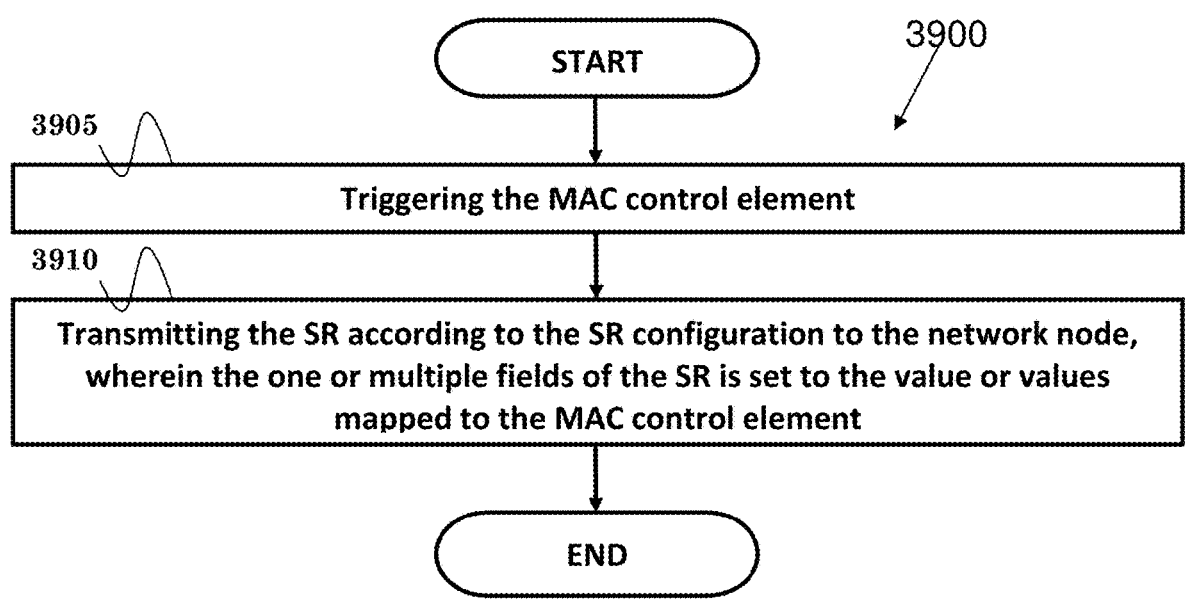
FIG. 39 is a flow chart according to one exemplary embodiment.

FIG. 39 is a flow chart 3900 according to one exemplary embodiment of a UE, wherein the UE is allocated with one SR configuration by a network node that configures multiple bits SR setting for control element and wherein there is a mapping between a MAC control element and a value or values of one or multiple fields in a SR transmitted according to the SR configuration. In step 3905, the UE triggers the MAC control element. In step 3910, the UE transmits the SR according to the SR configuration to the network node, wherein the one or multiple fields of the SR is/are set to the value/values mapped to the MAC control element.

In one embodiment, the mapping could be established by linking the MAC control element to a TTI length information (e.g. Maximum TTI threshold, etc.). The value or values are associated with the TTI length information.

Alternatively, the mapping could be established by linking the MAC control element to a numerology information (e.g. one or multiple numerology index, numerology index bitmap, etc.). The value or values are associated with the numerology information.

The mapping could also established by linking the MAC control element to one or multiple logical channel identity. The value or values are associated with the logical channel identity.

Furthermore, the mapping could be established by linking the MAC control element to one or multiple logical channel group(s). The value or values are associated with the logical channel group.

In addition, the mapping could be established by directly mapping information related to the MAC control element (e.g. identity of MAC CE, corresponding service identity (e.g. sidelink, MBMS, V2X), etc.) to the value or values in the SR configuration.

Referring back to FIGS. 3 and 4, in one exemplary embodiment of a UE wherein the UE is allocated with one SR configuration by a network node that configures multiple bits SR setting for control element and wherein there is a mapping between a MAC control element and a value or values of one or multiple fields in a SR transmitted according to the SR configuration, the device 300 includes a program code 312 stored in the memory 310. The CPU 308 could execute program code 312 to enable the UE (i) to trigger the MAC control element, and (ii) to transmit the SR according to the SR configuration to the network node, wherein the one or multiple fields of the SR is set to the value or values mapped to the MAC control element. Furthermore, the CPU 308 can execute the program code 312 to perform all of the above-described actions and steps or others described herein.

Figure 40:
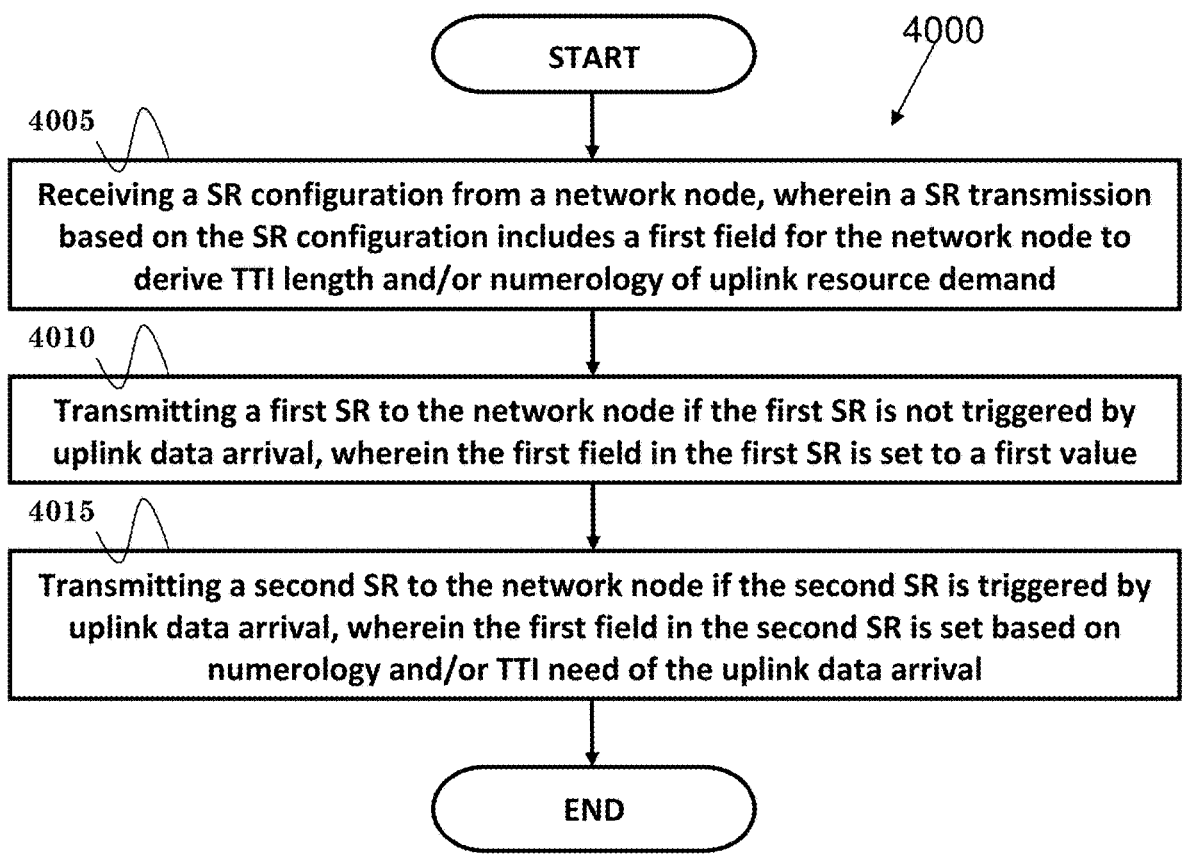
FIG. 40 is a flow chart according to one exemplary embodiment.

FIG. 40 is a flow chart 4000 according to one exemplary embodiment of a UE with predefined multiple bits SR setting for control element. In step 4005, the UE receives a SR configuration from a network node, wherein a SR transmission based on the SR configuration includes a first field for the network node to derive TTI length and/or numerology of uplink resource demand. In step 4010, the UE transmits a first SR to the network node if the first SR is not triggered by uplink data arrival, wherein the first field in the first SR is set to a first value. In step 4015, the UE transmits a second SR to the network node if the second SR is triggered by uplink data arrival, wherein the first field in the second SR is set based on numerology and/or TTI need of the uplink data arrival.

In one embodiment, the first value could be a specific value used to indicate there is at least a MAC control element pending in the UE. The first value could also be a specific value used to indicate the MAC control element is triggered. For example, if there are 3 bits in the first field, '000'~'011' could be used for uplink data arrival cases, '111' could be the specific value used to indicate the MAC control element, and '100'~'110' could be used for other cases or reserved for future uses.

In one embodiment, the first value could indicate uplink resource demand on default numerology, initial access numerology, uplink resource demand for specific range of TTI length, uplink resource demand for a LCG, or uplink resource demand for a logical channel.

In one embodiment, the UE has no data available for transmission in DRB or SRB when triggering the MAC control element.

In one embodiment, the MAC control element could be a Sidelink BSR, a control element triggered by a timer, a control element for reporting beam related information, a control element for reporting a traffic pattern change, or a control element for confirming a command from the network.

In one embodiment, the MAC control element may not be related to logical channel.

Referring back to FIGS. 3 and 4, in one exemplary embodiment of a UE with predefined multiple bits SR setting for control element, the device 300 includes a program code 312 stored in the memory 310. The CPU 308 could execute program code 312 to enable the UE (i) to receive a SR configuration from a network node, wherein a SR transmission based on the SR configuration includes a first field for the network node to derive TTI length and/or numerology of uplink resource demand, (ii) to transmit a first SR to the network node if the first SR is not triggered by uplink data arrival, wherein the first field in the first SR is set to a first value, and (iii) to transmit a second SR to the network node if the second SR is triggered by uplink data arrival, wherein the first field in the second SR is set based on numerology and/or TTI need of the uplink data arrival. Furthermore, the CPU 308 can execute the program code 312 to perform all of the above-described actions and steps or others described herein.

Figure 41:
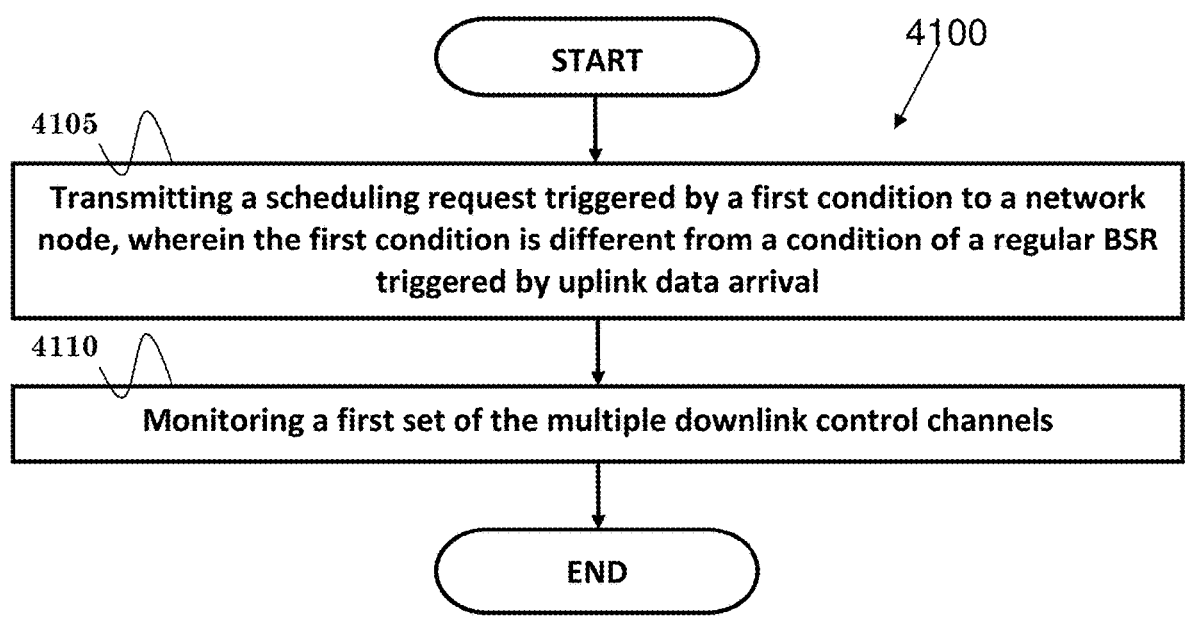
FIG. 41 is a flow chart according to one exemplary embodiment.

FIG. 41 is a flow chart 4100 according to one exemplary embodiment of a UE, wherein the UE is configured with multiple downlink control channels. In step 4105, the UE transmits a scheduling request triggered by a first condition to a network node, wherein the first condition is different from a condition of a regular BSR triggered by uplink data arrival. In step 4110, the UE monitors a first set of the multiple downlink control channels.

Referring back to FIGS. 3 and 4, in one exemplary embodiment of a UE, wherein the UE is configured with multiple downlink control channels, the device 300 includes a program code 312 stored in the memory 310. The CPU 308 could execute program code 312 to enable the UE (i) to transmit a scheduling request triggered by a first condition to a network node, wherein the first condition is different from a condition of a regular BSR triggered by uplink data arrival, and (ii) to monitor a first set of the multiple downlink control channels. Furthermore, the CPU 308 can execute the program code 312 to perform all of the above-described actions and steps or others described herein.

Figure 42:
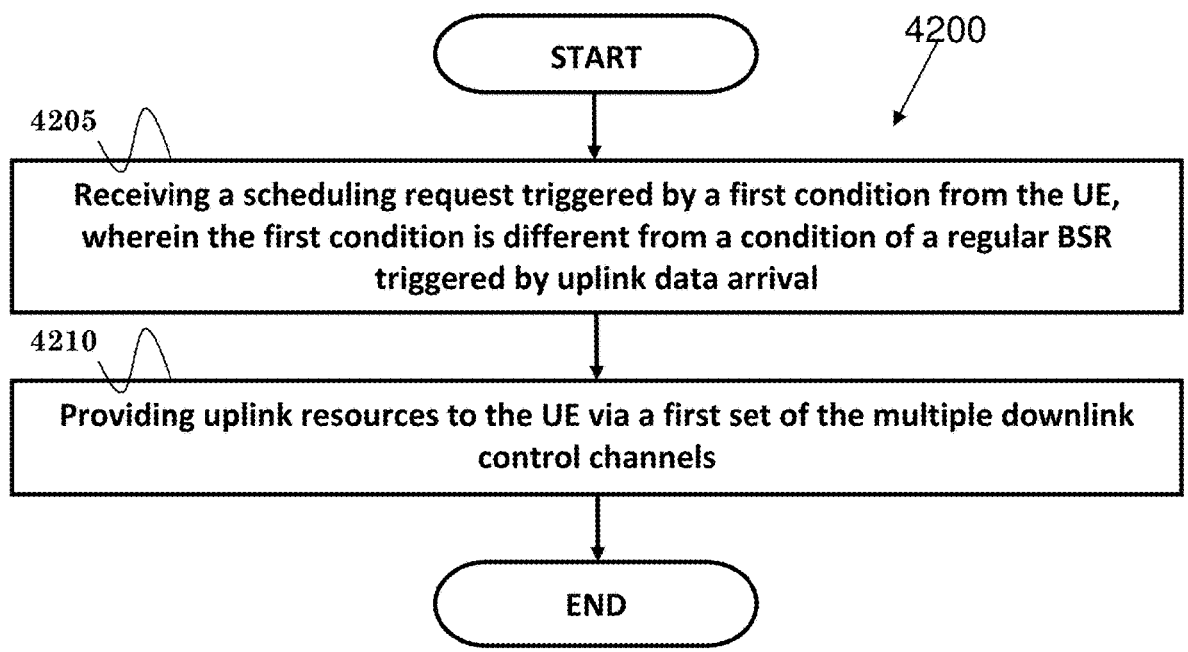
FIG. 42 is a flow chart according to one exemplary embodiment.

FIG. 42 is a flow chart 4200 according to one exemplary embodiment of a network node, wherein a UE is configured with multiple downlink control channels by the network node. In step 4205, the network node receives a scheduling request triggered by a first condition from the UE, wherein the first condition is different from a condition of a regular BSR triggered by uplink data arrival. In step 4210, the network node provides uplink resources to the UE via a first set of the multiple downlink control channels.

Referring back to FIGS. 3 and 4, in one exemplary embodiment of a network node wherein a UE is configured with multiple downlink control channels by the network node, the device 300 includes a program code 312 stored in the memory 310. The CPU 308 could execute program code 312 to enable the network node (i) to receive a scheduling request triggered by a first condition from the UE, wherein the first condition is different from a condition of a regular BSR triggered by uplink data arrival, and (ii) to provide uplink resources to the UE via a first set of the multiple downlink control channels. Furthermore, the CPU 308 can execute the program code 312 to perform all of the above-described actions and steps or others described herein.

In the context of the embodiments shown in FIGS. 41-42 and described in the text above, in one embodiment, the first condition could be a regular sidelink BSR is triggered, an uplink control element (except BSR) is triggered, an uplink control element triggered by a timer expiry, or an uplink control element triggered by a counter value over threshold.

In one embodiment, the UE could decide the first set based on a first rule. The first rule could be selecting control channel(s) associated with the first condition, or selecting specific control channel(s) regardless of numerology and/or TTI information carried by the transmission of the scheduling request.

In one embodiment, the UE could monitor a second set of the multiple downlink control channels if the scheduling request is triggered by a second condition different from the first condition, wherein the second set is different from the first set. The UE could also decide the second set based on a second rule. In one embodiment, the second rule could be selecting control channel(s) associated with the second condition, selecting specific control channel(s) regardless of numerology and/or TTI information carried by the transmission of the scheduling request, selecting all of the multiple control channel(s), or selecting control channel(s) based on numerology and/or TTI information carried by the transmission of the scheduling request.

In one embodiment, the second condition could be a regular sidelink BSR is triggered, an uplink control element (except BSR) is triggered, an uplink control element triggered by a timer expiry, an uplink control element triggered by a counter value over threshold, or a regular BSR triggered by uplink data arrival.

Figure 43:
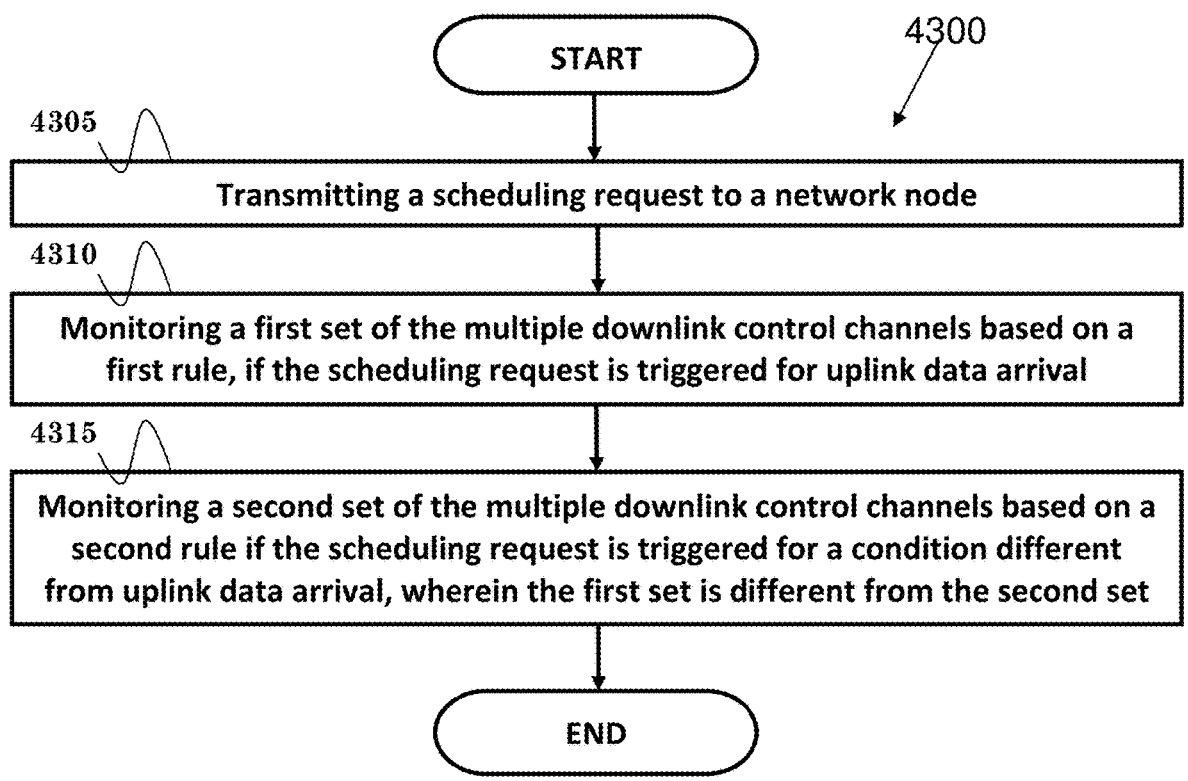
FIG. 43 is a flow chart according to one exemplary embodiment.

FIG. 43 is a flow chart 4300 according to one exemplary embodiment of a UE, wherein the UE is configured with multiple downlink control channels. In step 4305, the UE transmits a scheduling request to a network node. In step 4310, the UE monitors a first set of the multiple downlink control channels based on a first rule, if the scheduling request is triggered for uplink data arrival. In step 4315, the UE monitors a second set of the multiple downlink control channels based on a second rule if the scheduling request is triggered for a condition different from uplink data arrival, wherein the first set is different from the second set.

Referring back to FIGS. 3 and 4, in one exemplary embodiment of a UE, wherein the UE is configured with multiple downlink control channels, the device 300 includes a program code 312 stored in the memory 310. The CPU 308 could execute program code 312 to enable the UE (i) to transmit a scheduling request to a network node, (ii) to monitor a first set of the multiple downlink control channels based on a first rule, if the scheduling request is triggered for uplink data arrival, and (iii) to monitors a second set of the multiple downlink control channels based on a second rule if the scheduling request is triggered for a condition different from uplink data arrival, wherein the first set is different from the second set. Furthermore, the CPU 308 can execute the program code 312 to perform all of the above-described actions and steps or others described herein.

Figure 44:
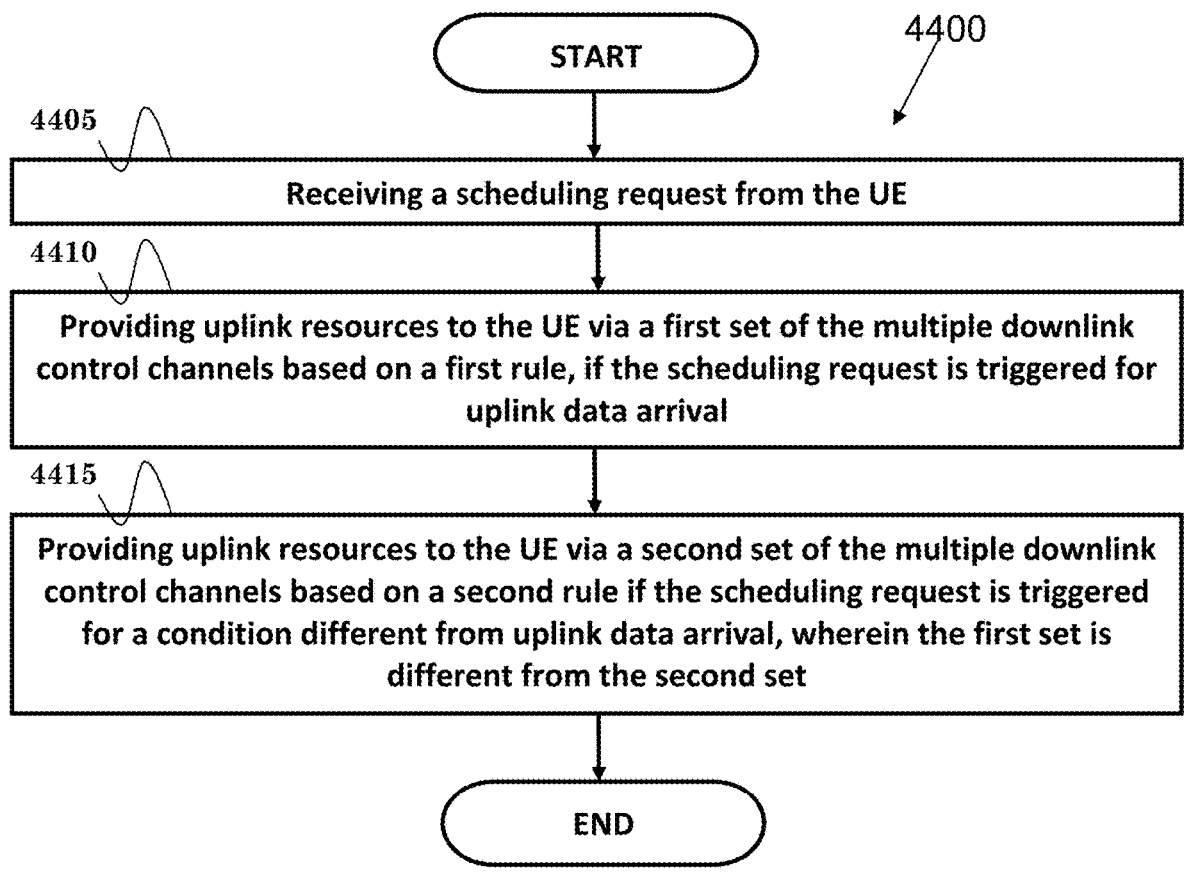
FIG. 44 is a flow chart according to one exemplary embodiment.

FIG. 44 is a flow chart 4400 according to one exemplary embodiment of a network node, wherein the network node configures a UE with multiple downlink control channels. In step 4405, the network node receiving a scheduling request from the UE. In step 4410, the network node provides uplink resources to the UE via a first set of the multiple downlink control channels based on a first rule, if the scheduling request is triggered for uplink data arrival. In step 4415, the network node provides uplink resources to the UE via a second set of the multiple downlink control channels based on a second rule if the scheduling request is triggered for a condition different from uplink data arrival, wherein the first set is different from the second set.

Referring back to FIGS. 3 and 4, in one exemplary embodiment of a network node wherein the network node configures a UE with multiple downlink control channels, the device 300 includes a program code 312 stored in the memory 310. The CPU 308 could execute program code 312 to enable the network node (i) to receive a scheduling request from the UE, (ii) to provide uplink resources to the UE via a first set of the multiple downlink control channels based on a first rule, if the scheduling request is triggered for uplink data arrival, and (iii) to provide uplink resources to the UE via a second set of the multiple downlink control channels based on a second rule if the scheduling request is triggered for a condition different from uplink data arrival, wherein the first set is different from the second set. Furthermore, the CPU 308 can execute the program code 312 to perform all of the above-described actions and steps or others described herein.

In the context of the embodiments shown in FIGS. 43-44 and described in the text above, in one embodiment, the first rule could be selecting all of the multiple control channel(s) as the first set or selecting control channel(s) related to numerology and/or TTI information carried by the transmission of the scheduling request as the first set.

In one embodiment, the second rule could be selecting all of the multiple control channel(s) as the first set, selecting control channel(s) related to numerology and/or TTI information carried by the transmission of the scheduling request as the first set, selecting control channel(s) associated with the condition as the first set, or selecting specific control channel(s) regardless of numerology and/or TTI information carried by the transmission of the scheduling request.

In one embodiment, at least one of the multiple downlink control channel could schedule data transmission on all numerologies, on one or multiple numerologies, or only on specific numerology. The at least one of the multiple downlink control channel could also schedule sidelink transmission.

Figure 45:
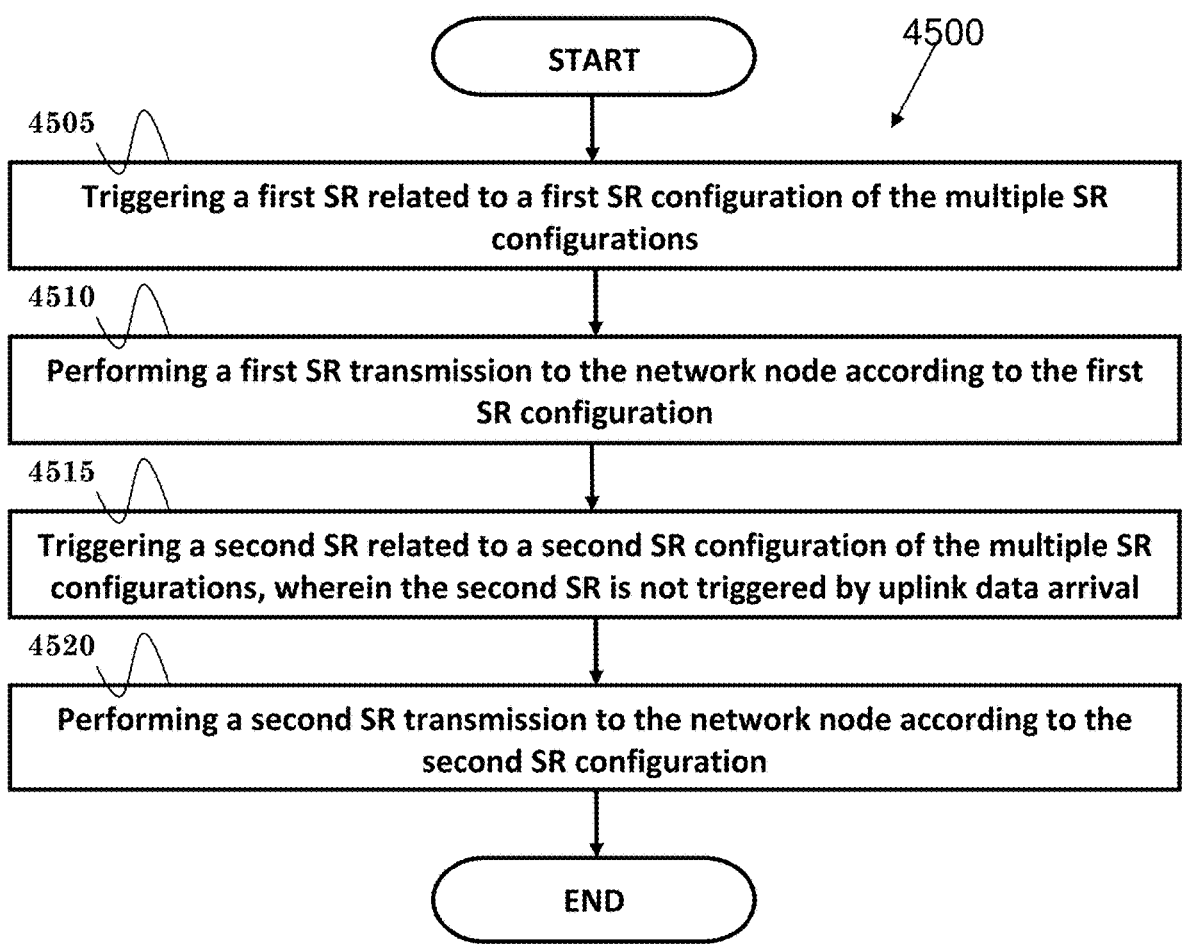
FIG. 45 is a flow chart according to one exemplary embodiment.

FIG. 45 is a flow chart 4500 according to one exemplary embodiment of a UE, wherein the UE is allocated with multiple SR configurations by a network node. In step 4505, the UE triggers a first SR related to a first SR configuration of the multiple SR configurations. In step 4510, the UE performs a first SR transmission to the network node according to the first SR configuration. In step 4515, the UE triggers a second SR related to a second SR configuration of the multiple SR configurations, wherein the second SR is not triggered by uplink data arrival. In step 4520, the UE performs a second SR transmission to the network node according to the second SR configuration.

In one embodiment, the first SR could be triggered by uplink data arrival (e.g. a regular BSR), a sidelink BSR (e.g. regular sidelink BSR), a timer controlled based MAC control element, or a new MAC CE which is different from any uplink MAC CE listed in 3GPP TS 36.321.

In one embodiment, the second SR could be triggered by a sidelink BSR (e.g. regular sidelink BSR), a timer controlled based MAC control element, or a new MAC CE (which is different from any uplink MAC CE listed in 3GPP TS 36.321.

In one embodiment, the UE could stop performing a third SR transmission to the network node according to the first SR configuration of the multiple SR configurations after the second SR is triggered. The UE could decide to perform the second SR transmission according to the second SR configuration based on prioritization rule in LCP procedure, to the second SR configuration based on latency requirement of MAC CE triggering the second SR, or to the second SR configuration, if the second SR is triggered by a sidelink BSR, wherein the sidelink BSR is for reporting data belonging to a logical channel with priority higher than a threshold.

Referring back to FIGS. 3 and 4, in one exemplary embodiment of a UE wherein the UE is allocated with multiple SR configurations by a network node, the device 300 includes a program code 312 stored in the memory 310. The CPU 308 could execute program code 312 to enable the UE (i) to trigger a first SR related to a first SR configuration of the multiple SR configurations, (ii) to perform a first SR transmission to the network node according to the first SR configuration, (iii) to trigger a second SR related to a second SR configuration of the multiple SR configurations, wherein the second SR is not triggered by uplink data arrival, and (iv) to perform a second SR transmission to the network node according to the second SR configuration. Furthermore, the CPU 308 can execute the program code 312 to perform all of the above-described actions and steps or others described herein.

Figure 46:
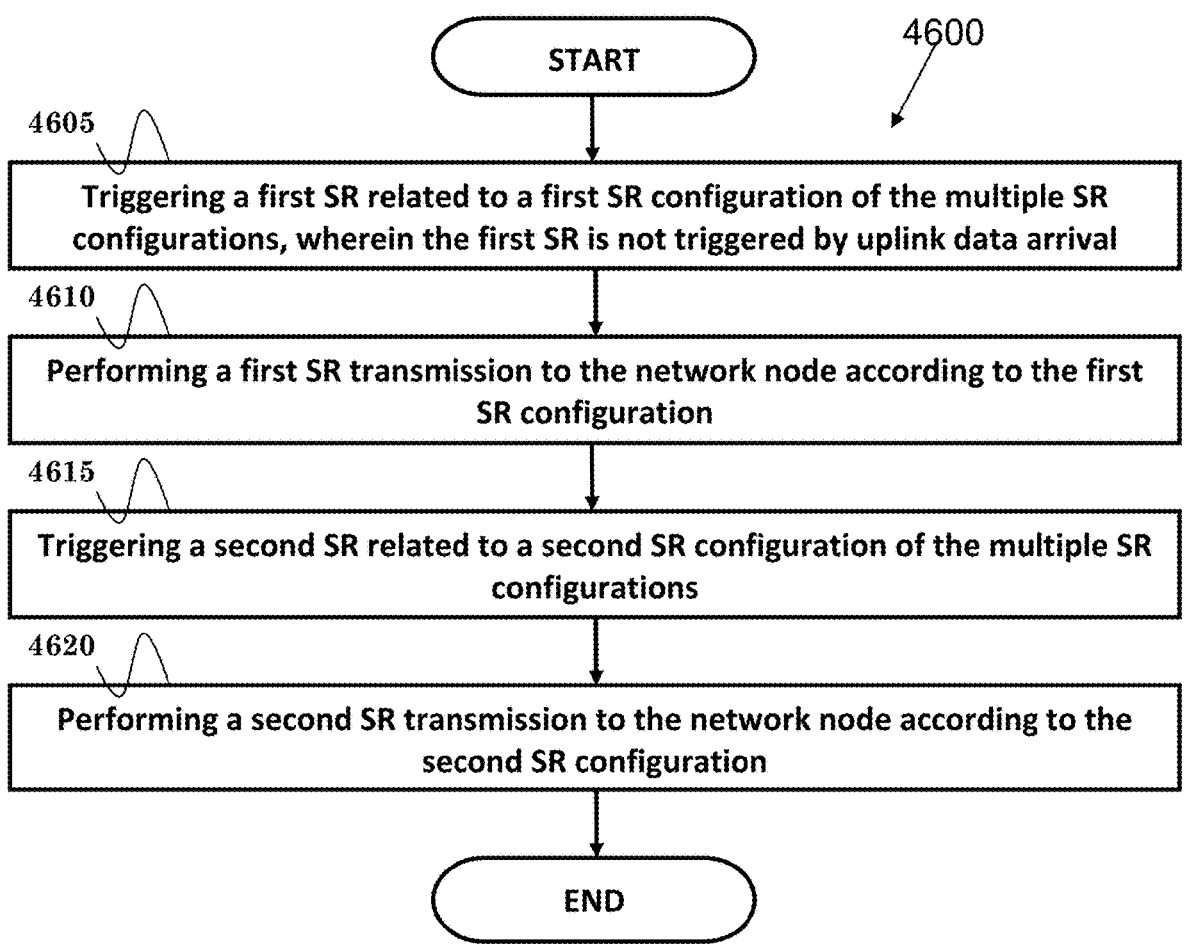
FIG. 46 is a flow chart according to one exemplary embodiment.

FIG. 46 is a flow chart 4600 according to one exemplary embodiment of a UE, wherein the UE is allocated with multiple SR configurations by a network node. In step 4605, the UE triggers a first SR related to a first SR configuration of the multiple SR configurations, wherein the first SR is not triggered by uplink data arrival. In step 4610, the UE performs a first SR transmission to the network node according to the first SR configuration. In step 4615, the UE triggers a second SR related to a second SR configuration of the multiple SR configurations. In step 4620, the UE performs a second SR transmission to the network node according to the second SR configuration.

In one embodiment, the first SR could be triggered by a sidelink BSR (e.g. regular sidelink BSR), a timer controlled based MAC control element, or a new MAC CE (which is different from any uplink MAC CE listed in 3GPP TS 36.321.

In one embodiment, the second SR could be triggered by a sidelink BSR (e.g. regular sidelink BSR), a timer controlled based MAC control element, a new MAC CE which is different from any uplink MAC CE listed in 3GPP TS 36.321, or an uplink data arrival (e.g. a regular BSR).

In one embodiment, the UE could stop performing a third SR transmission to the network node according to the first SR configuration of the multiple SR configurations after the second SR is triggered. The UE could also decide to perform the second SR transmission according to the second SR configuration based on prioritization rule in LCP procedure, to the second SR configuration based on latency requirement of MAC CE triggering the second SR, or to the second SR configuration, if the second SR is triggered by a sidelink BSR, wherein the sidelink BSR is for reporting data belonging to a logical channel with priority higher than a threshold.

In one embodiment, the first SR configuration and the second SR configuration could be for requesting resource on different numerologies and/or TTI durations. Furthermore, the resource indicated by the first SR configuration and resource indicated by the second SR configuration could be on different cells. In addition, the resource indicated by the first SR configuration and resource indicated by the second SR configuration could be on different numerologies and/or TTI durations.

Referring back to FIGS. 3 and 4, in one exemplary embodiment of a UE wherein the UE is allocated with multiple SR configurations by a network node, the device 300 includes a program code 312 stored in the memory 310. The CPU 308 could execute program code 312 to enable the UE (i) to trigger a first SR related to a first SR configuration of the multiple SR configurations, wherein the first SR is not triggered by uplink data arrival, (ii) to perform a first SR transmission to the network node according to the first SR configuration, (iii) to trigger a second SR related to a second SR configuration of the multiple SR configurations, and (iv) to perform a second SR transmission to the network node according to the second SR configuration. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), wherein the UE is allocated with multiple SR (Scheduling Request) configurations by a network node, comprising:
   starting a timer upon sending a first MAC (Medium Access Control) control element, wherein the first MAC control element is triggered due to data available for transmission;
   triggering a second MAC control element if the timer expires, wherein there are multiple logical channels still having data available for transmission when the timer expires;
   triggering a SR for the second MAC control element;
   selecting a first SR configuration among the multiple SR configurations, wherein the first SR configuration is associated with a highest priority logical channel among the multiple logical channels having data available for transmission when the second MAC control element is triggered, with the highest priority logical channel determined by comparing priorities of each of the multiple logical channels; and
   transmitting the SR based on the first SR configuration of the multiple SR configurations.

2. The method of claim 1, wherein the timer is a retxBSR-Timer.

3. The method of claim 1, wherein the first and second MAC control elements are BSR (Buffer Status Report).

4. The method of claim 1, wherein the first SR configuration is associated with the highest priority logical channel based on an identity of the highest priority logical channel.

5. The method of claim 1, further comprising:
   triggering the first MAC control element if the UE has data for any logical channels that belong to a Logical Channel Group.

6. A User Equipment (UE), comprising:
   a processor; and
   a memory operatively coupled to the processor, wherein the processor is configured to execute a program code to:
   start a timer upon sending a first MAC (Medium Access Control) control element, wherein the first MAC control element is triggered due to data available for transmission;
   trigger a second MAC control element if the timer expires, wherein there are multiple logical channels still having data available for transmission when the timer expires;
   trigger a SR (Scheduling Request) for the second MAC control element;
   select a first SR configuration among multiple SR configurations, wherein the first SR configuration is associated with a highest priority logical channel among the multiple logical channels having data available for transmission when the second MAC control element is triggered, with the highest priority logical channel determined by comparing priorities of each of the multiple logical channels; and transmit the SR based on the first SR configuration of the multiple SR configurations.

7. The UE of claim 6, wherein the timer is a retxBSR-Timer.

8. The UE of claim 6, wherein the first and second MAC control elements are BSR (Buffer Status Report).

9. The UE of claim 6, wherein the first SR configuration is associated with the highest priority logical channel based on an identity of the highest priority logical channel.

10. The UE of claim 6, wherein the processor is further configured to execute a program code stored in the memory to:

trigger the first MAC control element if the UE has data for any of logical channels which belong to a Logical Channel Group.

11. A method of a UE (User Equipment), wherein the UE is allocated with a plurality of SR (Scheduling Request) configurations by a network node, comprising:

starting a timer upon sending a first MAC (Medium Access Control) control element, wherein the first MAC control element is triggered due to data available for transmission;

triggering a second MAC control element if the timer expires, wherein there are a plurality of logical channels having data available for transmission when the timer expires;

triggering a SR for the second MAC control element;

selecting a first SR configuration among the plurality of SR configurations, wherein the first SR configuration is associated with a highest priority logical channel among the plurality of logical channels having data available for transmission when the second MAC control element is triggered, with the highest priority logical channel determined by an identity of the highest priority logical channel; and transmitting the SR based on the first SR configuration of the plurality of SR configurations.

12. The method of claim 11, wherein the timer is a retxBSR-Timer.

13. The method of claim 11, wherein the first and second MAC control elements are BSR (Buffer Status Report).

14. The method of claim 11, wherein at least one of the first and second MAC control elements is BSR.

15. The method of claim 11, further comprising:

triggering the first MAC control element if the UE has data for any logical channels that belong to a Logical Channel Group.

16. The method of claim 1, wherein at least one of the first and second MAC control elements is BSR.

17. The UE of claim 6, wherein at least one of the first and second MAC control elements is BSR.

* * * * *